US012434363B2

(12) United States Patent
Sato et al.

(10) Patent No.: US 12,434,363 B2
(45) Date of Patent: Oct. 7, 2025

(54) DRIVER

(71) Applicant: KOKI HOLDINGS CO., LTD., Tokyo (JP)

(72) Inventors: Shinichiro Sato, Ibaraki (JP); Takashi Ueda, Ibaraki (JP); Yutaka Ito, Ibaraki (JP); Jyun Enta, Ibaraki (JP); Toshinori Yasutomi, Ibaraki (JP); Yoshiichi Komazaki, Ibaraki (JP); Kenji Kobori, Ibaraki (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 153 days.

(21) Appl. No.: 18/113,270

(22) Filed: Feb. 23, 2023

(65) Prior Publication Data

US 2023/0211483 A1 Jul. 6, 2023

Related U.S. Application Data

(63) Continuation of application No. 17/073,033, filed on Oct. 16, 2020, now Pat. No. 11,590,638, which is a
(Continued)

(30) Foreign Application Priority Data

Jun. 10, 2015 (JP) ................................ 2015-117586
Sep. 30, 2015 (JP) ................................ 2015-193919
Mar. 31, 2016 (JP) ................................ 2016-072920

(51) Int. Cl.
*B25C 1/00* (2006.01)
*B25C 1/04* (2006.01)
(Continued)

(52) U.S. Cl.
CPC .............. *B25C 1/008* (2013.01); *B25C 1/047* (2013.01); *B25C 1/06* (2013.01); *B25C 7/00* (2013.01)

(58) Field of Classification Search
CPC ........... B25C 1/06; B25C 1/047; B25C 1/008; B25C 7/00; B25C 1/00–188
(Continued)

(56) References Cited

U.S. PATENT DOCUMENTS 2,933,290 A * 4/1960 Ryder, Jr. ................ E21B 7/021 173/148
3,589,588 A * 6/1971 Vasku ........................ B25C 1/06 227/132
(Continued)

FOREIGN PATENT DOCUMENTS

EP 3 263 286 A1 1/2018
JP 2008-119780 A 5/2008
(Continued)

OTHER PUBLICATIONS

Extended European Search Report issued in corresponding European Patent Application No. 16807377.3-1019, dated Jan. 4, 2019.
(Continued)

*Primary Examiner* — Dariush Seif
(74) *Attorney, Agent, or Firm* — Rimon P.C.

(57) ABSTRACT

A driver including: an ejection part to which a fastener is supplied; a driver blade which moves from a first position toward a second position and drives the fastener into a driven member; and a rack provided to the driver blade. The driver further includes: a rotary component engaging with the rack and moving the driver blade from the second position to the first position; and a lock plate engaging with the rack. The driver blade moves from the second position to the first position while the rotary component rotates once,
(Continued)

the rotary component is released from engaging with the rack after the driver blade moves from the second position to the first position, and moves from the first position to the second position, and the lock plate is engageable with the rack when the driver blade stops before reaching the second position from the first position.

17 Claims, 40 Drawing Sheets

Related U.S. Application Data continuation of application No. 15/580,638, filed as application No. PCT/JP2016/066417 on Jun. 2, 2016, now Pat. No. 10,843,317.

(51) Int. Cl.
*B25C 1/06* (2006.01)
*B25C 7/00* (2006.01)

(58) Field of Classification Search
USPC ..................... 227/129–131, 146–147, 142, 8
See application file for complete search history.

(56) References Cited

U.S. PATENT DOCUMENTS 4,215,808 A * 8/1980 Sollberger .............. B25C 1/041 227/132
4,807,793 A * 2/1989 Ghibely .................... B25C 1/06 227/8
5,388,749 A * 2/1995 Davignon ............... B65C 7/006 227/67
6,997,367 B2 2/2006 Hu
7,152,774 B2 * 12/2006 Chen .......................... B25C 1/06 227/129
7,334,715 B2 * 2/2008 Oda ........................... B25C 1/06 173/205
8,011,441 B2 9/2011 Leimbach et al.
8,763,874 B2 7/2014 McCardle et al.
10,173,310 B2 1/2019 Wyler et al.
2005/0082334 A1 * 4/2005 Hu ............................ B25C 1/06 227/132
2005/0242154 A1 * 11/2005 Leimbach ................. B25C 1/06 227/131
2006/0027622 A1 * 2/2006 Sun ........................... B25C 1/06 227/131
2006/0180631 A1 * 8/2006 Pedicini .................... B25C 1/06 227/8
2007/0210134 A1 * 9/2007 Oda .......................... B25C 1/06 227/131
2009/0090759 A1 4/2009 Leimbach et al.
2009/0090762 A1 * 4/2009 Leimbach ................. B25C 1/06 227/136
2011/0198381 A1 * 8/2011 McCardle ................. B25C 1/06 227/8
2011/0290846 A1 12/2011 Leimbach et al.
2014/0138422 A1 * 5/2014 Ronconi ................. E04F 21/22 227/18
2014/0202724 A1 * 7/2014 Moore .................... B25C 1/047 173/46
2015/0202755 A1 * 7/2015 Tanji ......................... B25C 1/04 227/130
2015/0290786 A1 * 10/2015 Largo ........................ B25C 1/06 227/8
2015/0352702 A1 * 12/2015 Chien ..................... B25C 1/047 227/130
2016/0229043 A1 * 8/2016 Wyler ....................... B25C 1/06
2016/0288305 A1 * 10/2016 McCardle ................. B25C 1/06
2017/0190037 A1 * 7/2017 Sato .......................... B25C 1/06
2018/0126528 A1 * 5/2018 Pomeroy ................... B25C 5/13
2018/0154505 A1 * 6/2018 Sato ........................ B25C 1/047
2019/0202042 A1 * 7/2019 Wu ......................... B25C 1/047
2019/0321955 A1 * 10/2019 Carrier ...................... B25C 1/04
2020/0338708 A1 * 10/2020 Po ........................... B25C 1/047
2021/0308852 A1 * 10/2021 Ueda ......................... B25C 1/06
2022/0226977 A1 * 7/2022 Nettleton .................. B25C 5/13
2022/0241947 A1 * 8/2022 Ward ...................... B25C 1/005
2022/0241948 A1 * 8/2022 Baba ......................... B25C 1/06

FOREIGN PATENT DOCUMENTS

JP 2010-029951 A 2/2010
JP 2012-236252 A 12/2012
JP 2014-069289 A 4/2014

OTHER PUBLICATIONS

U.S. PTO Non-Final Office Action issued in related parent U.S. Appl. No. 15/580,638, dated Feb. 5, 2020.
U.S. PTO Notice of Allowance issued in related parent U.S. Appl. No. 15/580,638, dated Jul. 23, 2020.
U.S. Appl. No. 15/580,638, filed Dec. 7, 2017.
Notice of Allowance issued Oct. 20, 2022 in U.S. Appl. No. 17/073,033.
Search Report issued in corresponding International Patent Application No. PCT/JP2016/066417, dated Aug. 23, 2017.
Chinese Office Action issued in corresponding Chinese Patent Application No. 201680033808.7, dated Jul. 1, 2020, with English translation.

* cited by examiner

10 : DRIVER
23 : DRIVER BLADE
27 : EJECTION PART
38 : ROTARY COMPONENT
42 : RACK
56 : LOCK PLATE ( B )

DRIVER

CROSS REFERENCE TO RELATED APPLICATIONS

This is a Continuation of U.S. patent application Ser. No. 17/073,033, filed on Oct. 16, 2020, which is a Continuation of U.S. patent application Ser. No. 15/580,638, filed on Dec. 7, 2017, now U.S. Pat. No. 10,843,317, issued Nov. 24, 2020, which is the U.S. National Phase under 35 U.S.C. § 371 of International Patent Application No. PCT/JP2016/066417, filed on Jun. 2, 2016, which claims the benefit of Japanese Patent Application No. 2015-117586, filed on Jun. 10, 2015, Japanese Patent Application No. 2015-193919, filed on Sep. 30, 2015, and Japanese Patent Application No. 2016-072920, filed on Mar. 31, 2016, the entire contents of each are hereby incorporated by reference in their entirety.

TECHNICAL FIELD

The present invention relates to a driver which drives a fastener into a driven member.

BACKGROUND ART

A driver which drives a fastener into a driven member has been described in Patent Document 1. The driver described in Patent Document 1 includes a housing, a cylindrical guide member provided in the housing, a bumper provided in the housing, a bellows disposed in the housing, and a piston as an operation member which is operable along the guide member. A first end part of the guide member in a center axis direction is connected to the housing. The bellows is extendable, a first end part of the bellows is connected to the piston, and a second end part of the bellows is fixed to the housing. When compressed air is enclosed in the bellows, a compression chamber is formed.

The housing includes a wall part, and a bumper is supported by the wall part. The wall part is extended to a radial direction of the guide member, and the wall part is connected to a second end part of the guide member in the center axis direction. To the piston, a driver blade is fixed as an impactor. An ejection part is provided outside the housing, and the ejection part is fixed to a partition wall. An ejection path is provided to the ejection part. A magazine is attached to the ejection part, and a fastener housed in the magazine is supplied to the ejection path.

Furthermore, the driver described in Patent Document 1 has a motor provided in the housing, a gear which transmits a torque of the motor to a cam, a protrusion provided to the cam, an engagement part provided to the piston, and the bumper provided in the housing. Still further, the driver described in Patent Document 1 has a push rod which is movable with respect to the housing and a trigger which is operated by an operator.

When the motor stops, the piston is pushed against the bumper by a pressure of the compression chamber to stop at a bottom dead point. When the trigger is operated while the push rod is pushed against the driven member, the cam is rotated by the torque of the motor to mesh the protrusion with the engagement part, and the piston is moved from the bottom dead point toward a top dead point by a torque of the cam. While the piston is moving from the bottom dead point toward the top dead point, the bellows is compressed to increase the pressure of the compression chamber.

When the piston reaches the top dead point, the protrusion is away from the engagement part so that the torque of the cam is not transmitted to the piston. Thus, the piston is moved from the top dead point toward the bottom dead point by the pressure of the compression chamber. As a result, the driver blade impacts the fastener positioned in the ejection path to drive the fastener into the driven member. Next, when the piston collides with the bumper, the bumper reduces and attenuates an impact load. Furthermore, the motor stops after the driver blade drives the fastener into the driven member, and the piston stops in a state of being in contact with the bumper.

RELATED ART DOCUMENT

Patent Document

Patent Document 1: Japanese Patent Application Laid-open Publication No. 2014-69289

SUMMARY OF THE INVENTION

Problems to be Solved by the Invention

However, the driver described in Patent Document 1 has no description about a case in which the fastener is clogged in the ejection part, and has a room for improvement in this viewpoint.

An object of the present invention is to provide a driver capable of handling a case with clogging of the fastener in the ejection part.

Means for Solving the Problems

The invention according to one embodiment is directed to a driver including: an ejection part to which a fastener is supplied; an impactor which moves from a first position toward a second position and drives the fastener into a driven member; and a rack provided to the impactor, the driver has a rotary component engaging with the rack and moving the impactor from the second position to the first position and an engagement member engaging with the rack, the impactor moves from the second position to the first position while the rotary component rotates once, the rotary component is released from engaging with the rack after the impactor moves from the second position to the first position, and moves from the first position to the second position, and the engagement member is engageable with the rack when the impactor stops before reaching the second position from the first position.

Effects of the Invention

The invention according to one embodiment can prevent operation of the impactor in a case in which the fastener is clogged in the ejection part so as to handle the case.

BRIEF DESCRIPTIONS OF THE DRAWINGS

Figure 14B:
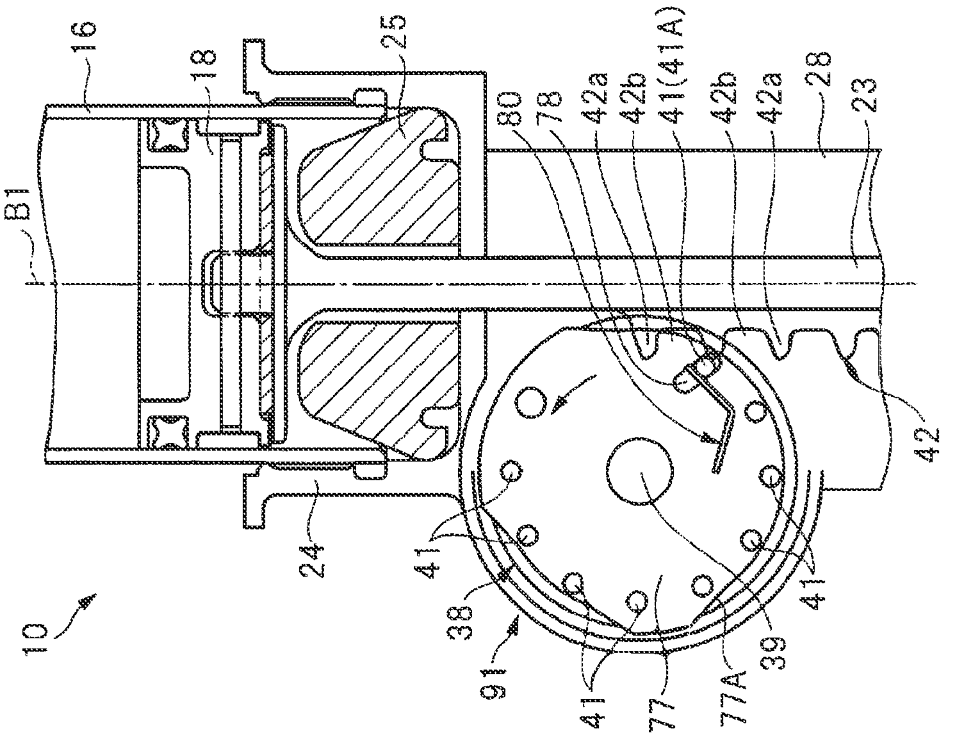
Figure 14A:
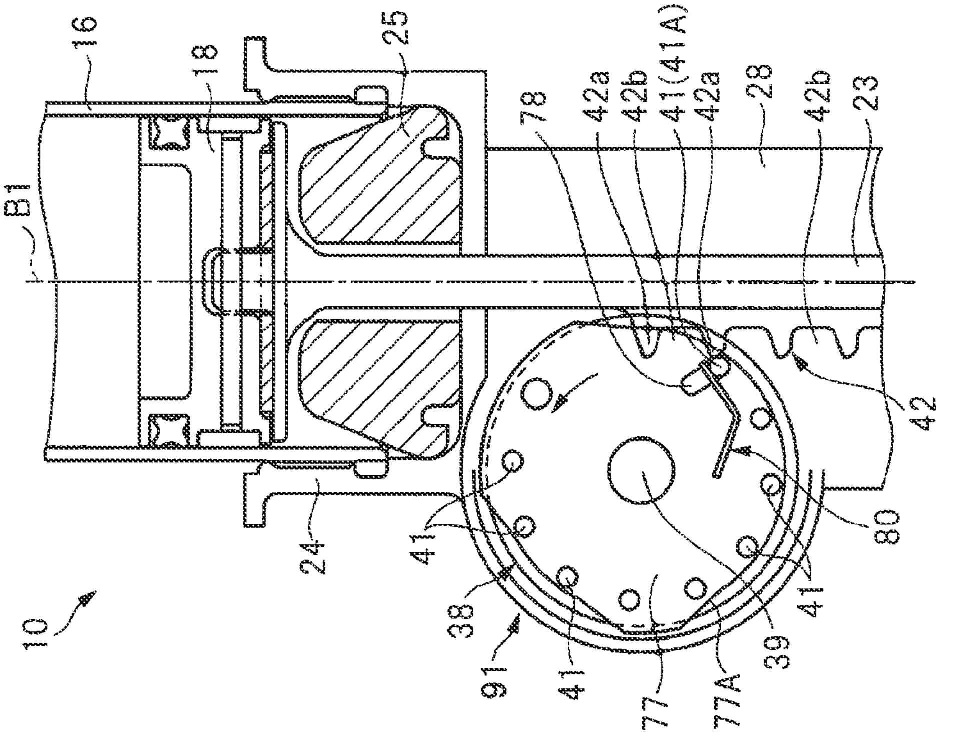
Figure 15B:
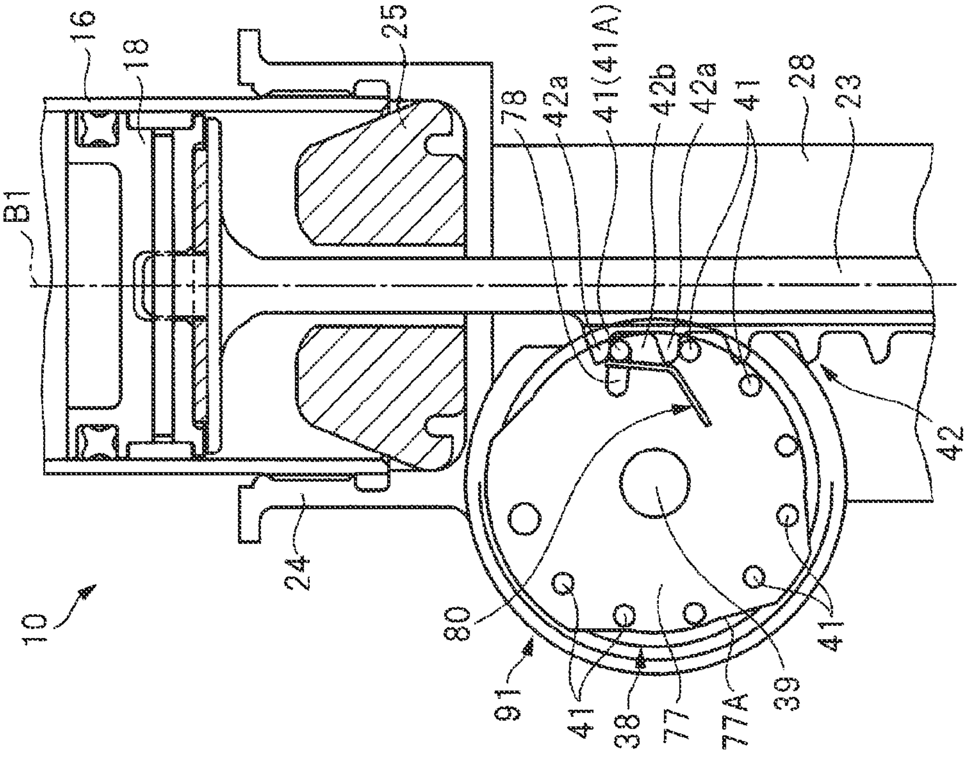
Figure 15A:
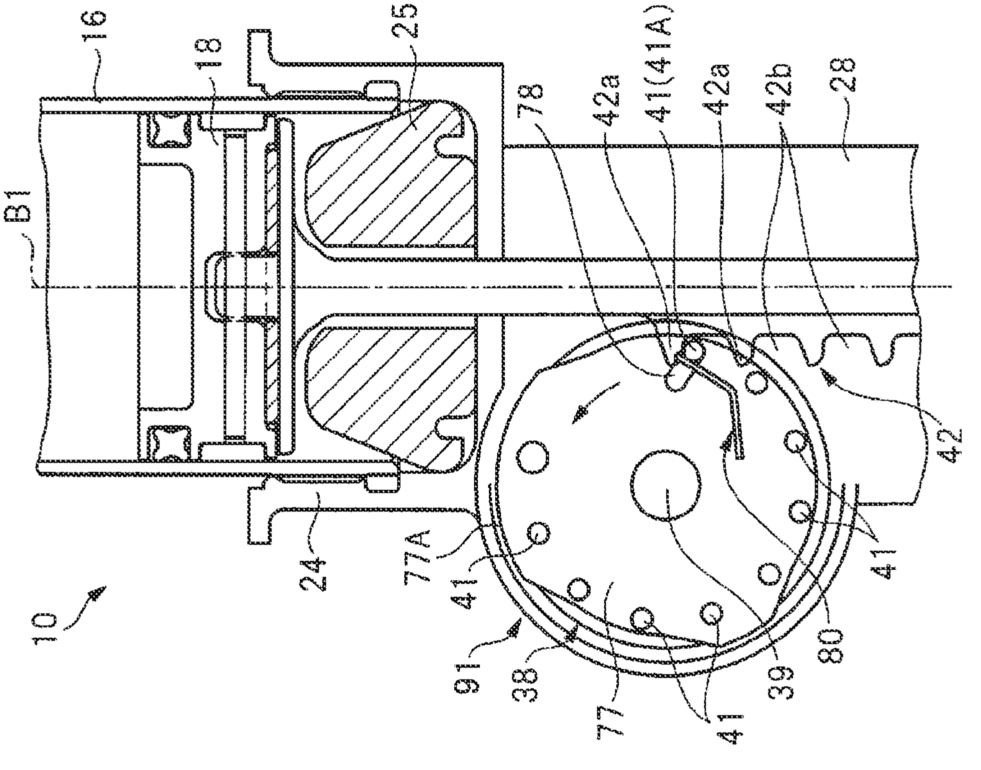
Figure 16:
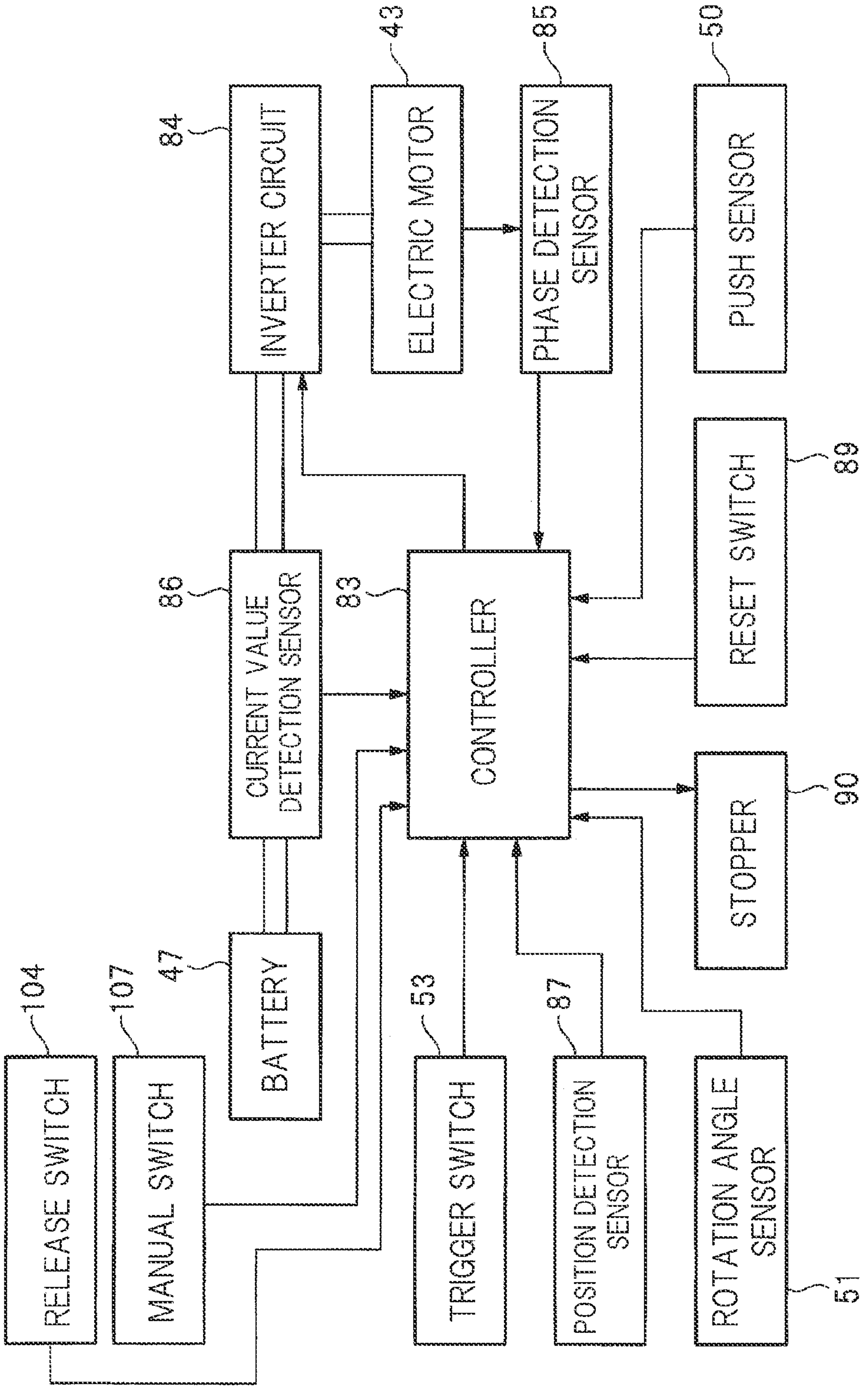
Figure 17B:
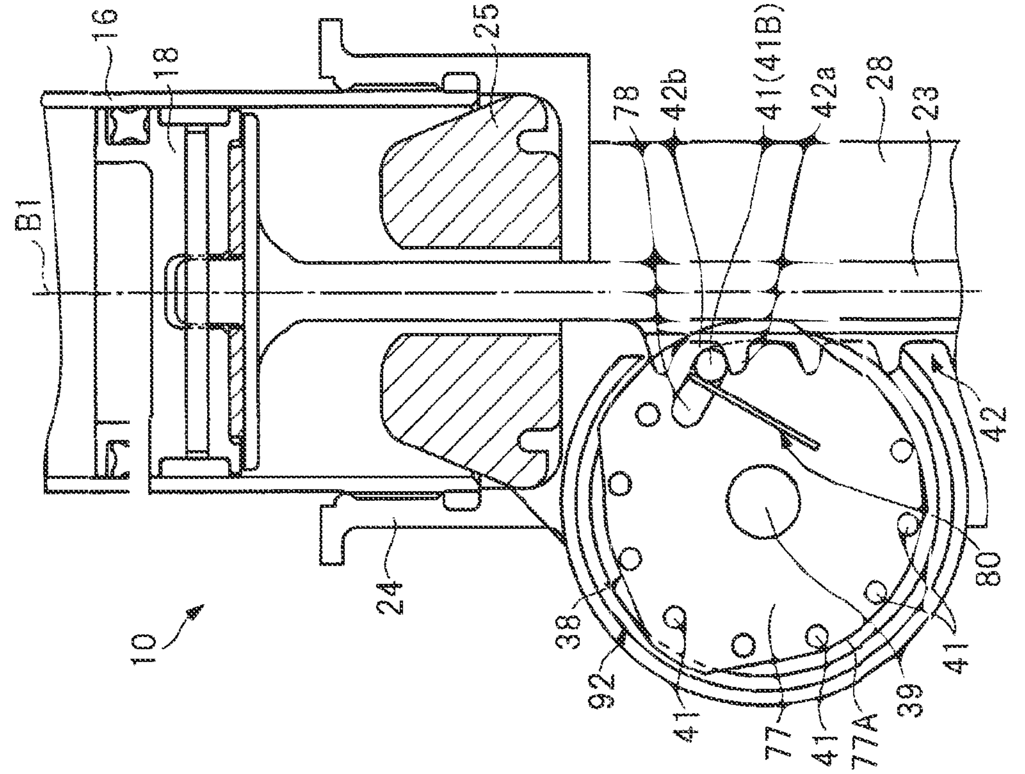
Figure 17A:
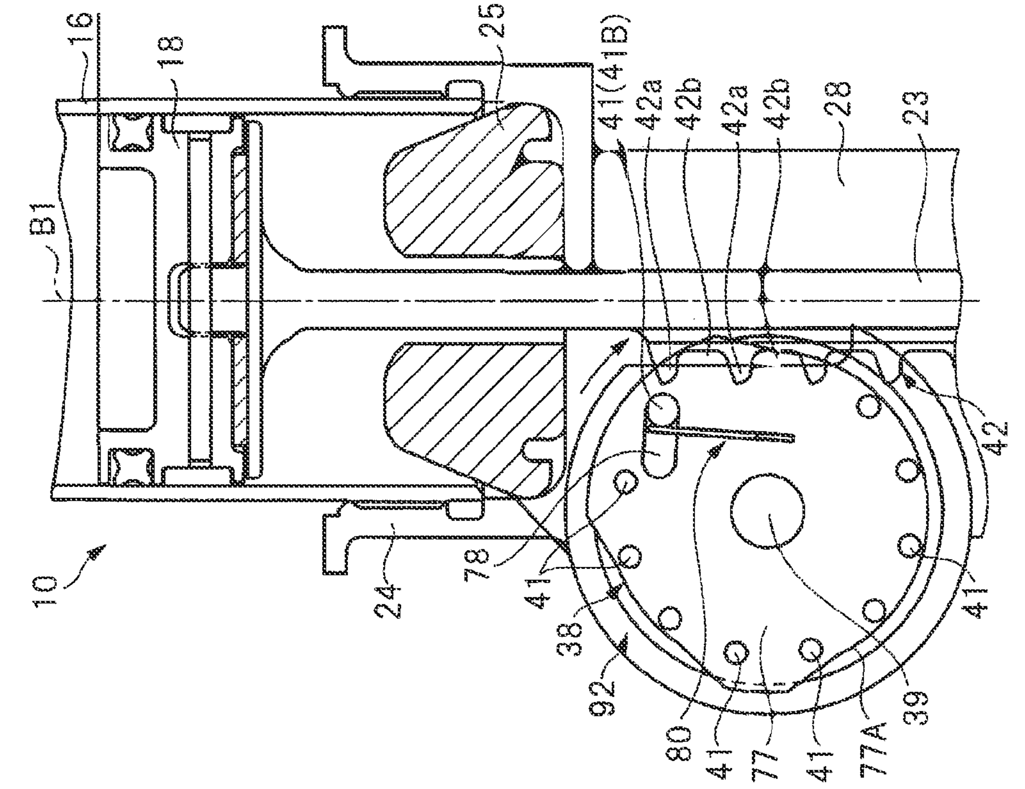
Figures 18A, 18B:
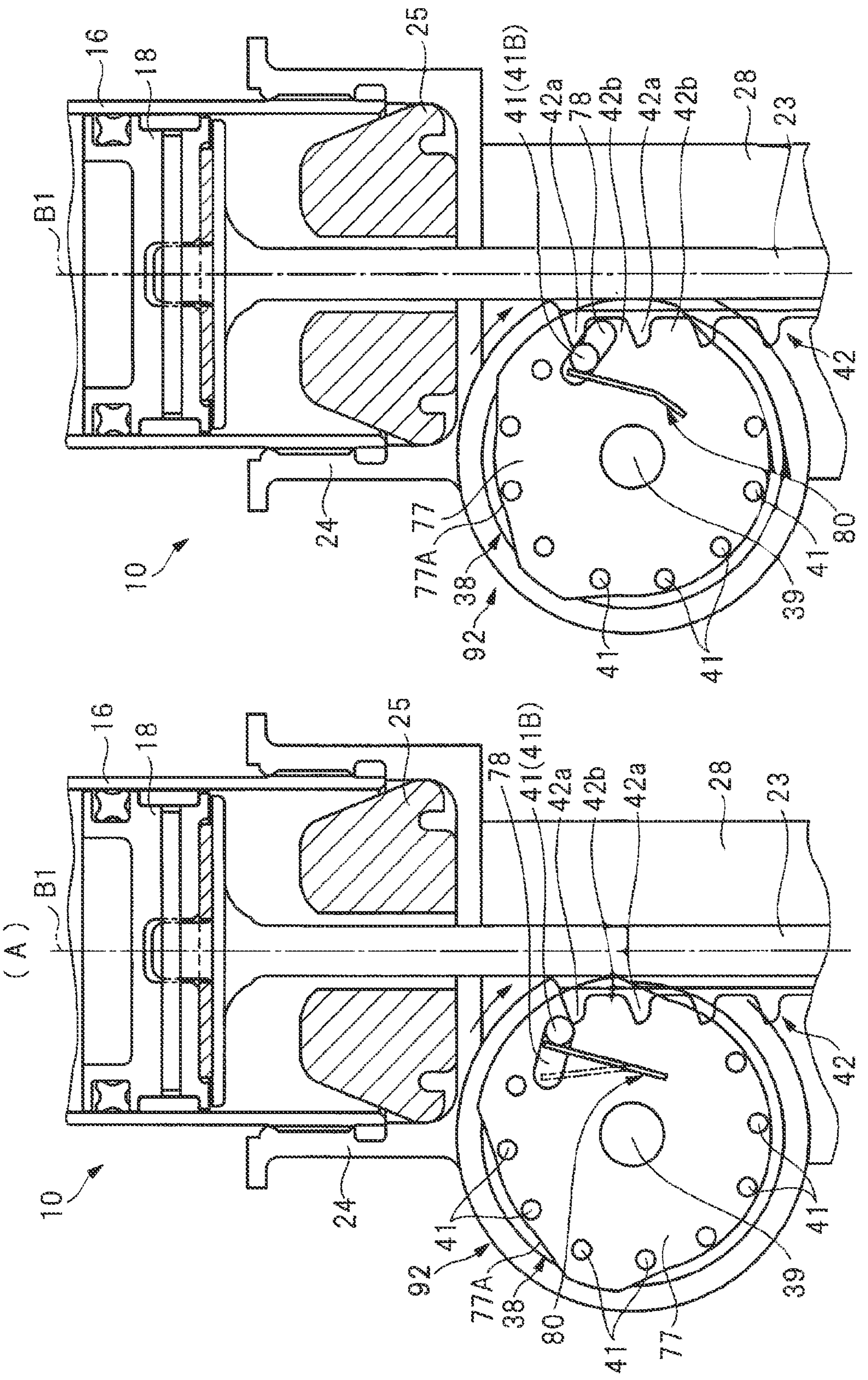
Figure 19B:
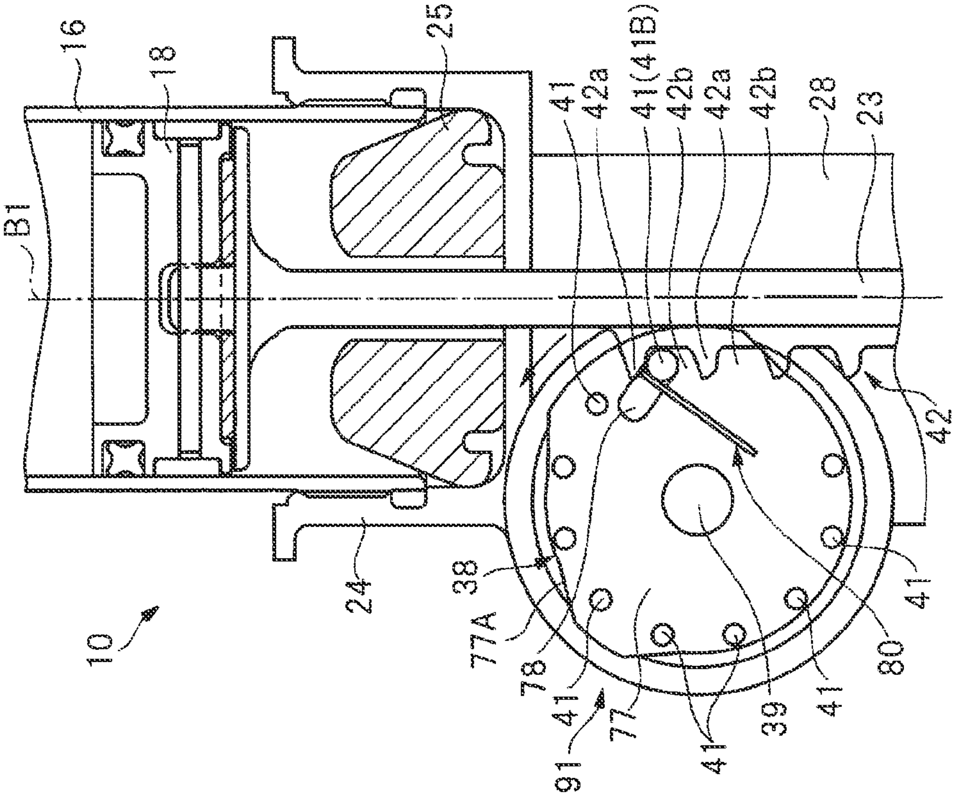
Figure 19A:
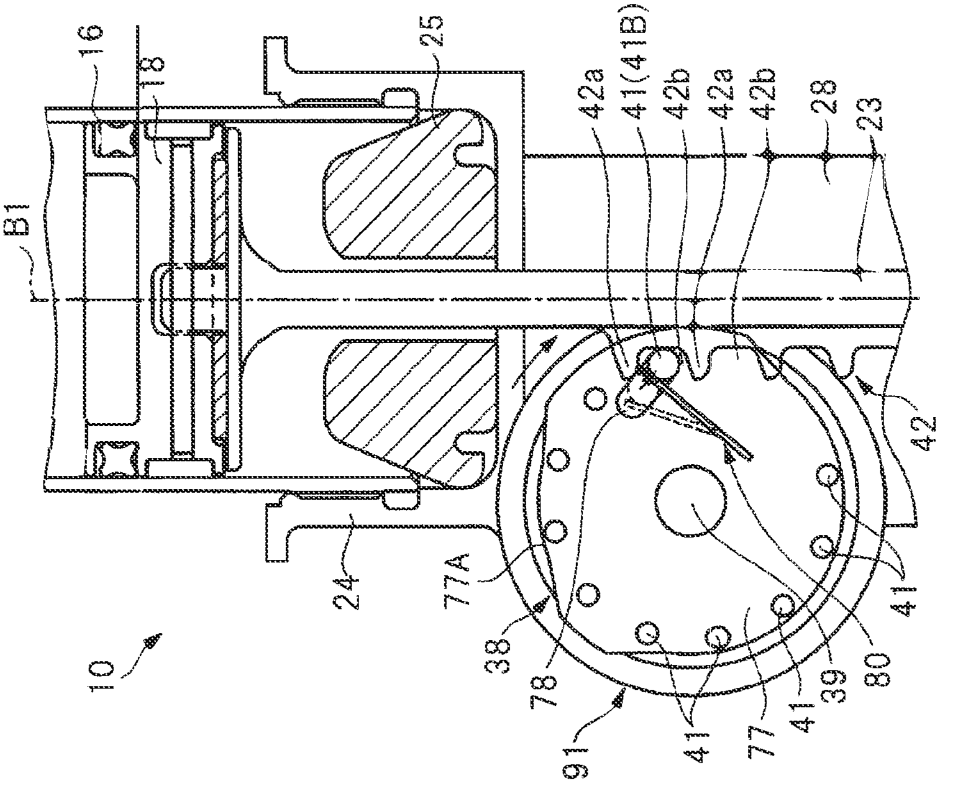
Figures 20A, 20B:
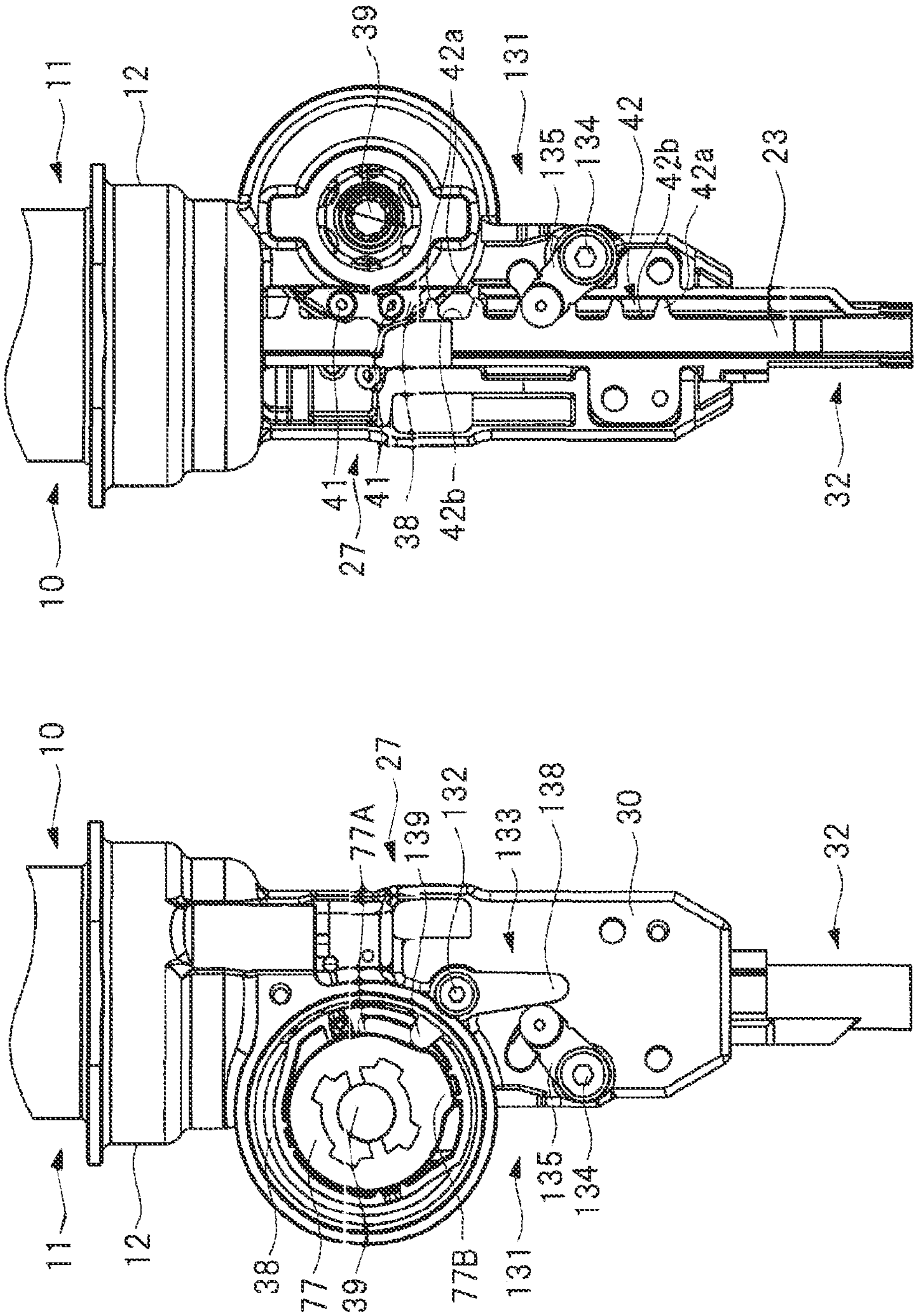
Figure 21:
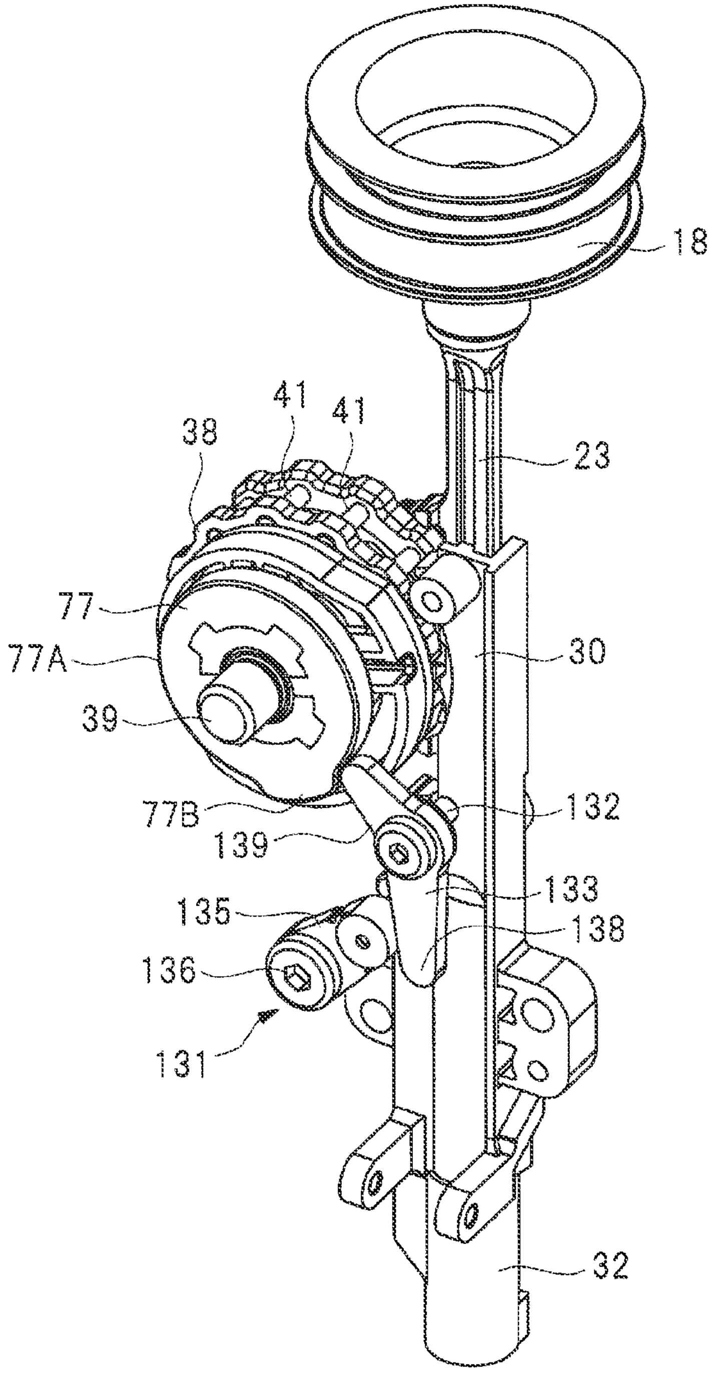
Figures 22A, 22B:
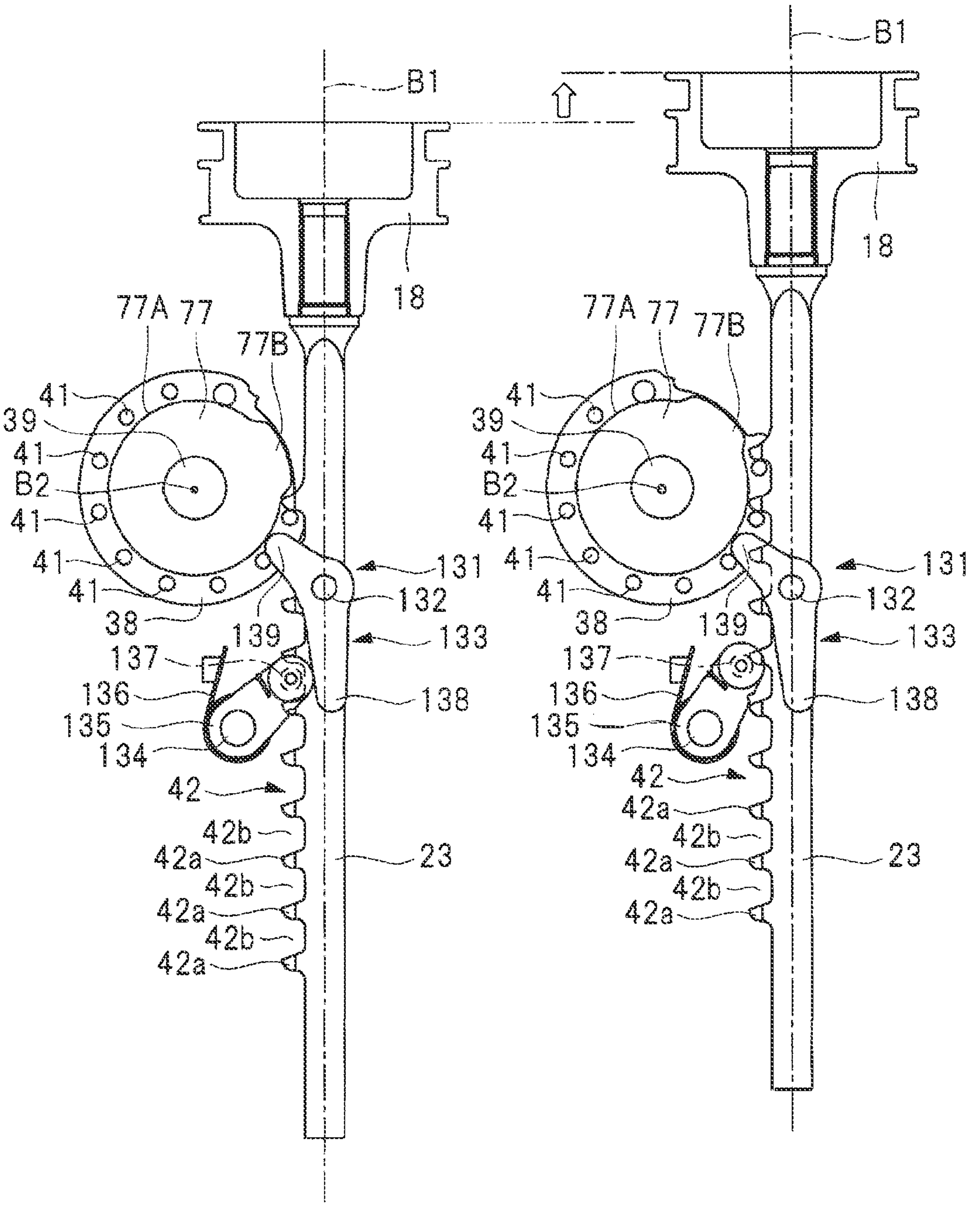
Figure 23A:
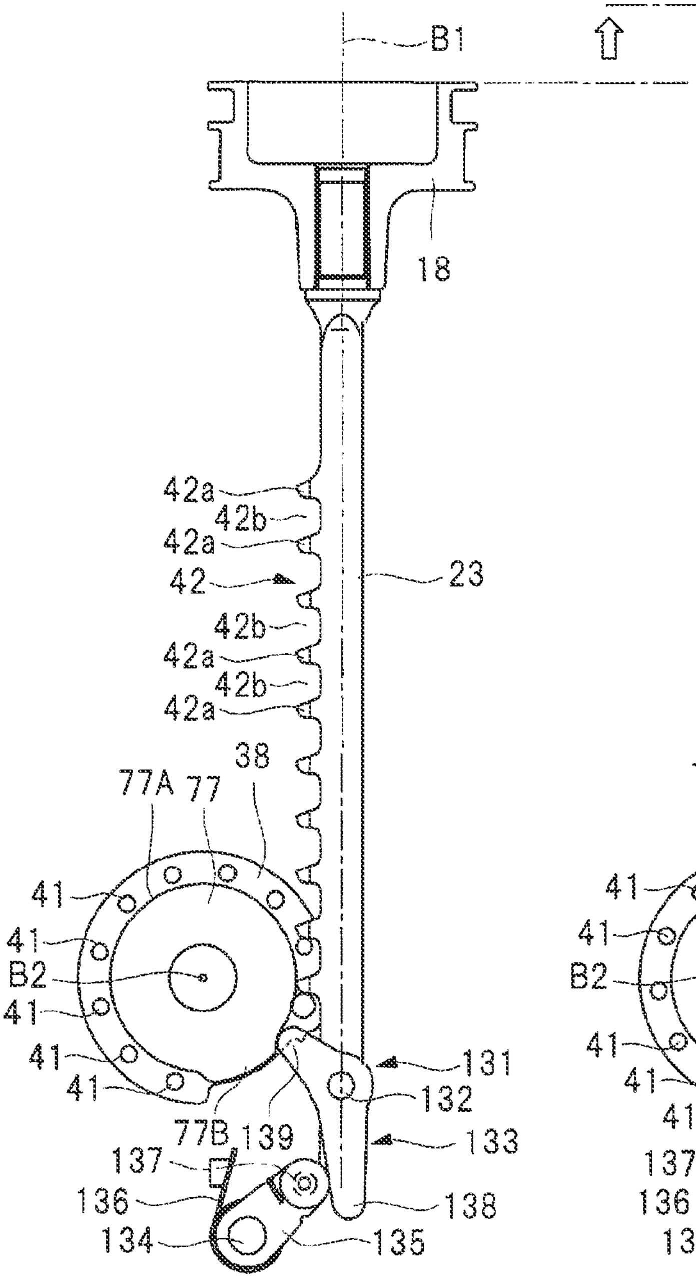
Figure 23B:
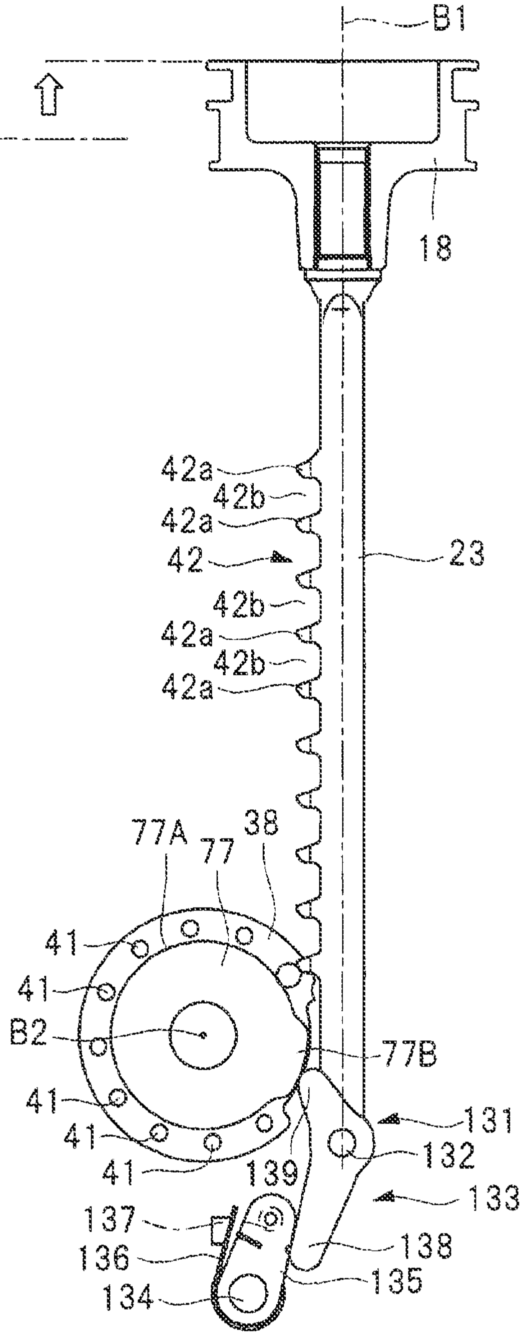
Figure 24:
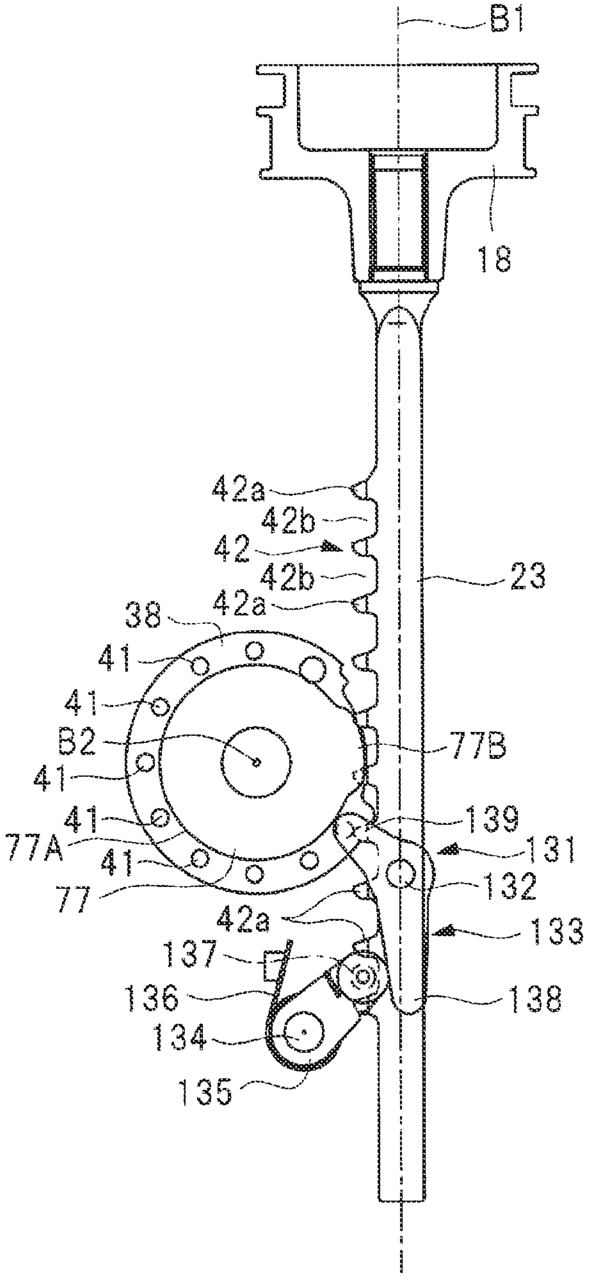
Figure 25:
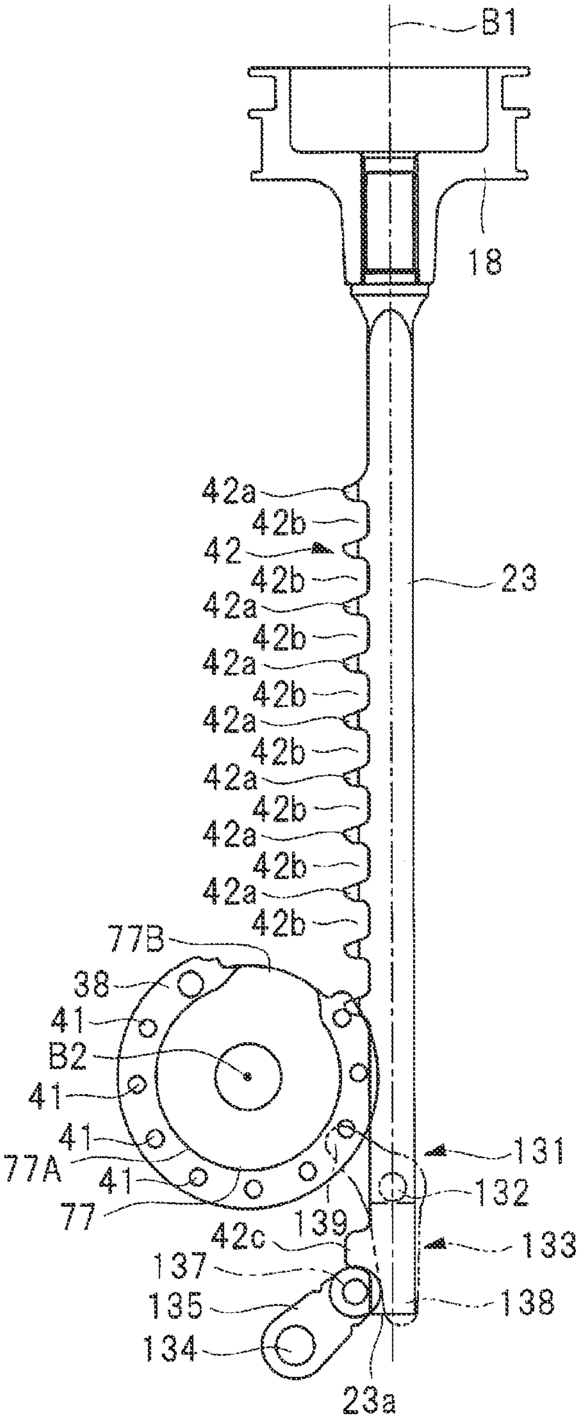
Figure 26:
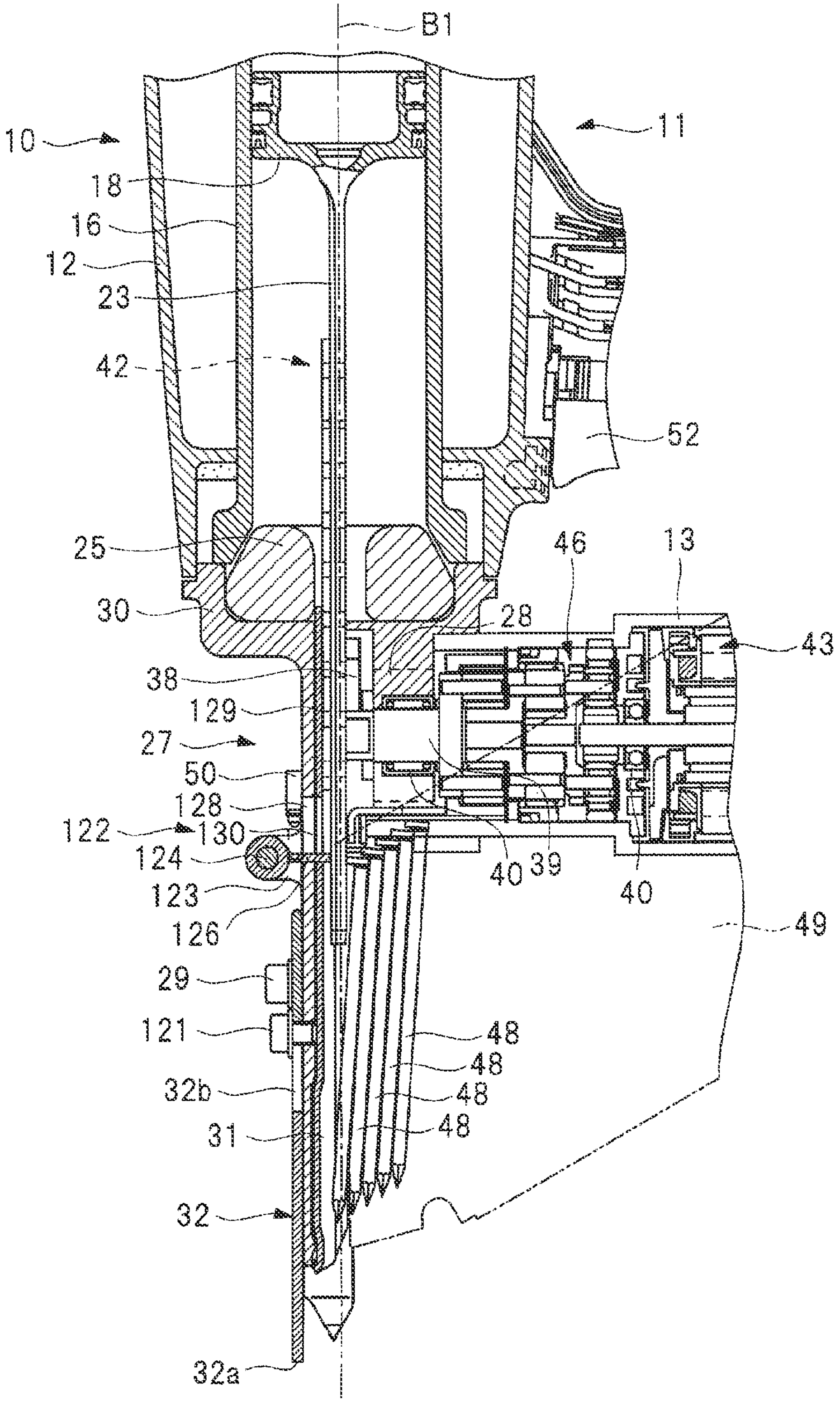
Figure 27B:
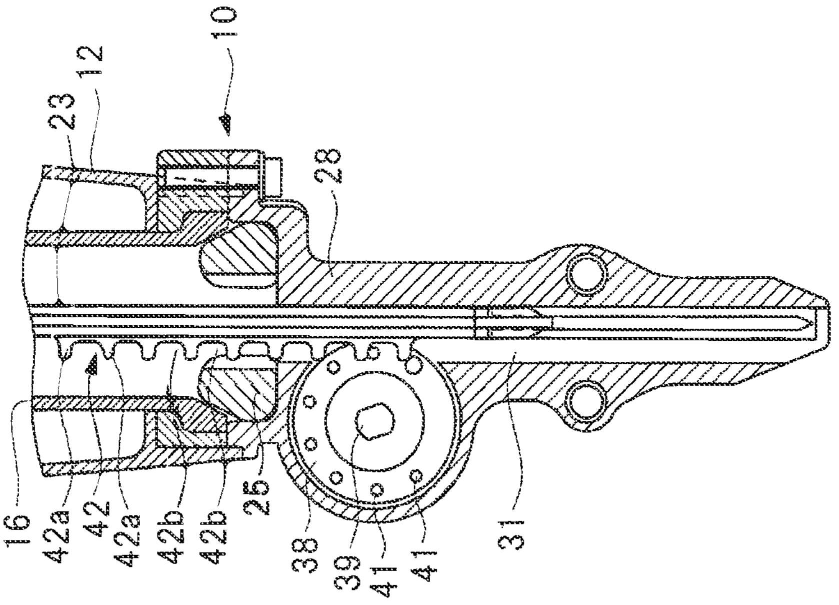
Figure 27A:
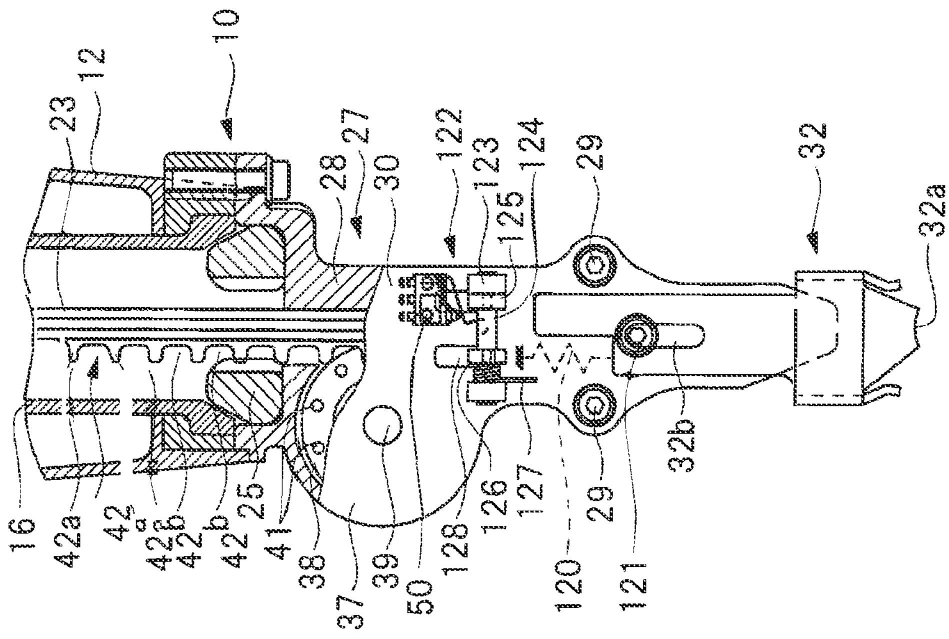
Figure 28:
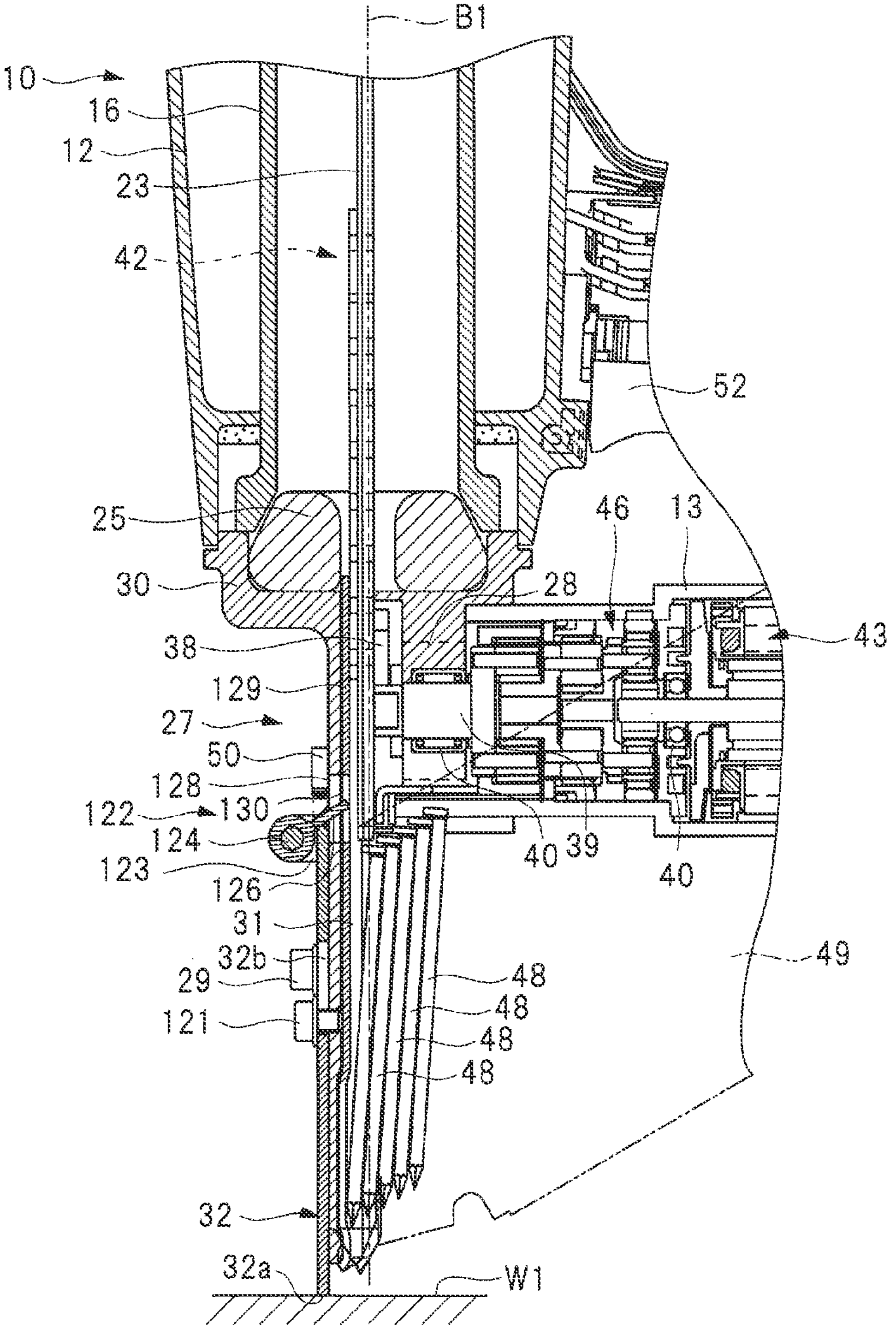
Figure 29:
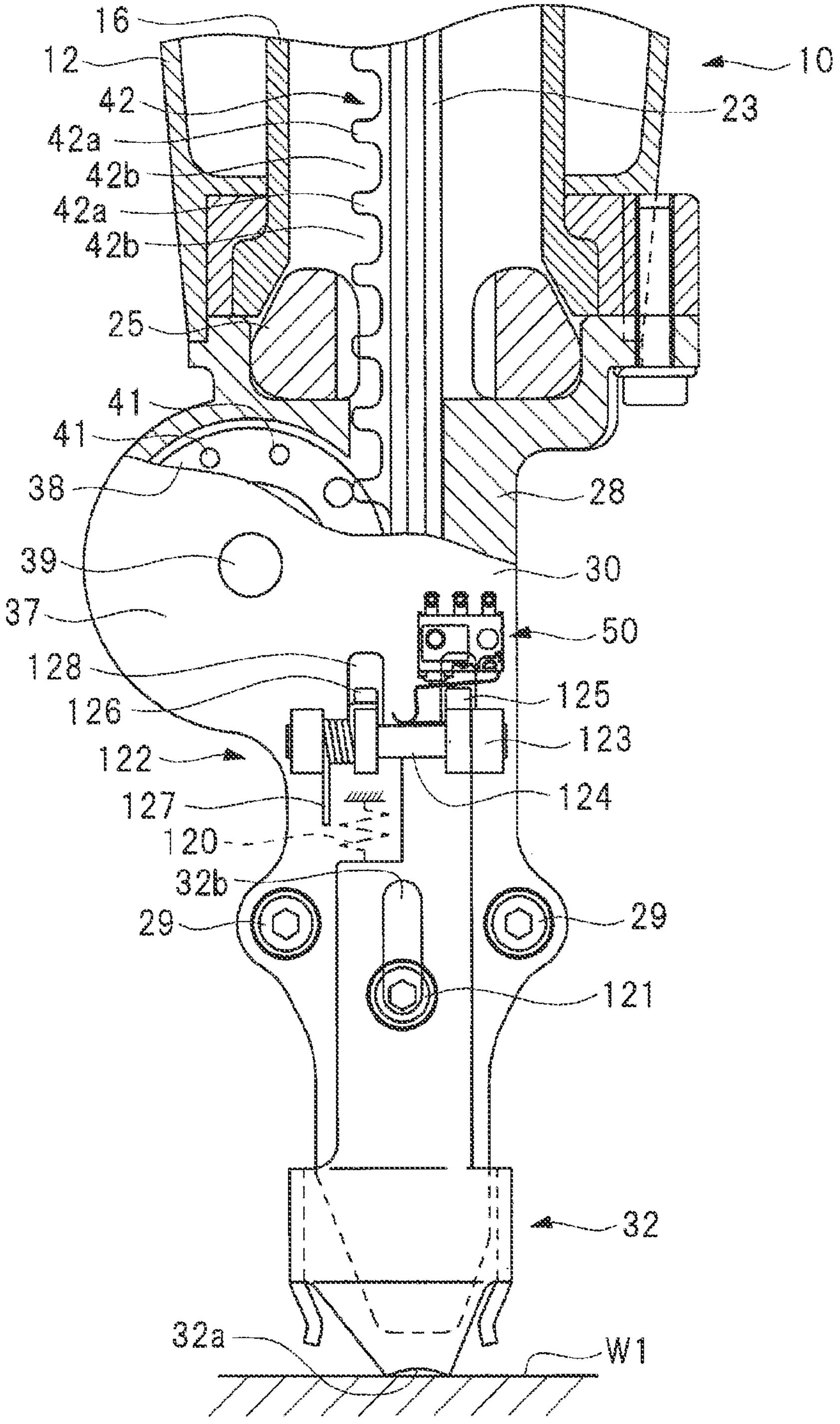
Figure 30:
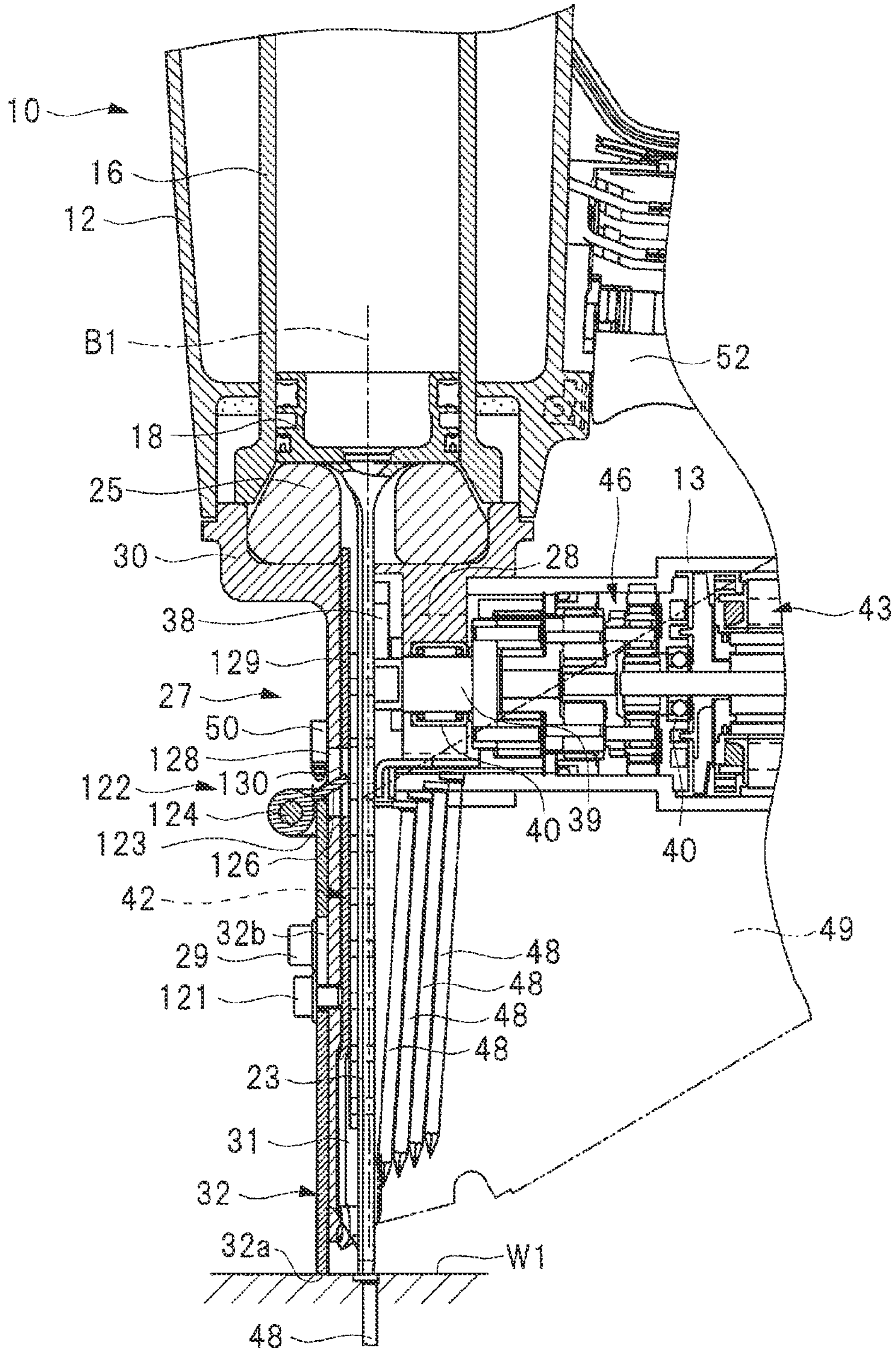
Figure 31:
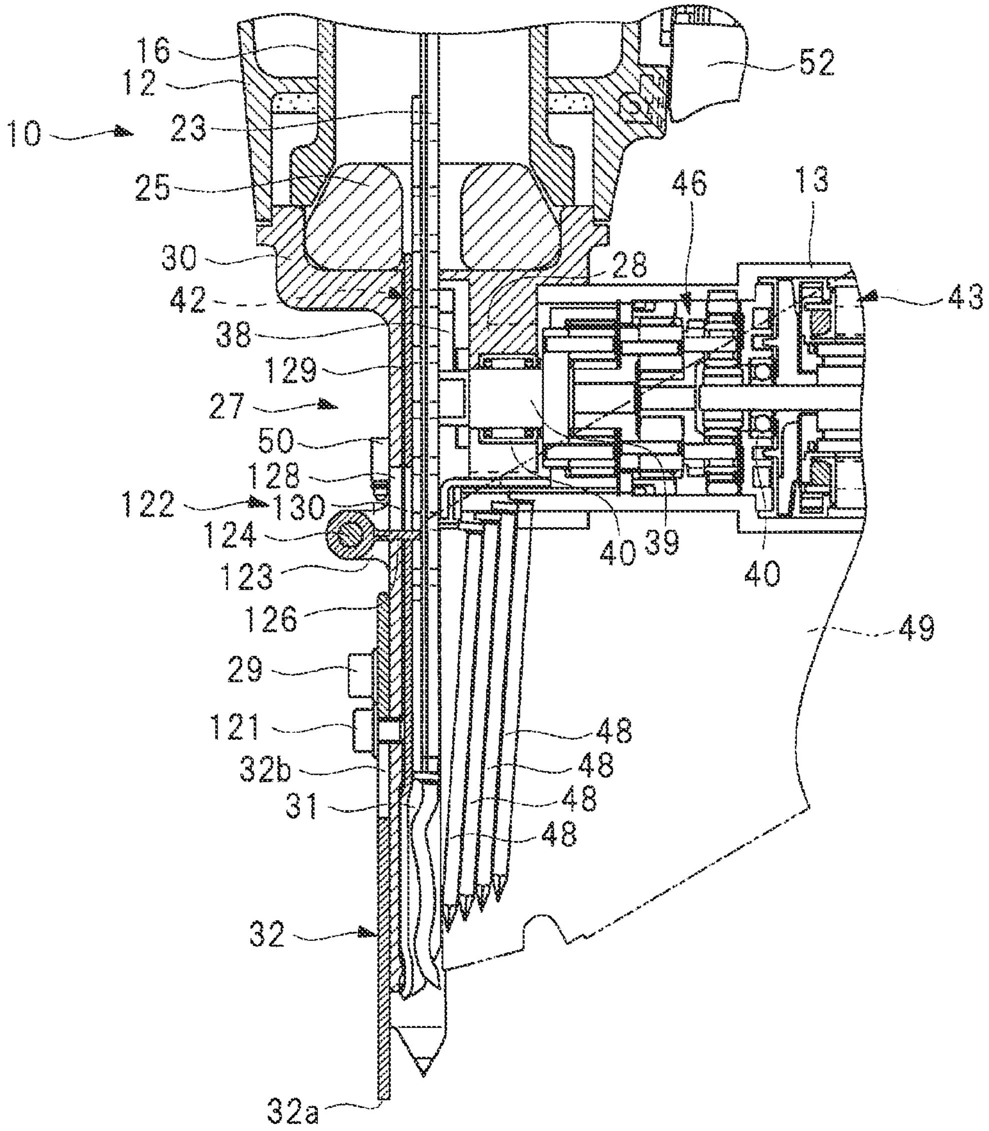
Figure 32:
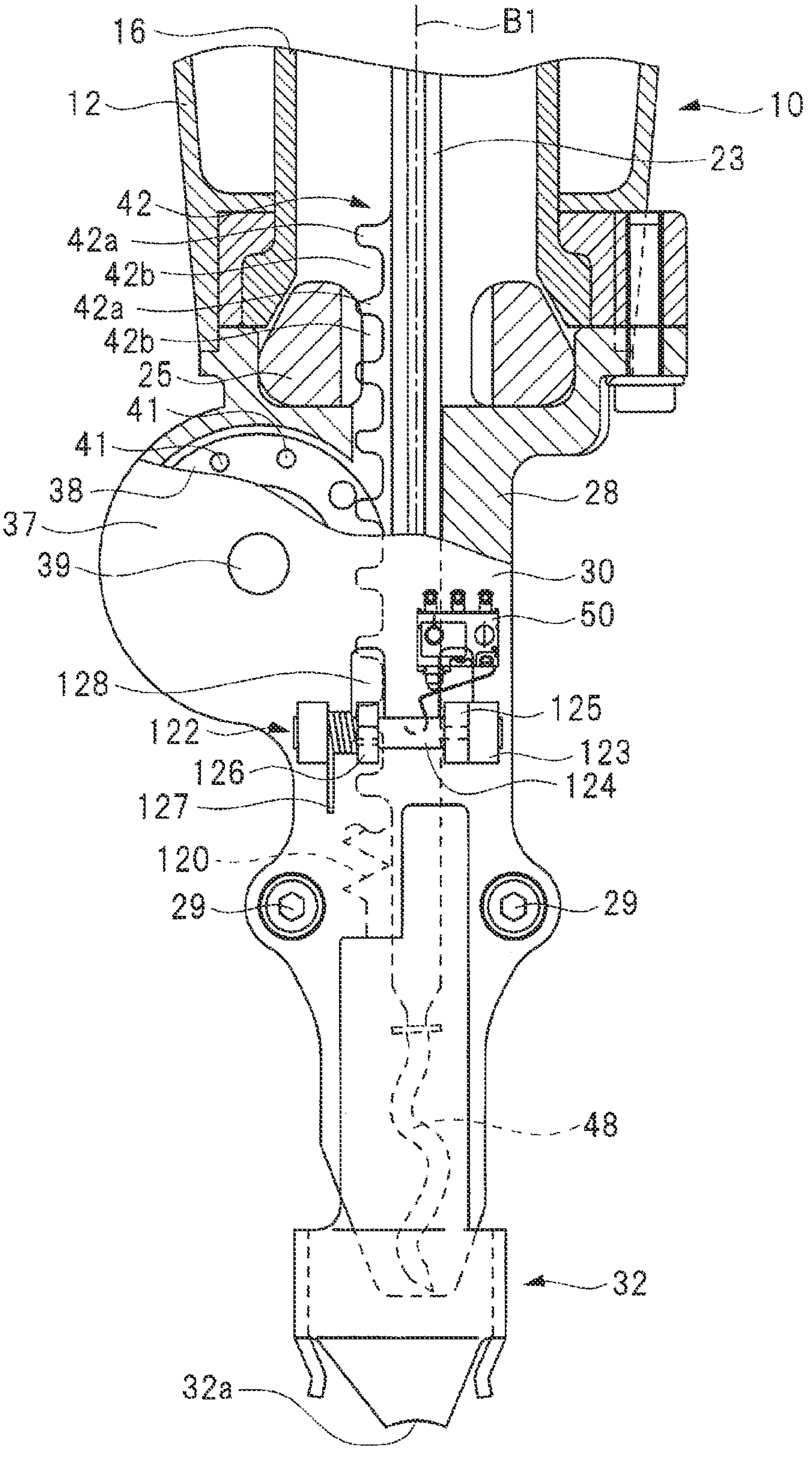
Figure 33:
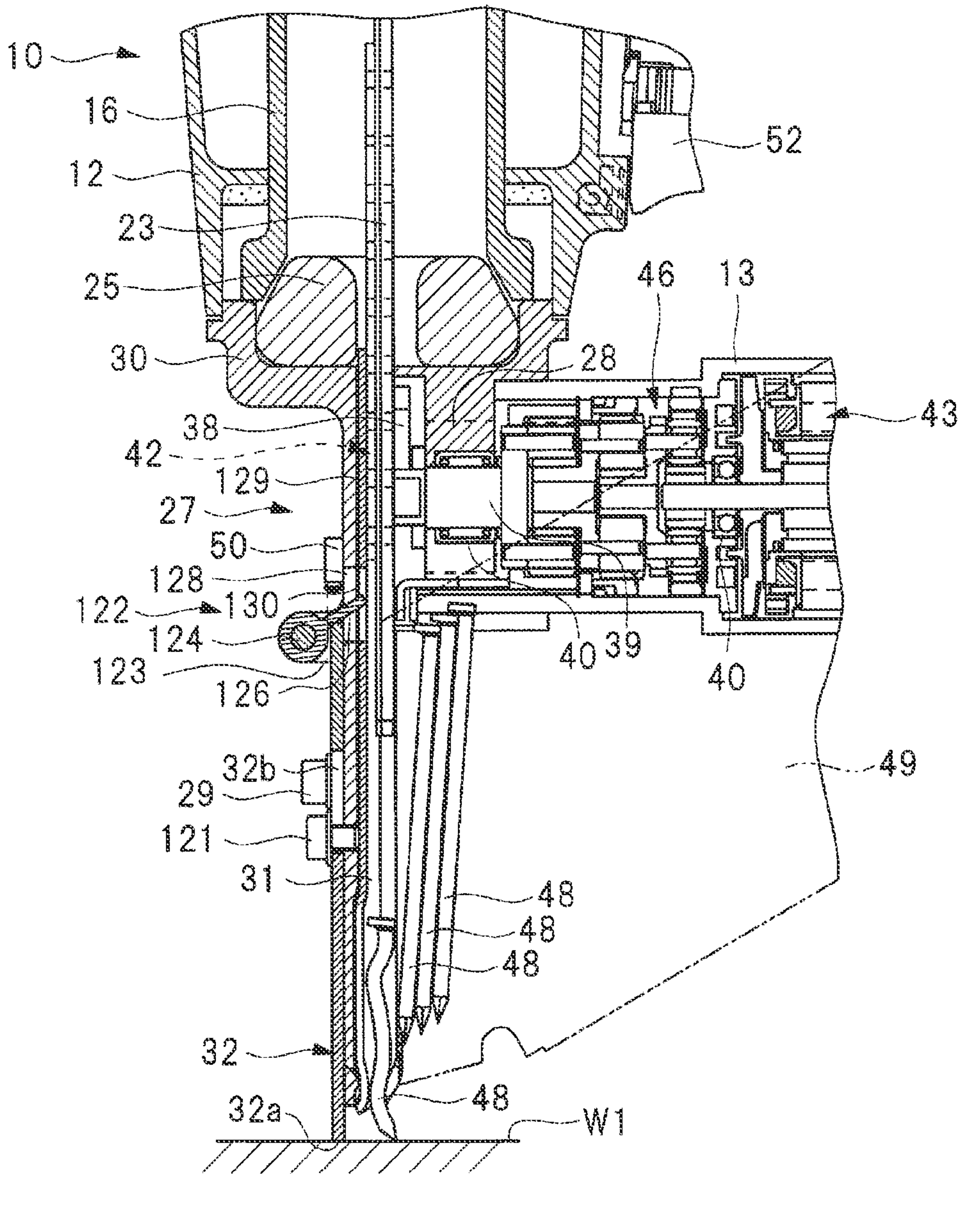
Figure 34:
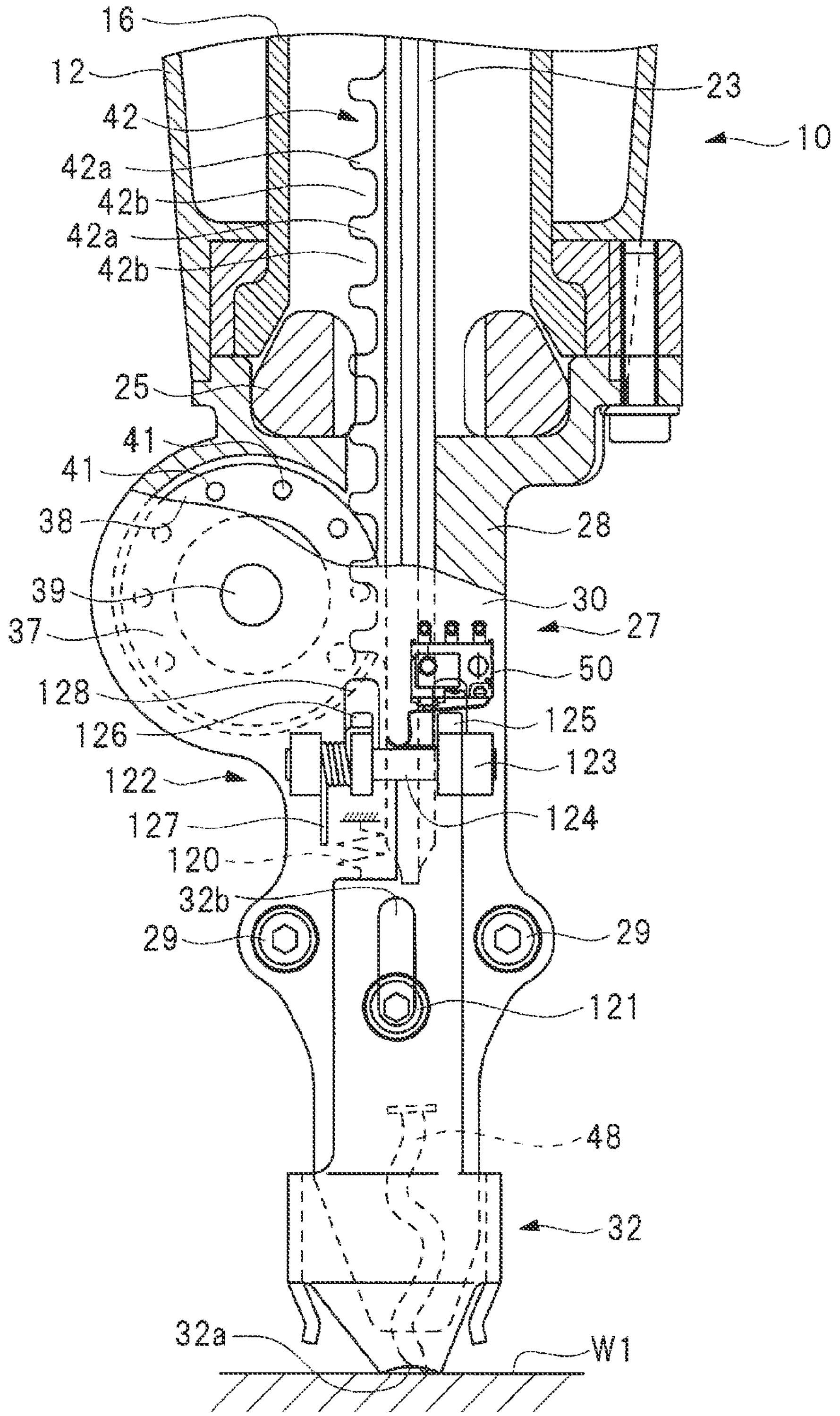
Figure 35:
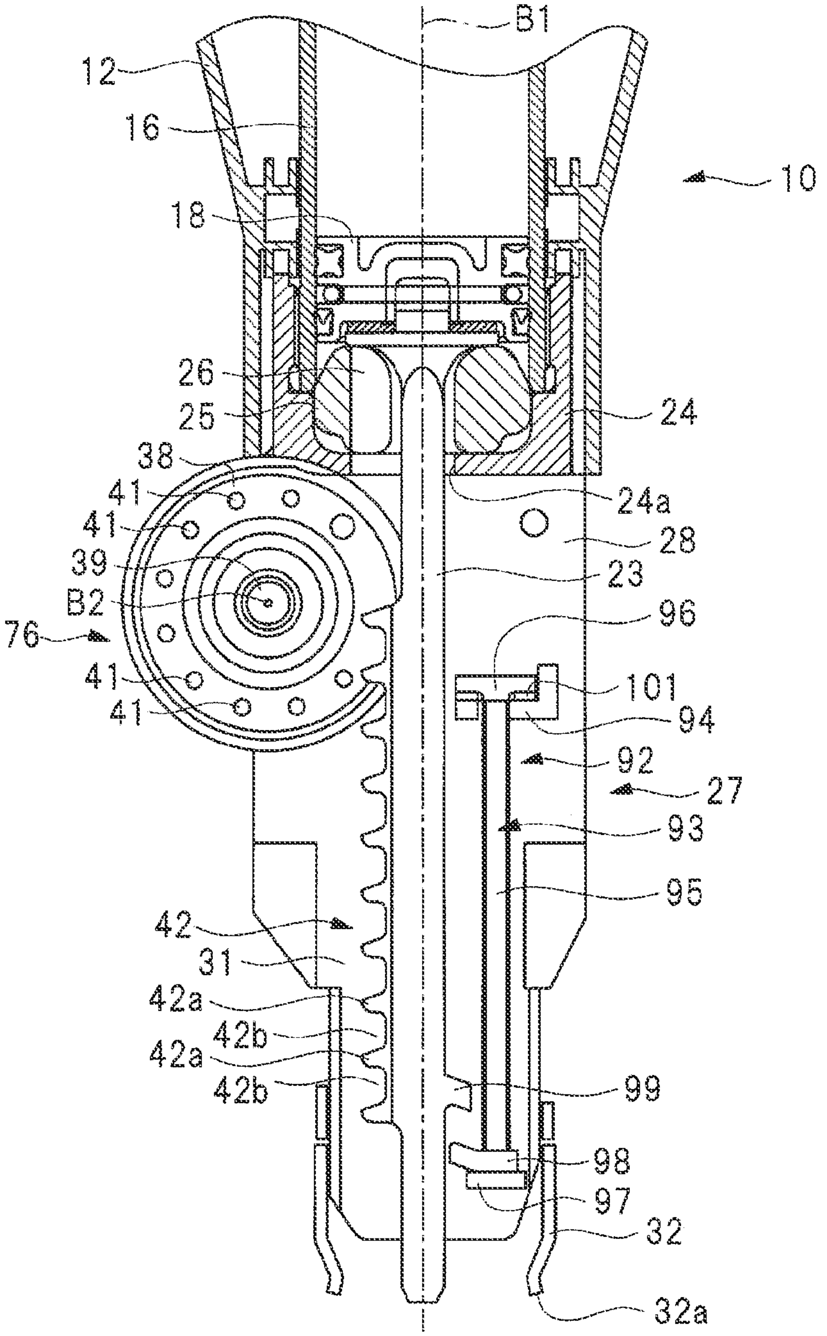
Figure 36:
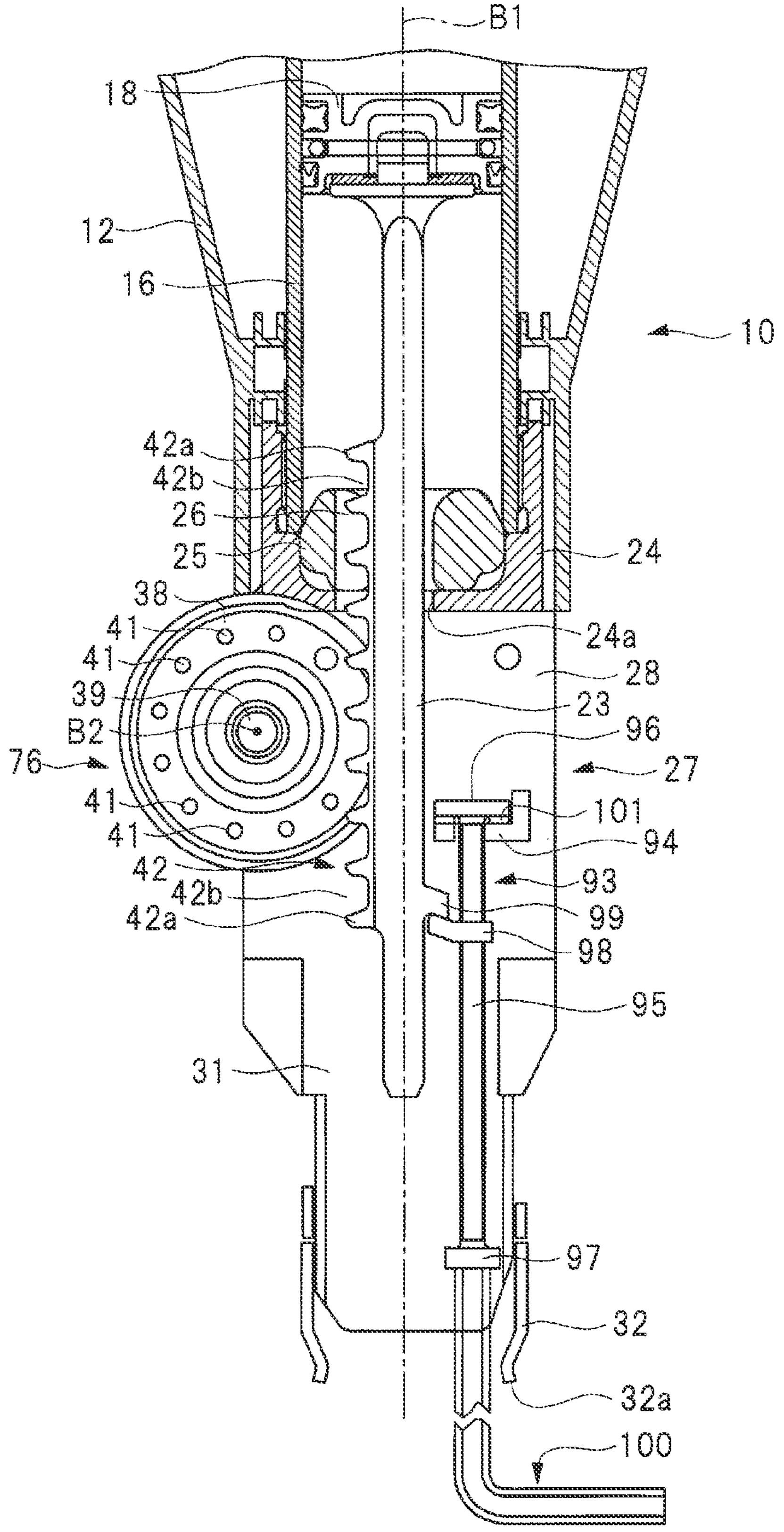
Figure 37:
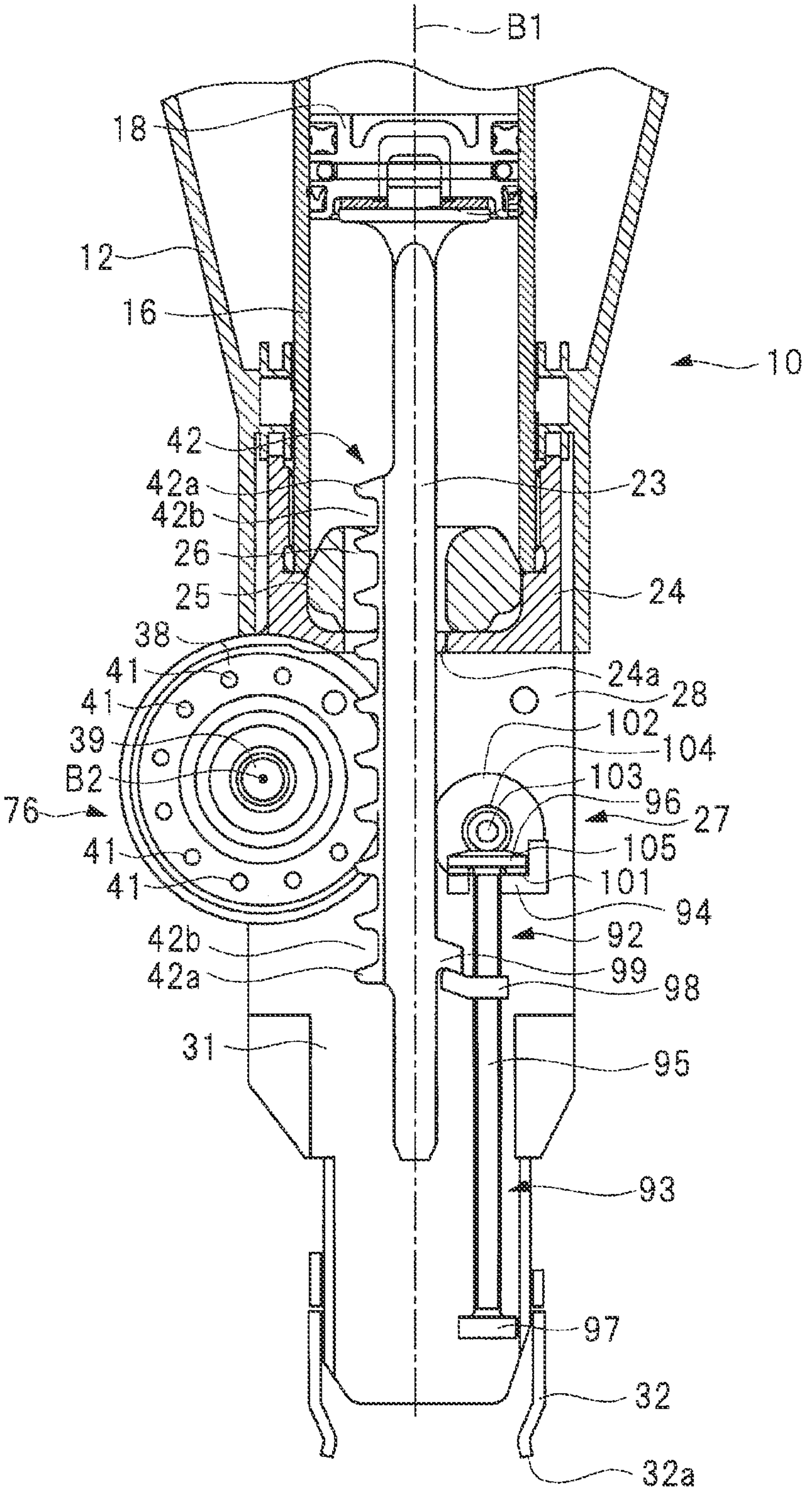
Figure 38:
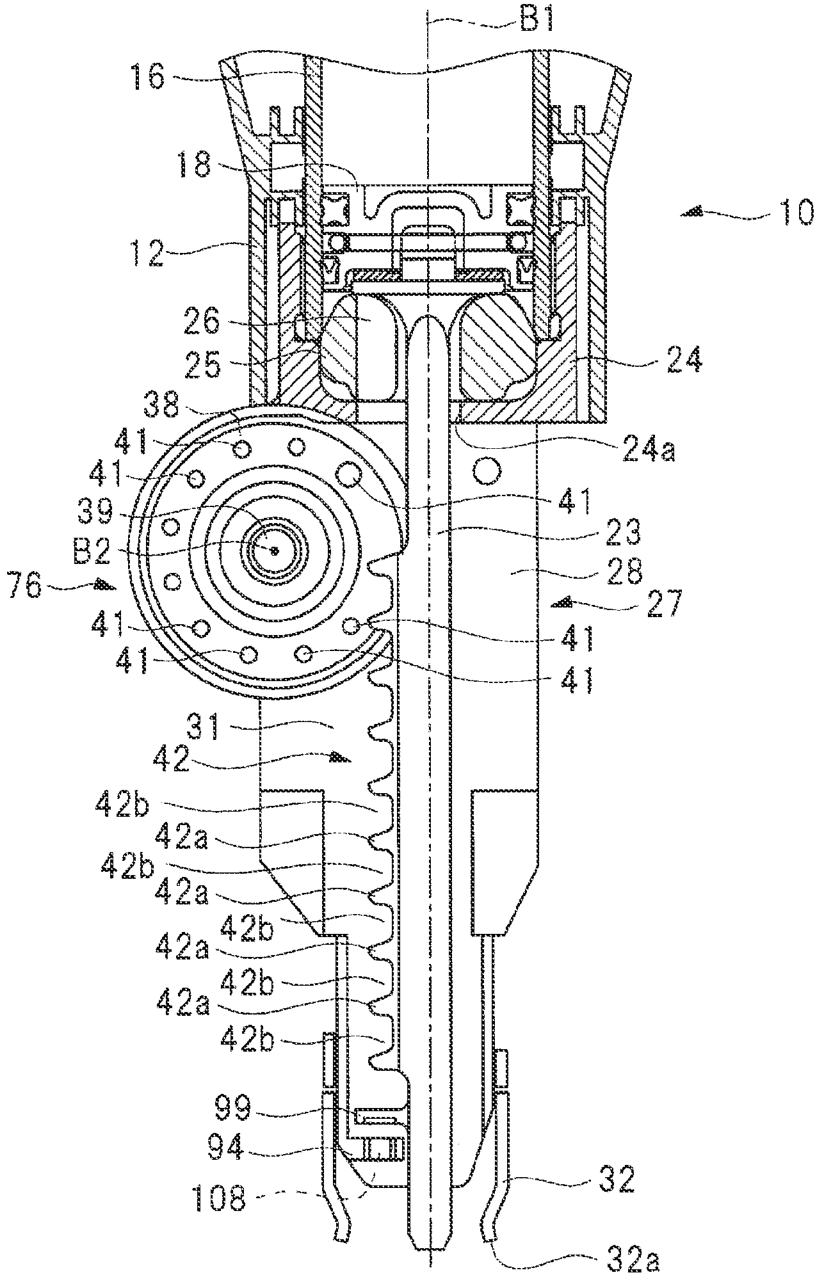
Figure 39:
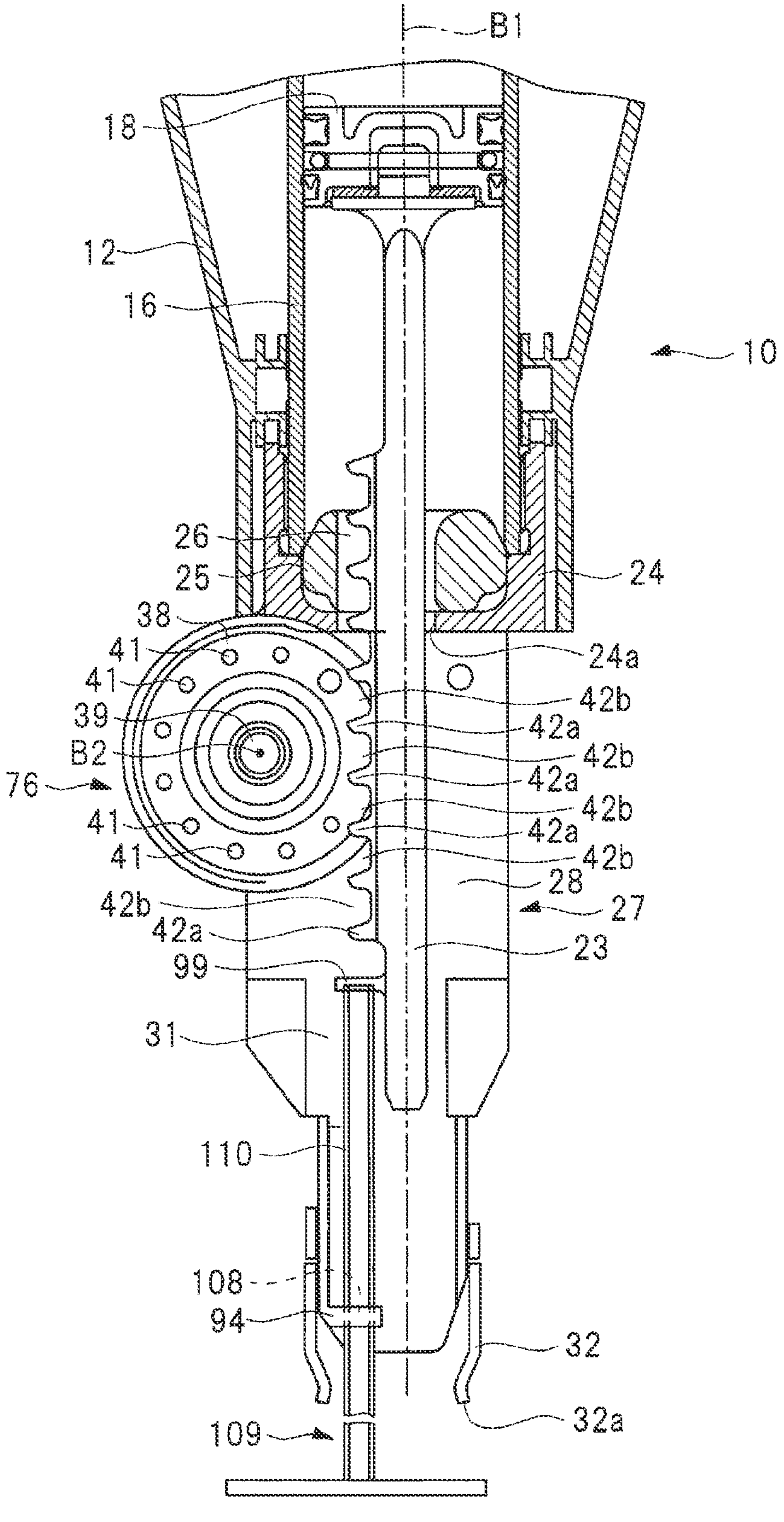
Figure 40:
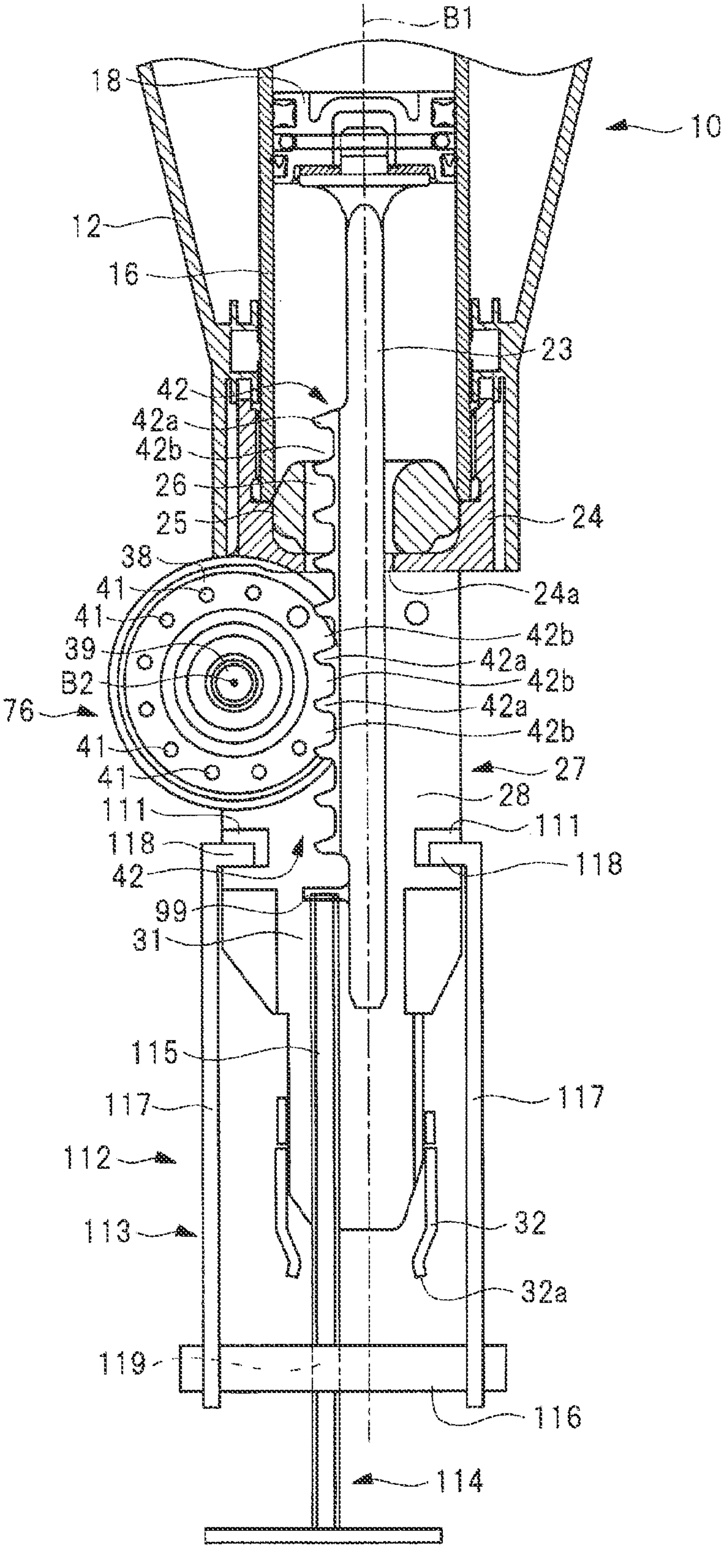

FIG. 14(A) and FIG. 14(B) are front cross-sectional views showing the second embodiment of the driver;

FIG. 15(A) and FIG. 15(B) are front cross-sectional views showing the second embodiment of the driver;

FIG. 16 is a block diagram showing a control system of the driver;

FIG. 17(A) and FIG. 17(B) are front cross-sectional views showing a third embodiment of the driver;

FIG. 18(A) and FIG. 18(B) are front cross-sectional views showing the third embodiment of the driver;

FIG. 19(A) and FIG. 19(B) are front cross-sectional views showing the third embodiment of the driver;

FIG. 20(A) and FIG. 20(B) are outline views showing a fourth embodiment of the driver;

FIG. 21 is a perspective view showing the fourth embodiment of the driver;

FIG. 22(A) and FIG. 22(B) are schematic views showing operation of the fourth embodiment of the driver;

FIG. 23(A) and FIG. 23(B) are schematic views showing the operation of the fourth embodiment of the driver;

FIG. 24 is a schematic view showing the operation of the fourth embodiment of the driver;

FIG. 25 is a schematic view showing the fourth embodiment of the driver;

FIG. 26 is a side cross-sectional view showing a fifth embodiment of the driver;

FIG. 27(A) and FIG. 27(B) are front cross-sectional views showing the fifth embodiment of the driver;

FIG. 28 is a side cross-sectional view showing the fifth embodiment of the driver;

FIG. 29 is a front cross-sectional view showing the fifth embodiment of the driver;

FIG. 30 is a side cross-sectional view showing the fifth embodiment of the driver;

FIG. 31 is a side cross-sectional view showing the fifth embodiment of the driver;

FIG. 32 is a front cross-sectional view showing the fifth embodiment of the driver;

FIG. 33 is a side cross-sectional view showing the fifth embodiment of the driver;

FIG. 34 is a front cross-sectional view showing the fifth embodiment of the driver;

FIG. 35 is a front cross-sectional view showing a first specific example of a sixth embodiment of the driver;

FIG. 36 is a front cross-sectional view showing the first specific example of the sixth embodiment of the driver;

FIG. 37 is a front cross-sectional view showing a second specific example of the sixth embodiment of the driver;

FIG. 38 is a front cross-sectional view showing a third specific example of the sixth embodiment of the driver;

FIG. 39 is a front cross-sectional view showing the third specific example of the sixth embodiment of the driver; and FIG. 40 is a front cross-sectional view showing a fourth specific example of the sixth embodiment of the driver.

BEST MODE FOR CARRYING OUT THE INVENTION

Hereinafter, embodiments of a driver will be described in detail based on the drawings. In each of the drawings, the common members are denoted with the same reference symbol.

First Embodiment

A driver 10 shown in FIG. 1 to FIG. 10 has a housing 11, the housing 11 has a cylinder case 12, a motor case 13 continuing to the cylinder case 12, a handle 14 continuing to the cylinder case 12, and an attachment part 15 continuing to the handle 14 and the motor case 13. The housing 11 is assembled so as to fix two component pieces to each other. The two component pieces are separately formed of a synthetic resin such as nylon, polycarbonate, or others.

A cylindrically-shaped cylinder 16 is provided in the cylinder case 12. A holder 17 is provided in the cylinder case 12, and the cylinder 16 is positioned by the holder 17 in the radial direction. Also, a piston 18 is movably disposed in the cylinder 16. The operating direction of the piston 18 is a center line B1 direction of the cylinder 16.

A pressure accumulation container 19 is provided in the cylinder case 12, the pressure accumulation container 19 and the cylinder 16 are coupled to each other by a coupling member 20. The coupling member 20 is annular, and a pneumatic chamber 21 is formed from the inside of the pressure accumulation container 19 to the inside of the cylinder 16. A seal member 22 is attached to an outer peripheral surface of the piston 18, and the seal member 22 seals the pneumatic chamber 21 so as to be airtight. A driver blade 23 is attached to the piston 18.

A holder 24 is provided in the housing 11, and the cylinder 16 is supported by the holder 24 in the center line B1 direction. The holder 24 is disposed at a location opposite to a location where the pressure accumulation container 19 is disposed in the center line B1 direction of the cylinder 16. The holder 24 supports a bumper 25, and the bumper 25 is integrally formed of a rubber-like elastic body. A shaft hole 24*a* is provided in the holder 24, and a guide hole 26 is provided in the bumper 25. The driver blade 23 is movable in the shaft hole 24*a* and the guide hole 26 in the center line B1 direction. The present embodiment exemplifies a structure in which the center line B1 passes through the center of the driver blade 23 in a plane crossing the center line B1. When the piston 18 operates to cause the driver blade 23 or the piston 18 to collide with the bumper 25, the bumper 25 attenuates or reduces the impact load.

Figure 11:
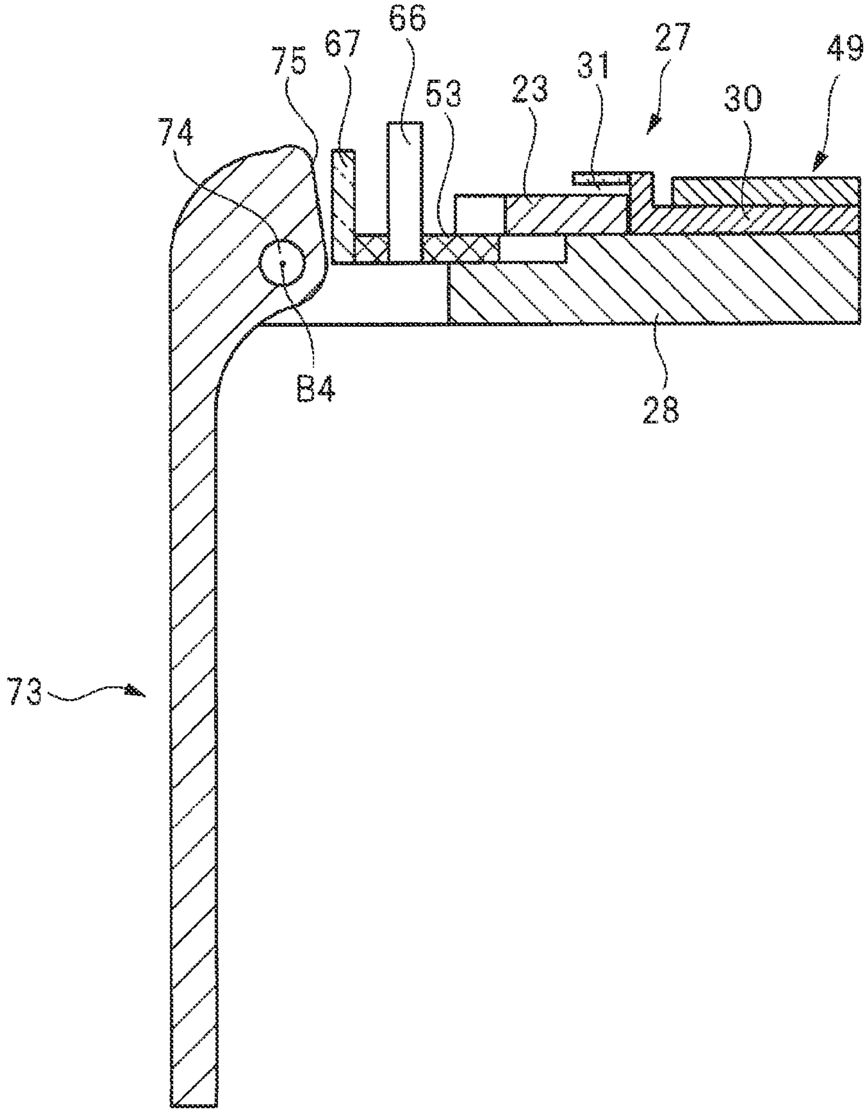
FIG. 11 is a bottom cross-sectional view of the driver.
Figure 12:
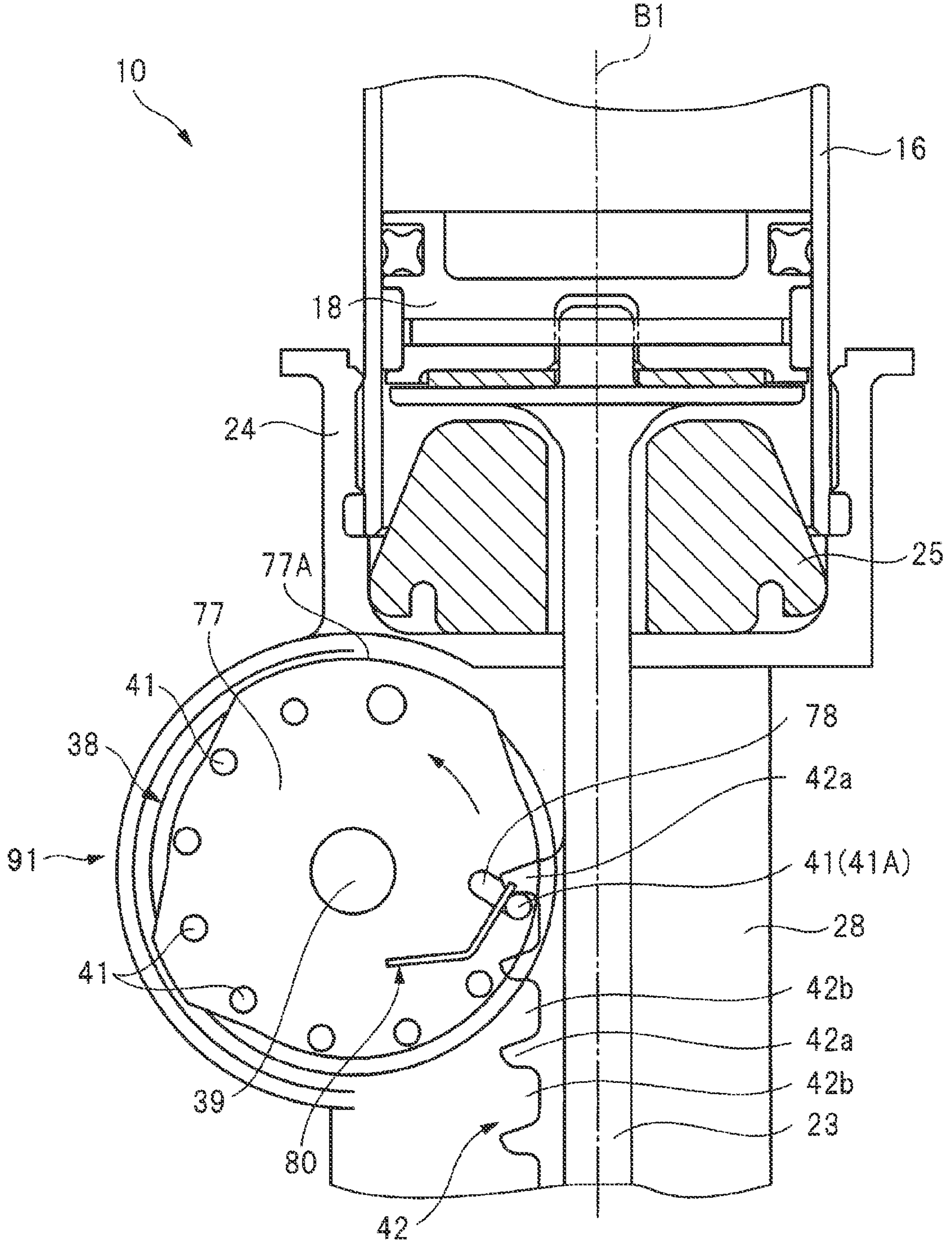
FIG. 12 is a front cross-sectional view showing a second embodiment of the driver.

An ejection part 27 is attached to the holder 24. The ejection part 27 is disposed so as to be in line with the holder 24 in the center line B1 direction. The ejection part 27 is disposed from the inside of the housing 11 to the outside of the housing 11. The ejection part 27 has a blade guide 28 and a cover 30 fixed to the blade guide 28. The cover 30 is fixed to the blade guide 28 by using a screw member 29. An ejection path 31 is formed between the blade guide 28 and the cover 30. The ejection path 31 is a guide hole disposed along the center line B1 direction. The driver blade 23 can reciprocate inside the ejection path 31 in the center line B1 direction. In FIG. 11 as a bottom view perpendicular to the center line B1, an outer peripheral shape of the driver blade 23 is a rectangle. The driver blade 23 is disposed from the inside of the cylinder 16 to the ejection path 31.

A push rod 32 is attached to the blade guide 28. The push rod 32 is disposed outside the housing 11. The push rod 32 has a slide hole 32*b*, and a screw member 121 inserted into the slide hole 32*b* is fastened and fixed to the cover 30. The push rod 32 is movable with respect to the cover 30 in the center line B1 direction. A distal end 32*a* of the push rod 32 is pushed against a driven member W1. An ejection port 31*a* is provided at a location of the ejection path 31, the location being the closest to the distal end 32*a*.

Figure 3:
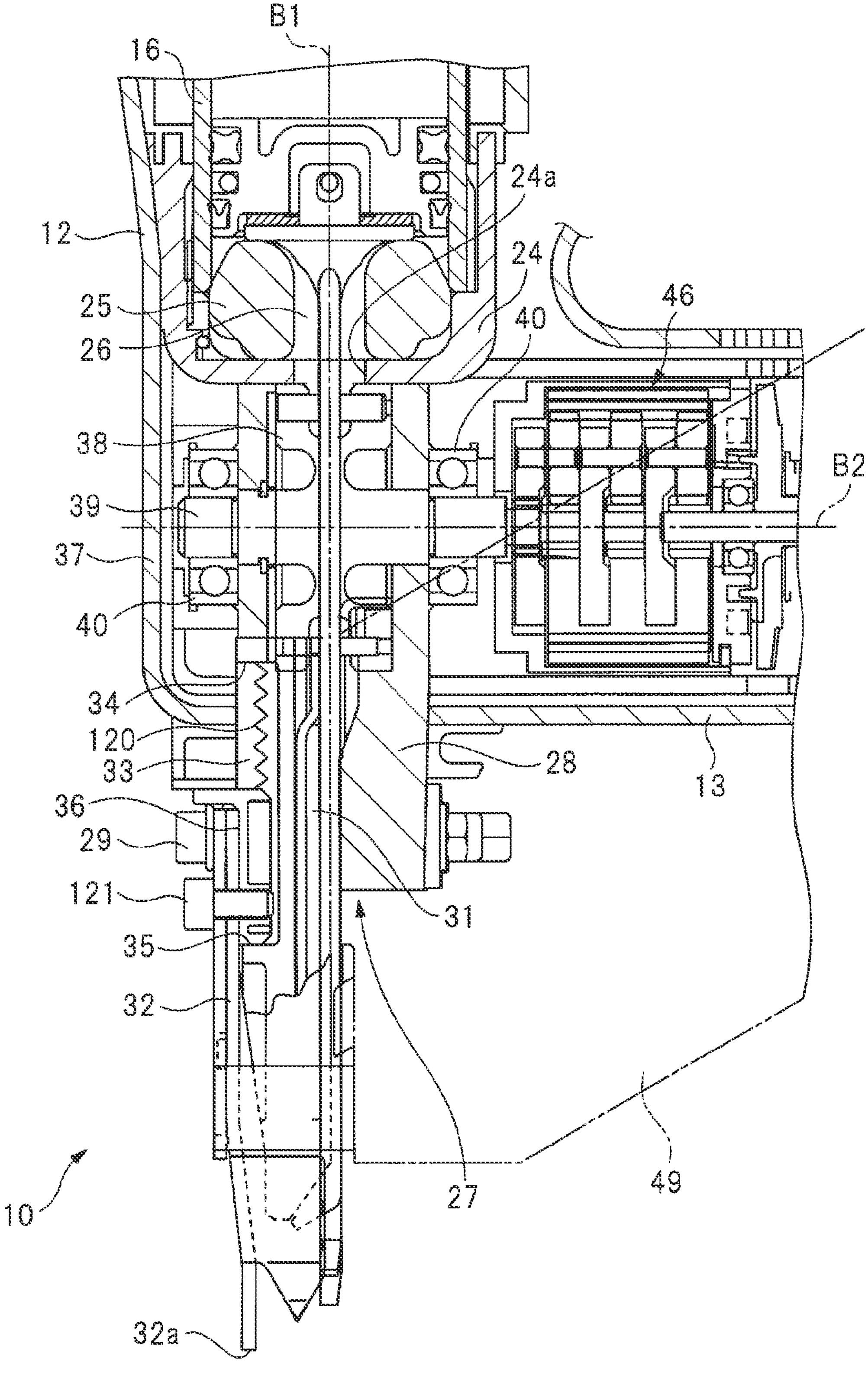
FIG. 3 is a partial side cross-sectional view of the driver shown in FIG. 1.

As shown in FIG. 3, a guide groove 33 is provided to the blade guide 28. The guide groove 33 has an inner surface configuring a first stopper wall 34 and a second stopper wall 35. A contactor 36 is fixed to the push rod 32, and a compression coil spring 120 is provided between the contactor 36 and the first stopper wall 34. The push rod 32 is pushed in a direction of being away from the bumper 25, that is, pushed downward in FIG. 3, by a force of the compression coil spring 120. The push rod 32 is movable within a certain range in the center line B1 direction.

An accommodation part 37 continuing to the cylinder case 12 and the motor case 13 is provided. That is, the accommodation part 37 configures a part of the housing 11. Explanation will be made about a structure of a motive power mechanism 76 which operates the driver blade 23 in a direction of approaching the pneumatic chamber 21 so as to be against the force of the pneumatic chamber 21. A rotary component 38 is provided in the accommodation part 37. The rotary component 38 is a component which operates the piston 18 in a direction of approaching the pneumatic chamber 21. The rotary component 38 is fixed to a drive shaft 39, and the drive shaft 39 is supported by two bearings 40 so as to be rotatable about a center line B2.

Figure 4:
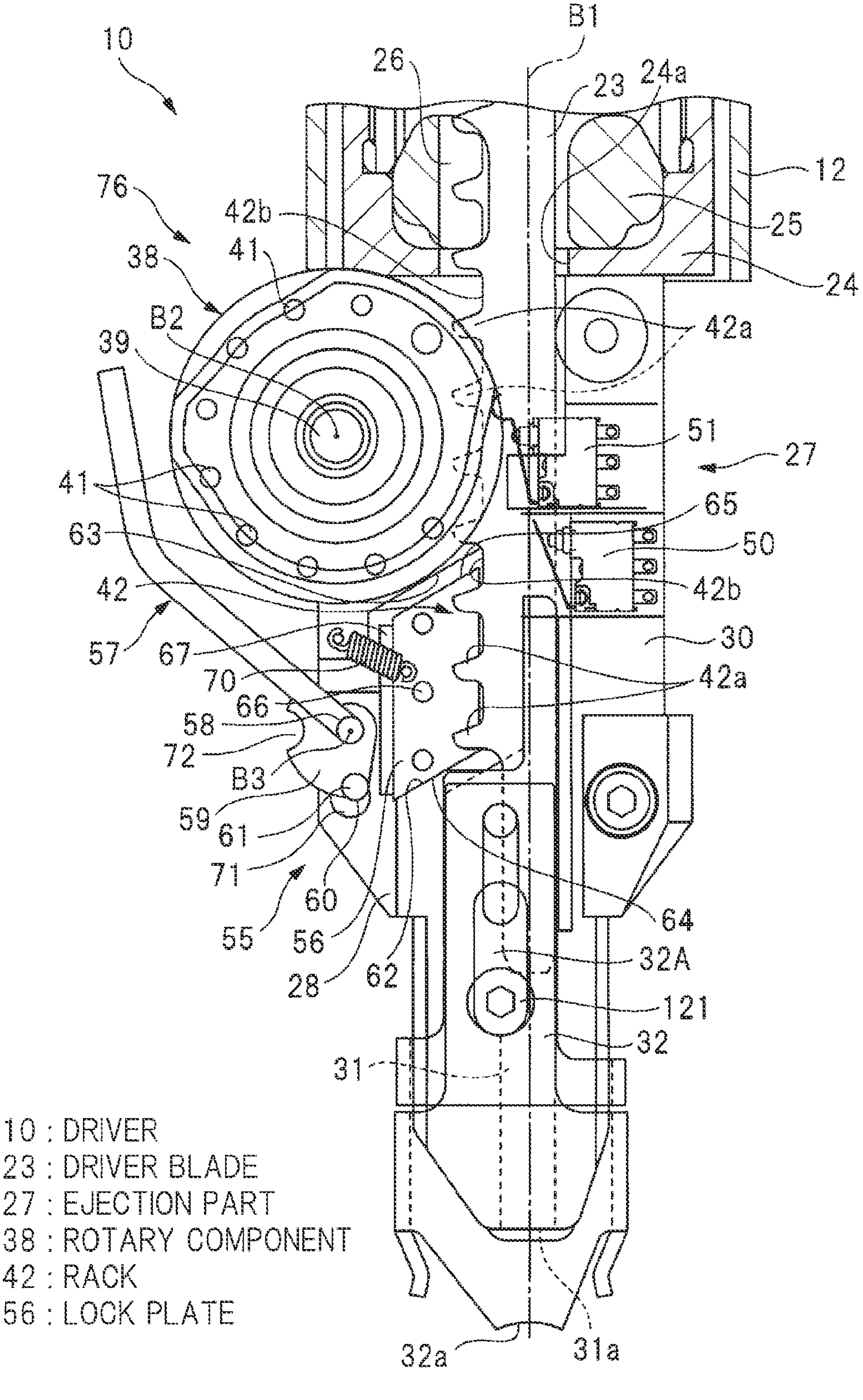
FIG. 4 is a front view showing a fixing mechanism provided to the driver shown in FIG. 1.

The center line B2 is disposed so as to cross the center line B1 in a side view of the driver 10 shown in FIG. 3. While FIG. 3 shows an example in which the center line B1 and the center line B2 form a right angle, the center line B1 and the center line B2 does not form the right angle. Note that the center line B1 and the center line B2 do not cross each other in a front view of the driver 10 as shown in FIG. 4. Pinions 41 are provided to the rotary component 38. The pinions 41 are a plurality of pins disposed so as to be spaced from each other along the rotating direction of the rotary component 38.

On the other hand, a rack 42 is provided on a side edge of the driver blade 23 along the center line B1 direction. The rack 42 is formed by convex parts 42*a* and concave parts 42*b* which are alternately disposed in the center line B1 direction so as to have a certain space therebetween, and the pinions 41 can engage with and disengage from the rack 42. The rotary component 38, the pinions 41, and the rack 42 configure the motive power mechanism 76. The plurality of convex parts 42 are a plurality of teeth.

An electric motor 43 which rotates the rotary component 38 is provided. The electric motor 43 is provided in the motor case 13. The electric motor 43 has a stator 44 fixed to the motor case 13 and a rotor 45 rotatably provided in the motor case 13. A planetary-gear-type decelerator 46 is provided in the motor case 13, and an input shaft of the decelerator 46 is coupled to the rotor 45. An output shaft of the decelerator 46 is coupled to the drive shaft 39.

A battery 47 is attached to the attachment part 15. The battery 47 is detachable to the attachment part 15, and the battery 47 supplies electric power to the electric motor 43. The battery 47 has an accommodation case and a plurality of battery cells accommodated in the accommodation case. The battery cells are secondary batteries formed of lithium ion batteries, nickel metal hydride batteries, lithium ion polymer batteries, nickel cadmium batteries, or others.

A magazine 49 which accommodates a plurality of fasteners 48 is provided, and the magazine 49 is fixed to the housing 11 and the blade guide 28. A fixing component which fixes the magazine 49 is a screw member. A feed mechanism is provided to the magazine 49, and supplies the fasteners 48 accommodated in the magazine 49 to the ejection path. The fasteners 48 are shaft-shaped nails.

A push sensor 50 and a rotation angle sensor 51 are provided to the ejection part 27. The push sensor 50 detects whether the distal end 32*a* of the push rod 32 is pushed against the driven member W1, and outputs a signal. The rotation angle sensor 51 detects a rotation angle of the rotary component 38, and outputs a signal. A trigger 52 is provided to the handle 14, and a trigger switch 53 which detects whether an operation force is applied to the trigger 52 is provided thereto.

A control substrate 54 is provided in the attachment part 15, and a controller and an inverter circuit are provided to the control substrate 54. The inverter circuit is connected to the stator 44 of the electric motor 43, and has a switching element. The controller processes the signals which are output from the push sensor 50, the rotation angle sensor 51, and the trigger switch 53 to control the inverter circuit. That is, the controller controls rotation, stop, and a rotation speed of the electric motor 43.

Figure 1:
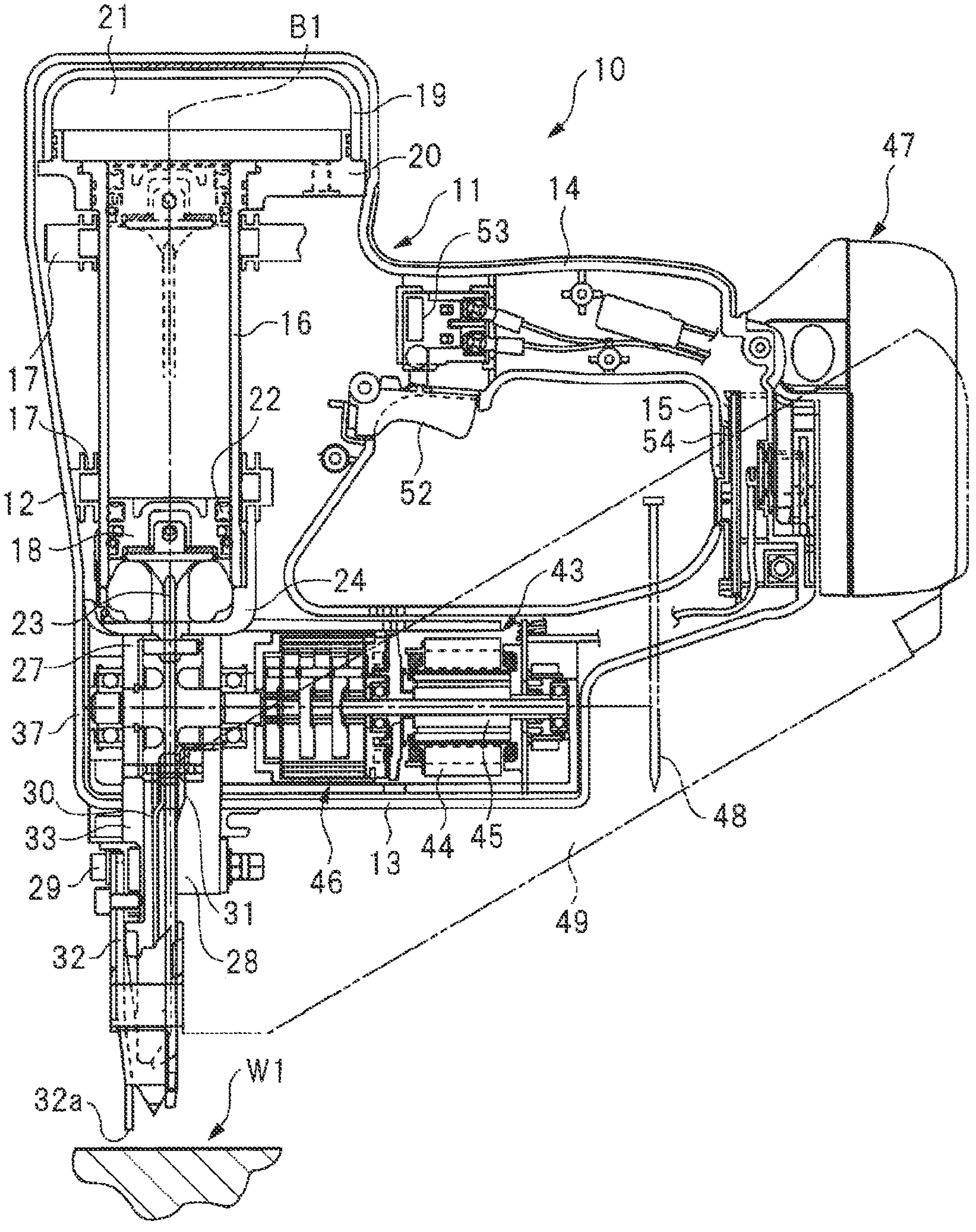
FIG. 1 is a side cross-sectional view showing an entirety of a driver of the present invention.
Figure 2:
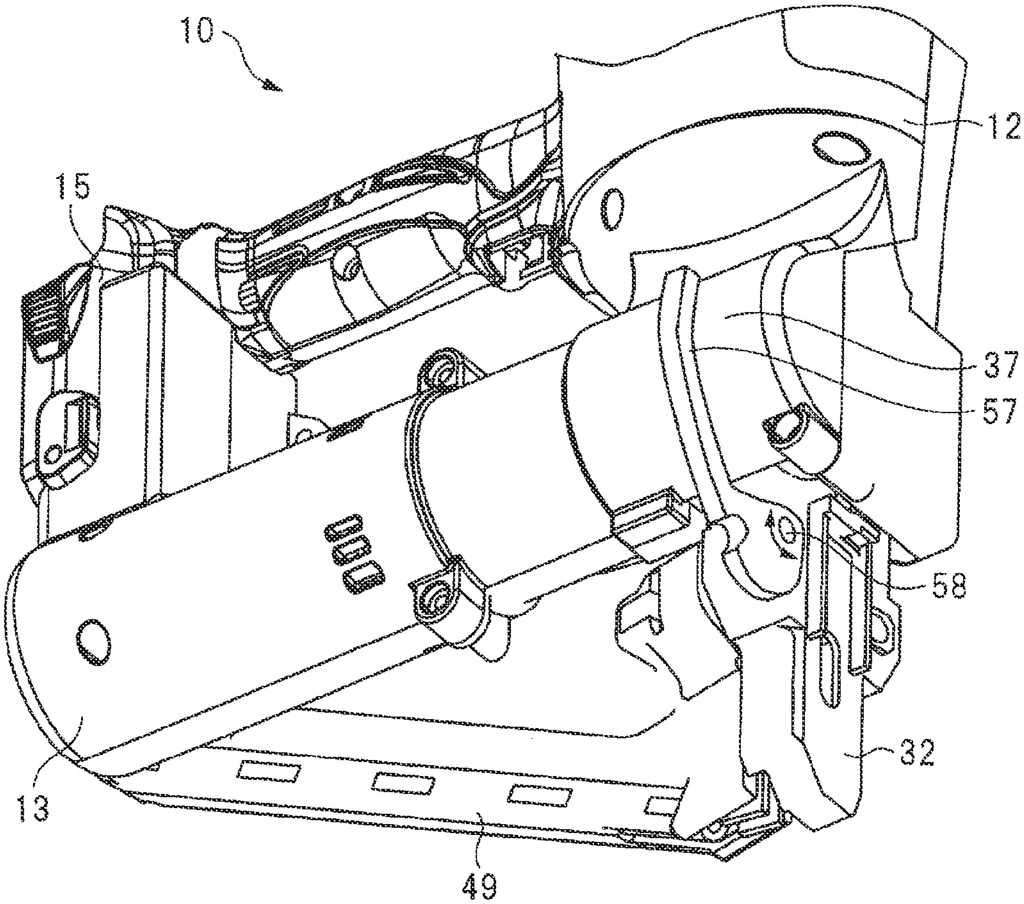
FIG. 2 is a partial perspective view of the driver shown in FIG. 1.

Next, an example of control of the driver 10 is described. When the push rod 32 is away from the driven member W1 and the operation force of the trigger 52 is released as shown in FIG. 1, the controller stops the electric motor 43. That is, the piston 18 is pushed toward the bumper 25 by the air pressure of the pneumatic chamber, so that the driver blade 23 is pressed against the bumper 25. That is, the piston 18 and the driver blade 23 both stop at the bottom dead point.

When detecting that the push rod 32 is pressed against the driven member W1 and the operation force is applied to the trigger 52, the controller rotates the electric motor 43. The torque of the electric motor 43 is transmitted via the decelerator 46 to the rotary component 38. When the rotary component 38 rotates in a counterclockwise direction in FIG. 4 to mesh the pinions 41 with the rack 42, the driver blade 23 ascends from the bottom dead point toward the top dead point, and the air pressure of the pneumatic chamber 21 increases.

After the driver blade 23 ascends by the torque of the electric motor 43 so that the driver blade 23 reaches the top dead point, the pinions 41 are away from the rack 42. In this manner, after the driver blade 23 reaches the top dead point during one rotation of the rotary component 38, the pinions 41 are away from the rack 42. Then, the driver blade 23 is moved by the air pressure of the pneumatic chamber 21 from the top dead point toward the bottom dead point in the center line B1 direction. And, the driver blade 23 impacts the fastener 48 in the ejection path 31, and the fastener 48 is driven from the ejection port 31*a* of the ejection path 31 into the driven member W1.

Also, when the driver blade 23 drives the fastener 48 into the driven member W1, the driver blade 23 descends while having excess kinetic energy, the driver blade 23 collides with the bumper 25, and a part of the kinetic energy of the driver blade 23 and the piston 18 is absorbed by the bumper 25. After the driver blade 23 impacts the fastener 48 and before the pinions 41 meshes with the rack 42 again, the controller stops the electric motor 43. The controller determines a timing of the stop of the electric motor 43 from the rotation angle of the rotary component 38.

Each of the piston 18 and the driver blade 23 has a top dead point and a bottom dead point. The top dead point of the piston 18 and the top dead point of the driver blade 23 are different from each other in a position in the center line B1 direction, but are the same as each other in a position which is the closest to the pneumatic chamber 21. The bottom dead point of the piston 18 and the bottom dead point of the driver blade 23 are different from each other in a position in the center line B1 direction, but are the same as each other in a position which is the farthest from the pneumatic chamber 21.

A case in middle of a driving work of the fastener 48 by the operator has a possibility of clogging of the fastener 48 impacted by the driver blade 23 in the ejection path 31 without coming out from the ejection path 31 for some reason, for example, because the driven member W1 is hard or others. In this case, the driver blade 23 stops between the top dead point and the bottom dead point. Thus, the operator performs a work of taking out the fastener 48 from the ejection path 31 while taking the push rod 32 away from the driven member W1 and releasing the operation force on the trigger 52.

The driver 10 of the present embodiment has a fixing mechanism 55 for use in the work of taking out the fastener 48 from the ejection path. The fixing mechanism 55 plays a role of holding the driver blade 23 at a stop position when the driver blade 23 stops between the top dead point and the bottom dead point. The fixing mechanism 55 has a lock plate 56 and a lock lever 57. The lock lever 57 is rotatable about a support shaft 58. A center line B3 of the support shaft 58 is parallel to the center line B2. A cam plate 59 is fixed to the lock lever 57. A protrusion 61 is provided so as to protrude from the surface of the cam plate 59 in the center line B3 direction. A cam surface 60 is formed on the outer periphery of the protrusion 61. The cam surface 60 is non-circular in a plane perpendicular to the center line B3.

Guide rails 62, 63 are provided to the blade guide 28. The guide rails 62, 63 are both linear and parallel to each other in a plan view perpendicular to the center line B3. The guide rails 62, 63 are tilted with respect to the center line B1. The guide rail 62 and the guide rail 63 are disposed so as to be spaced from each other in the center line B1 direction. The guide rail 62 is disposed between the distal end 32*a* of the push rod 32 and the guide rail 63 in the center line B1 direction.

The lock plate 56 is disposed between the guide rail 62 and the guide rail 63. The lock plate 56 includes contact parts 64, 65 at both ends in the center line B1 direction. The contact parts 64, 65 are both linear and parallel to each other. Also, the contact parts 64, 65 are tilted with respect to the center line B1. The angle and the direction of each of the contact parts 64, 65 tilted with respect to the center line B1 are identical to the angle and the direction of each of the guide rails 62, 63 tilted with respect to the center line B1. The contact parts 64, 65 are parallel to the guide rails 62, 63.

While being in contact with the guide rail 62 or the guide rail 63, the lock plate 56 is movable in a direction opposite to a direction in which the driver blade 23 drives the fastener 48 and diagonally with respect to the center line B1. The direction opposite to the direction in which the driver blade 23 drives the fastener 48 is a direction in which a component of force pushing the driver blade 23 toward the top dead point is caused by the movement of the lock plate 56. This component of force is a vector in the center line B1 direction.

The contact part 64 and the contact part 65 are disposed so as to be spaced from each other in the center line B1 direction. In the center line B1 direction, the space between the guide rail 62 and the guide rail 63 is larger than a distance between the contact part 64 and the contact part 65. The distance between the contact part 64 and the contact part 65 is a width of the lock plate 56 in the center line B1 direction. Thus, the lock plate 56 can move by a predetermined amount in the center line B1 direction while being disposed between the guide rail 62 and the guide rail 63. Also, the lock plate 56 can move along the guide rails 62, 63 in a plane perpendicular to the center line B3 while being disposed between the guide rail 62 and the guide rail 63.

A plurality of pins 66 are provided to the lock plate 56. The pins 66 protrude from the lock plate 56 in the center line B3 direction. The plurality of pins 66 are disposed at a certain pitch in the center line B1 direction. In the center line B1 direction, the pitch between the plurality of pins 66 is equal to a pitch between the plurality of convex parts 42*a*. The pins 66 are engageable with the rack 42. The fixing mechanism 55 plays a role of keeping the state in which the pins 66 engage with the rack 42. The outer diameter of each pin 66 is smaller than the length of the concave part 42*b* in the center line B1 direction. Also, a plate 67 is attached to the lock plate 56. The plate 67 is disposed between the lock plate 56 and the cam plate 59.

Furthermore, a pin 68 is provided to the blade guide 28, and a pin 69 is provided to the lock plate 56. Still further, a tension coil spring 70 is provided, a first end of the tension coil spring 70 is coupled to the pin 68, and a second end of the tension coil spring 70 is connected to the pin 69. The tension coil spring 70 is biased in a direction in which the lock plate 56 is away from the driver blade 23.

A fixing pin 71 is provided to the blade guide 28. The fixing pin 71 is pushed by the force of the spring in a direction of protruding from the surface of the blade guide 28. A notch 72 is provided on the outer peripheral surface of the cam plate 59. The fixing pin 71 can enter and exit from the notch 72.

Next, an example of use of the fixing mechanism 55 is described. At the time of the work of driving the fastener 48 by the driver blade 23, the lock lever 57 is held at an initial position as shown in FIG. 4. When the lock lever 57 is held at the initial position, the lock plate 56 is stopped by the force of the tension coil spring 70 at a standby position which is the farthest from the center line B1. When the lock plate 56 stops at the standby position, the pins 66 do not mesh with the rack 42. That is, the pins 66 protrude from the concave parts 42*b* so that the driver blade 23 is movable in the center line B1 direction.

Figure 5:
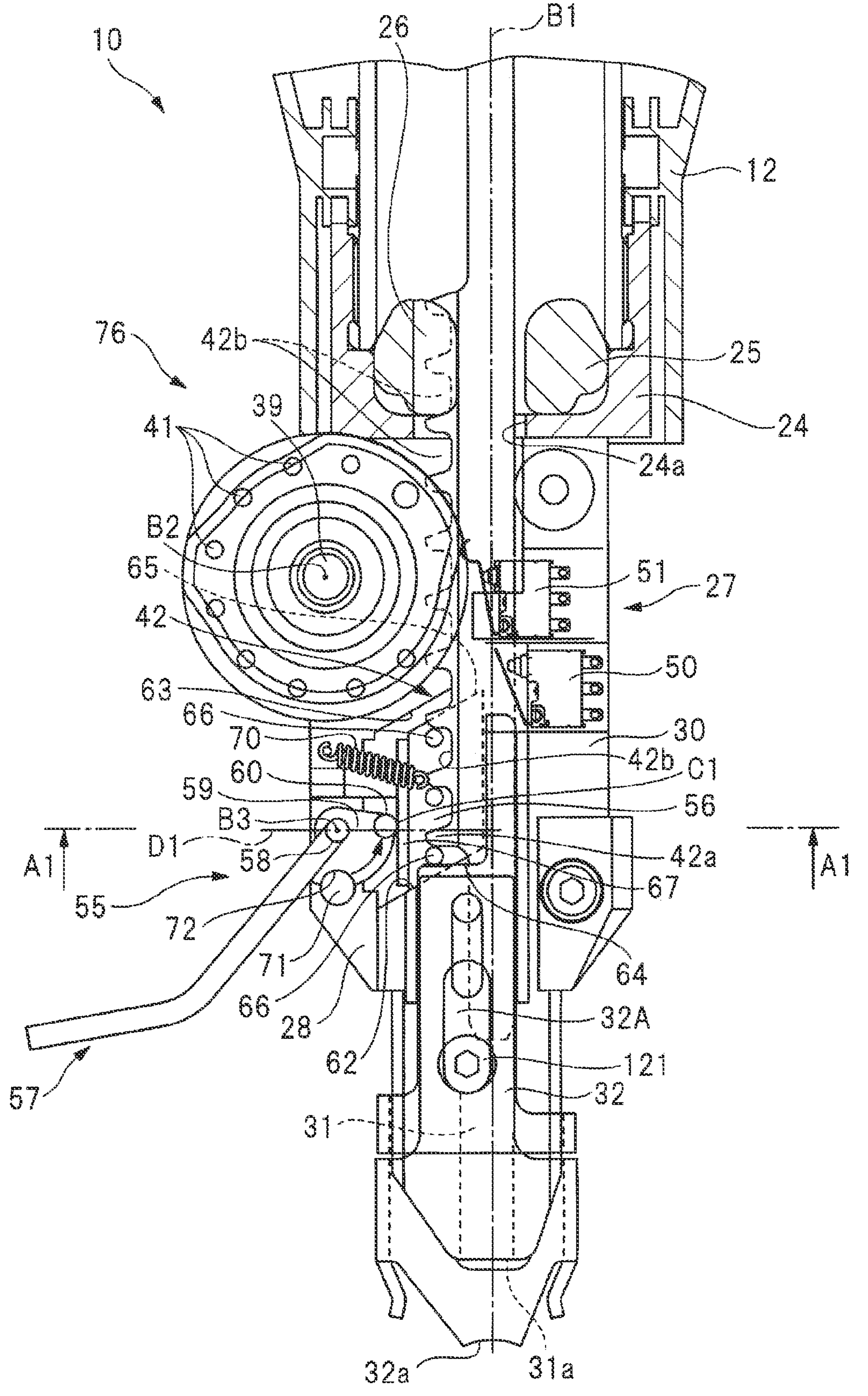
FIG. 5 is a front view showing a fixing mechanism provided to the driver shown in FIG. 1.

When the fastener 48 clogs in the ejection path 31, the operator rotates the lock lever 57 counterclockwise from the initial position. By this operation, the lock plate 56 slides in a direction of approaching the center line B1 so as to be against the force of the tension coil spring 70. And, when the lock lever 57 stops as shown in FIG. 5, the pins 66 mesh the rack 42. By the engagement force between the convex parts 42*a* and the pins 66, the driver blade 23 is prevented from moving in the center line B1. A position in a state in which the pins 66 enter the concave parts 42*b* and the lock plate 56 stops is referred to as a fixed position of the lock plate 56. When the lock plate 56 is at the fixed position, the fixing pin 71 enters the notch 72 to regulate the rotation of the cam plate 59. The operator can remove the fastener 48 which clogs in the ejection path 31, in the state in which the movement of the driver blade 23 in the center line B1 direction is prevented.

Furthermore, when the lock plate 56 is at the fixed position as shown in FIG. 5, the cam surface 60 and the plate 67 make contact with each other at a position C1. Here, if a line segment D1 passing through the center line B3 of the support shaft 58 and forming a right angle with respect to the center line B1 is assumed, the position C1 is positioned between the line segment D1 and the pin 69. Thus, the force of the tension coil spring 70 can be prevented from being converted into a force applied in a direction of rotating the cam plate 59 clockwise.

After removing the fastener 48, the operator causes the fixing pin 71 to exit from the notch 72, and rotates the lock lever 57 clockwise in FIG. 5. Then, the cam plate 59 rotates clockwise in FIG. 5 together with the lock lever 57. Also, the lock plate 56 slides in a direction of being away from the center line B1, so that the pins 66 are away from the rack 42. Then, when the operator stops the lock lever 57 at the initial position, the lock plate 56 stops at the standby position.

Figure 6:
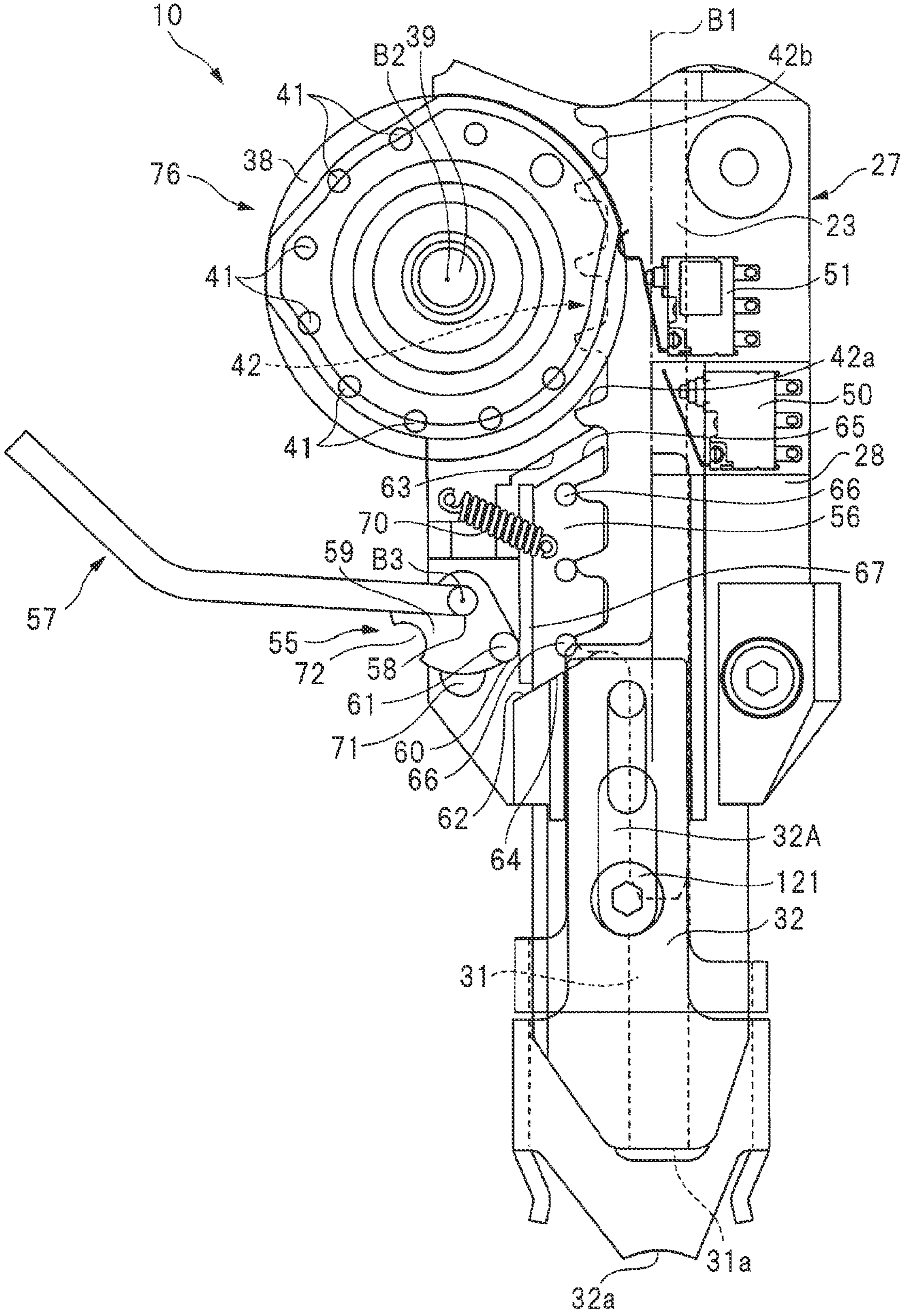
FIG. 6 is a front view showing a fixing mechanism provided to the driver shown in FIG. 1.
Figure 7:
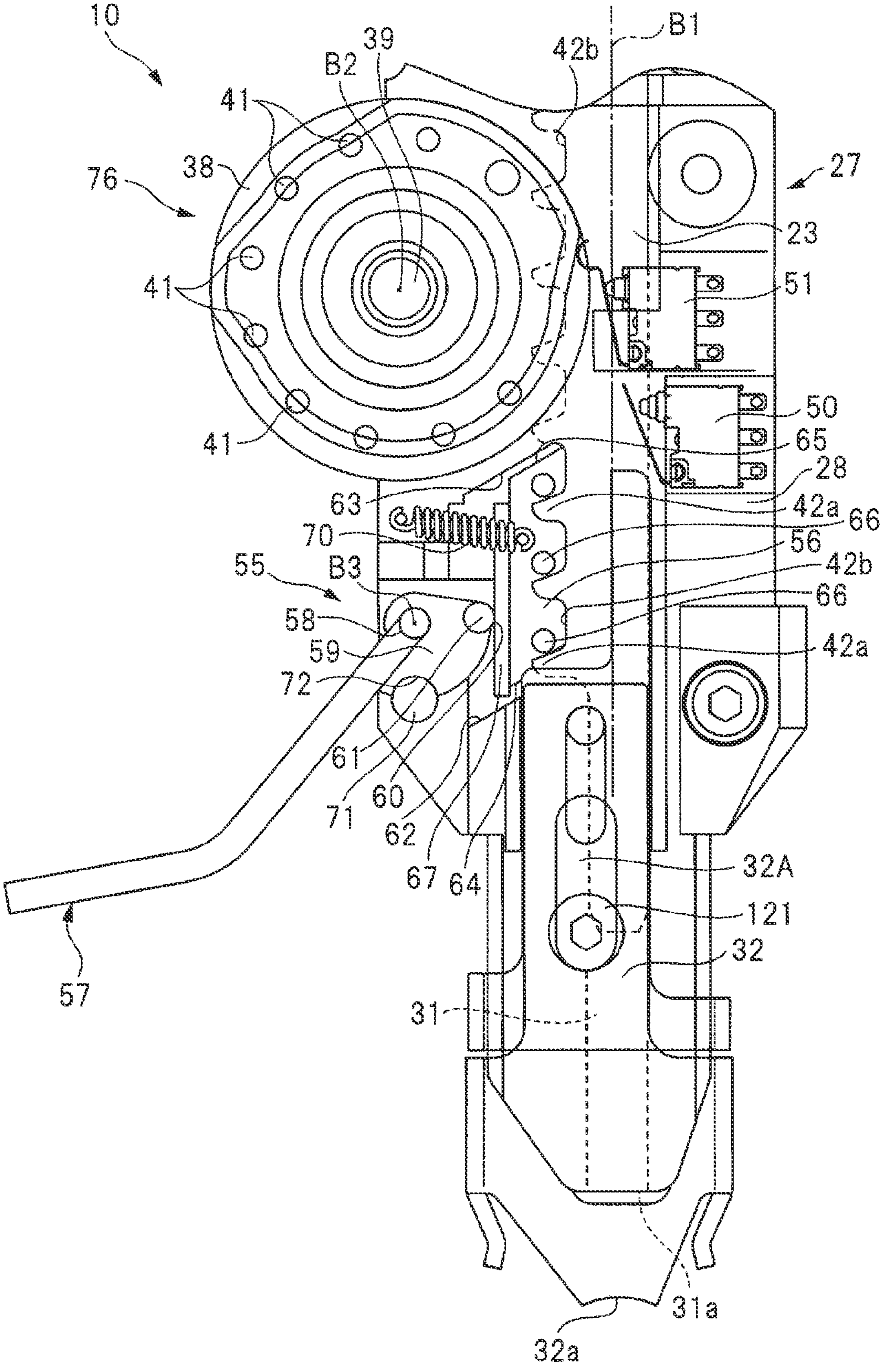
FIG. 7 is a front view showing a fixing mechanism provided to the driver shown in FIG. 1.

Next, with reference to FIG. 6 and FIG. 7, explanation will be made about a second work of removing the fastener 48 when the convex part 42*a* positioned farthest from the bumper 25 stops between the pin 66 positioned at the lowest and the distal end 32*a* of the push rod 32. In the second work, when the lock lever 57 at the initial position is rotated counterclockwise, the lock plate 56 slides to press the pin 66 positioned first from the bottom against the convex part 42*a* positioned first from the bottom.

Here, the lock plate 56 slides so as to cross the center line B1. Thus, the pin 66 positioned first from the bottom enters the concave part 42*b* formed between the convex part 42*a* positioned first from the bottom and a convex part 42*a* positioned second from the bottom.

Figure 8:
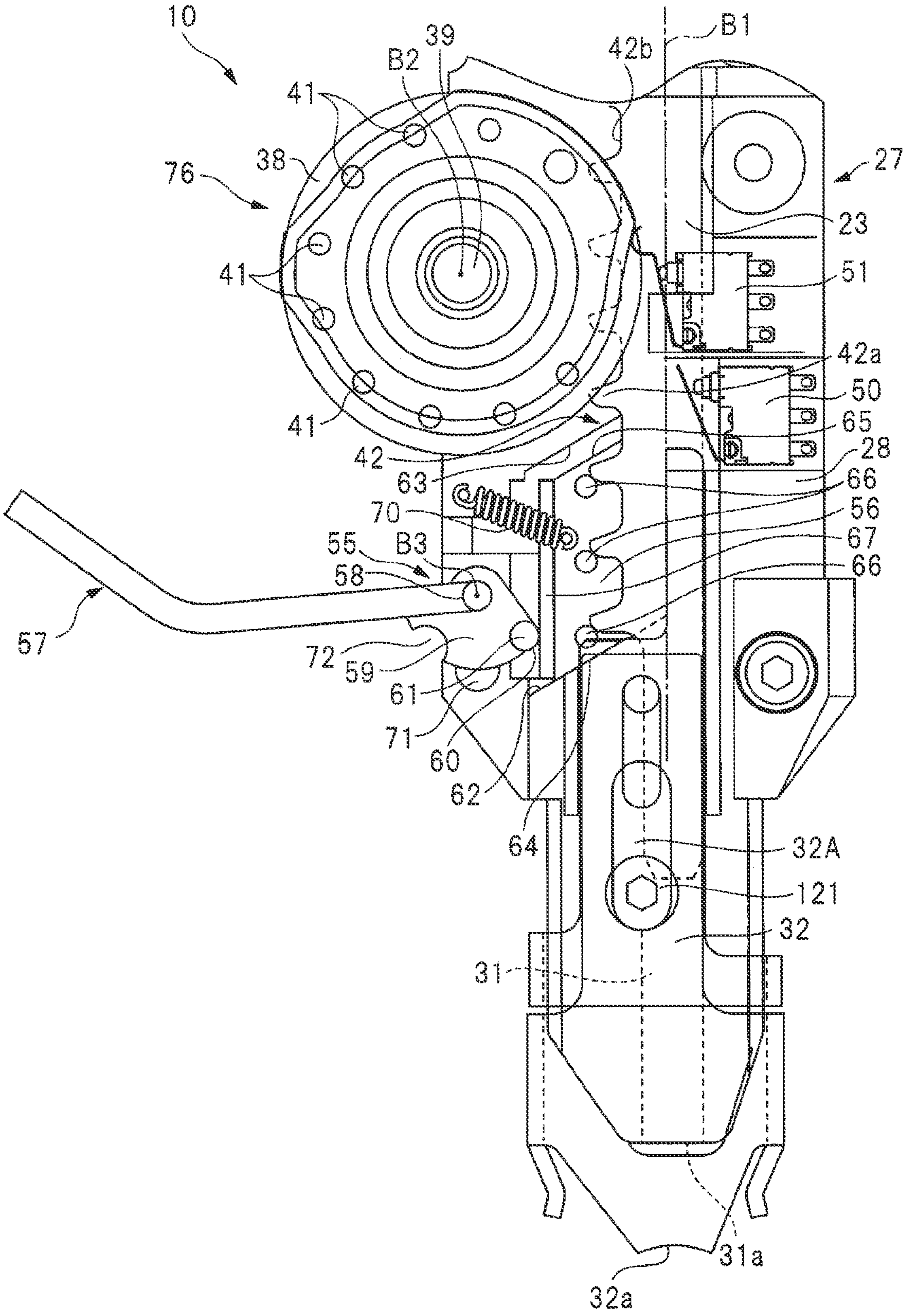
FIG. 8 is a front view showing a fixing mechanism provided to the driver shown in FIG. 1.
Figure 9:
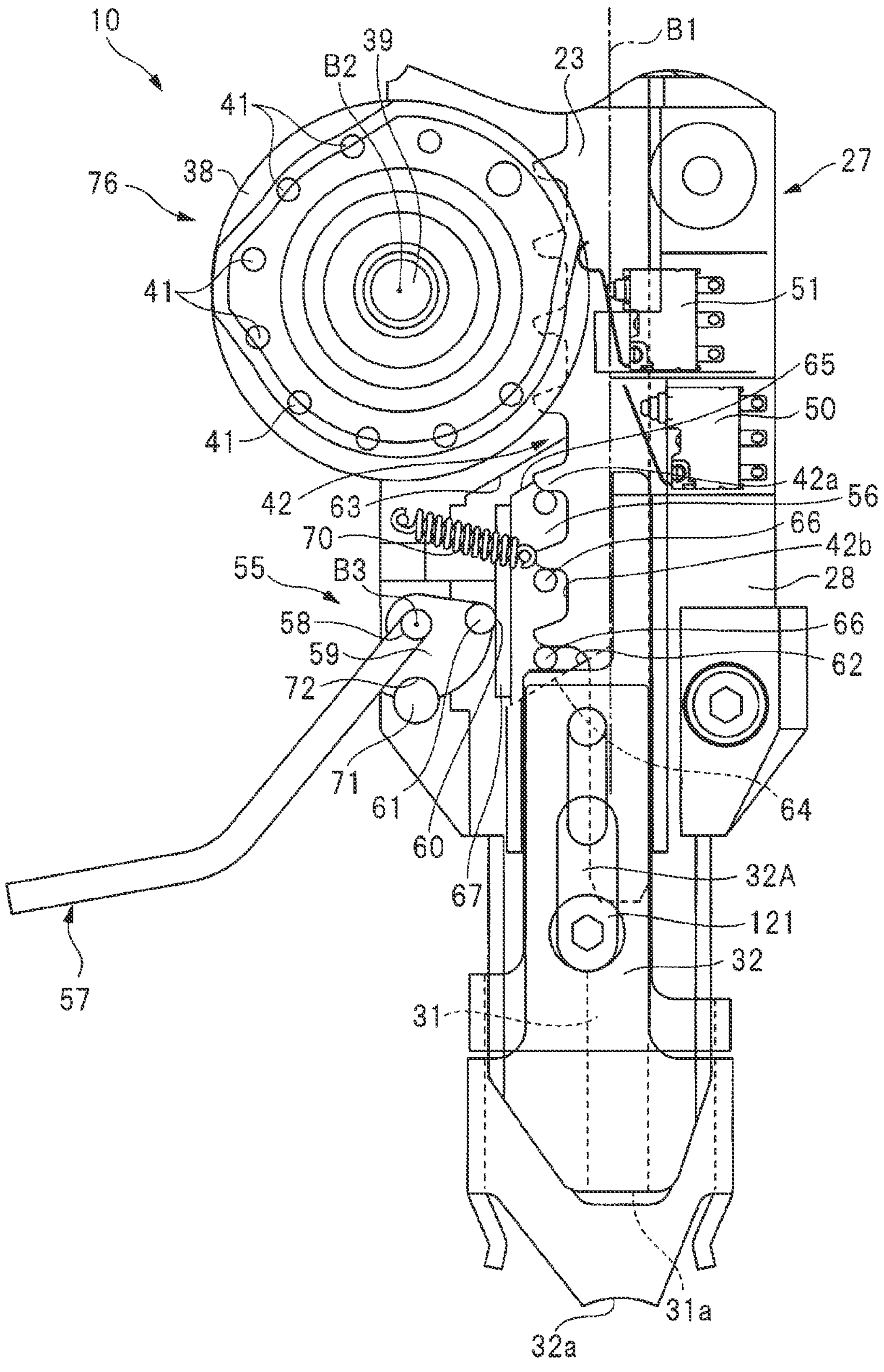
FIG. 9 is a front view showing a fixing mechanism provided to the driver shown in FIG. 1.
Figure 10:
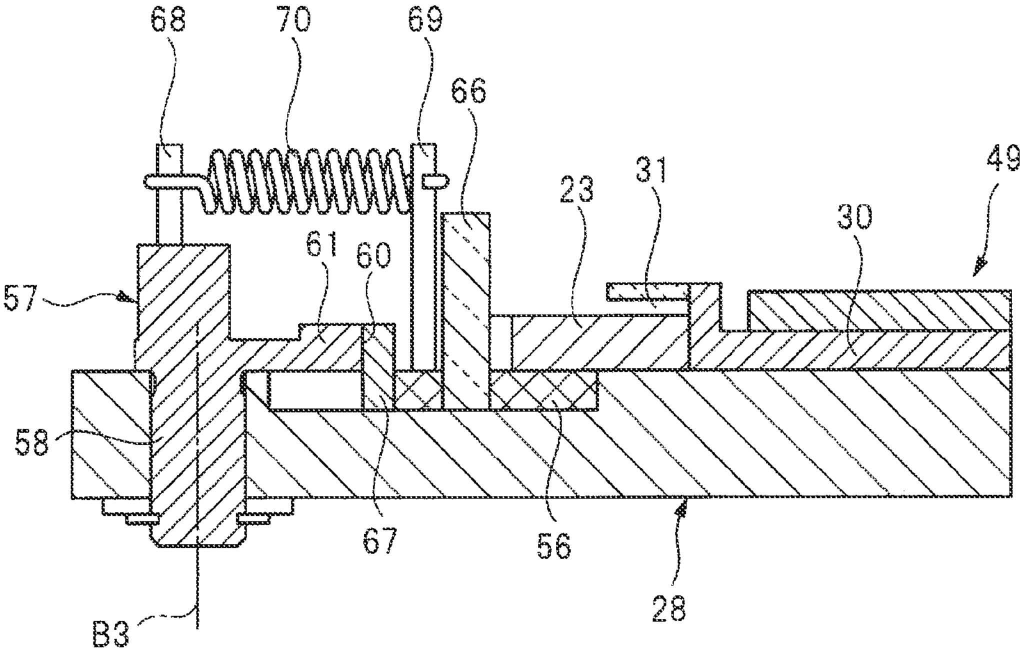
FIG. 10 is a bottom cross-sectional view along a line A1-A1 of FIG. 5.

Furthermore, with reference to FIG. 8 and FIG. 9, explanation will be made about a third work of removing the fastener 48 when the pin 66 positioned at the lowest is positioned lower than the convex part 42*a* positioned at the lowest. When the third work starts, in the course of the sliding of the lock plate 56 from the standby position to the fixed position, the pins 66 are pressed against the lower surfaces of the convex parts 42*a*. Furthermore, the lock plate 56 slides in a direction tilted with respect to the center line B1. Thus, when the lock plate 56 moves in a direction of being tilted with respect to the center line B1, the lowest pin 66 engages with the lowest convex part 42*a*, so that the lock plate 56 stops at the fixed position. Therefore, workability of removing the fastener 48 from the ejection path 31 is improved.

Another example of the lock lever is described with reference to FIG. 11. A lock lever 73 is rotatable about the support shaft 74. The lock lever 73 has a cam surface 75. When the lock plate 56 is at the standby position, the lock lever 73 is at an initial position. When the lock lever 73 is at the initial position, the cam surface 75 is not pressed against the plate 67. Thus, the lock plate 56 is stopped at the standby position by the force of the tension coil spring 70. That is, the pins 66 are away from the rack 42, so that the driver blade 23 is movable in the center line B1 direction.

When the lock lever 73 at the initial position rotates clockwise about the support shaft 74, the cam surface 75 is pressed against the plate 67, so that the lock plate 56 slides in a direction of approaching the center line B1. When the pins 66 engage with the rack 42 to stop the lock lever 73 while the lock plate 56 is sliding, the lock plate 56 stops at the fixed position. When the lock plate 56 stops at the fixed position, the driver blade 23 is prevented from moving in the center line B1 direction.

On the other hand, in a state in which the lock plate 56 is at the fixed position, the lock lever 73 can be rotated counterclockwise in FIG. 11 so that the lock lever 73 can be returned to the initial position. By this operation, the lock plate 56 slides from the fixed position in a direction of being away from the center line B1 by the force of the tension coil spring 70 to be returned to the standby position, and stops.

Here, the meaning of the configuration in the present embodiment is described. The top dead point corresponds to a first position, the bottom dead point corresponds to a second position, and the driver blade 23 corresponds to an impactor. Also, the lock plate 56 corresponds to an engagement member. The center line B1 is a first center line, the guide rail 62 and the guide rail 63 correspond to a first guide rail and a second guide rail, the support shafts 58, 74 correspond to a support shaft, the lock levers 57, 73 correspond to a lever, center lines B3, B4 correspond to a second center line, the blade guide 28 corresponds to a first component member, and the cover 30 corresponds to a second component member. Also, the center line B1 direction is a direction of the operation of the impactor.

Second Embodiment

A second embodiment of the driver is shown in FIG. 12 to FIG. 15. A cam part 77 is fixed to the drive shaft 39. An outer peripheral surface 77A of the cam part 77 has a non-circular shape, and the cam part 77 is rotatable about the center line B2 so as to be integrally together with the rotary component 38. A guide hole 78 penetrating through the cam part 77 in the center line B2 direction is provided. The guide hole 78 has a minor axis and a major axis, and the major axis is disposed in a radial direction of the rotary component 38.

A guide hole 79 is provided in the rotary component 38. The guide hole 79 penetrates through the rotary component 38 in the center line B2 direction. The guide hole 79 is disposed at the same position and has the same shape as those of the guide hole 78 in a plan view perpendicular to the center line B2. That is, the guide holes 78, 79 overlap each other in the plan view perpendicular to the center line B2. A pinion 41A of the pinions 41, the pinion being disposed at one end in a circumferential direction, is disposed in the guide holes 78, 79 and is movable in the major axis direction of the guide holes 78, 79. That is, the pinion 41A is movable in a major axis direction of the rotary component 38. A retainer 88 is fixed to the pinion 41A, so that the pinion 41A is not detached from the rotary component 38.

A bias member 80 is attached to the drive shaft 39. The bias member 80 is a component which pushes the pinion 41A outward in the radial direction of the rotary component 38. As the bias member 80, an elastic member such as a metallic torsion coil spring can be used. A first end part 81 of the bias member 80 is fixed to the rotary component 38, and a second end part 82 of the bias member 80 is pressed against the pinion 41A.

Next, a control system of the driver 10 is described with reference to FIG. 16. The driver 10 has a controller 83, the rotation angle sensor 51, the trigger switch 53, the push sensor 50, and an inverter circuit 84. The rotation angle sensor 51 makes contact with an outer peripheral surface 77A of the cam part 77 to detect a rotation angle of the rotary component 38, and outputs a signal based on the detection result. Also, a reset switch 89 to be operated by the operator is provided. The reset switch 89 outputs a signal. The controller 83 processes a signal from the trigger switch 53, a signal from the push sensor 50, a signal from the rotation angle sensor 51, and a signal from the reset switch 89. A stopper 90 which is operated by a signal from the controller 83 is provided. The stopper 90 prevents the fastener 48 in the magazine 49 from being supplied to the ejection path 31. The stopper 90 includes, for example, a solenoid and a pin to be operated by the solenoid.

The inverter circuit 84 configures a circuit which supplies electric power of the battery 47 to the electric motor 43. Furthermore, a phase detection sensor 85 which detects a rotation angle the electric motor 43 and a phase in a rotating direction of the electric motor 43 is provided, and a signal output from the phase detection sensor 85 is input to the controller 83. Furthermore, a current value detection sensor 86 which detects a current value of the electric power supplied from the battery 47 to the electric motor 43 is provided. A signal output from the current value detection sensor 86 is input to the controller 83.

Furthermore, a position detection sensor 87 which detects a position of the driver blade 23 in the center line B1 direction is provided. The position detection sensor 87 is achieved by, for example, detection coils attached to a plurality of locations of the cylinder 16 and a magnet attached to the piston 18. And, the detection coils are energized to detect an electromotive force occurring between the magnet and the detection coils, so that a signal indicative of the position of the driver blade 23 is output. The signal output from the position detection sensor 87 is input to the controller 83. The controller 83 processes the input signals to control the inverter circuit 84, so that the rotation and the stop of the electric motor 43 are controlled. Another configuration of the driver 10 shown in FIG. 12 to FIG. 15 is similar to the configuration of the driver 10 shown in FIG. 1 to FIG. 10.

The driver 10 shown in FIG. 12 to FIG. 15 has a holding mechanism 91 in place of the fixing mechanism 55. The holding mechanism 91 can hold the driver blade 23 between the top dead point and the bottom dead point when the fastener 48 clogs in the ejection path 31. The holding mechanism 91 includes the controller 83, the electric motor 43, the rotary component 38, and the pinion 41A.

Next, an example of the operation and the control of the driver 10 shown in FIG. 12 to FIG. 15 is described. The controller 83 determines whether the fastener 48 clogs in the ejection path 31. The controller 83 determines that the fastener 48 does not clog in the ejection path 31 when detecting that the driver blade 23 has reached the bottom dead point within a predetermined time from a moment when the rotary component 38 rotates counterclockwise in FIG. 15 to start the ascent control that moves the driver blade 23 from the second position to the first position.

On the other hand, the controller 83 determines "the clogging of the fastener 48" unless it can detect that the driver blade 23 has reached the bottom dead point within the predetermined time from the moment when the rotary component 38 rotates counterclockwise in FIG. 15 to start the ascension of the driver blade 23. The clogging of the fastener 48 means that the fastener 48 clogs in the ejection path 31 after the driver blade 23 starts ascending to reach the first position, and besides, the driver blade 23 is moved from the first position toward the second position by the impact force of the pneumatic chamber 21 to impact the fastener 48.

(Case of No Clogging of the Fastener)

When determining that the fastener 48 does not clog, the controller 83 performs normal control. The normal control is control of rotating the electric motor 43 by a predetermined angle for stopping from a moment when the driver blade 23 starts ascending from the bottom dead point. From the load of the electric motor 43, that is, from a signal from the current value detection sensor 86, the controller 83 determines the moment when the driver blade 23 starts ascending by the torque of the electric motor 43. When the controller 83 stops the electric motor 43, the lower end of the driver blade 23 is positioned lower than the upper end of the fastener 48 positioned at the head in the magazine 49. That is, the driver blade 23 stops at the standby position in preparation for the next impact.

(Case of Clogging of the Fastener)

On the other hand, when determining that the fastener 48 clogs in the ejection path 31, the controller 83 allows a first holding control to be performed without performing the normal control.

The first holding control is control of ascending the driver blade 23 which is stopping without reaching the bottom dead point and of stopping it before reaching the top dead point. In specific description, the controller 83 ascends the driver blade 23 by a predetermined amount from the moment when the driver blade 23 starts the ascending to stop the electric motor 43.

The position where the driver blade 23 stops before reaching the bottom dead point because of the clogging of the fastener 48 is obtained by an experiment or simulation. That is, the predetermined amount by which the stopping driver blade 23 is ascended in the first holding control is a movement amount by which the driver blade 23 can stop before reaching the top dead point. When the driver blade 23 moves by the predetermined amount and stops, the lower end of the driver blade 23 is positioned lower than the upper end of the fastener 48 positioned at the head in the magazine 49.

Figure 13A:
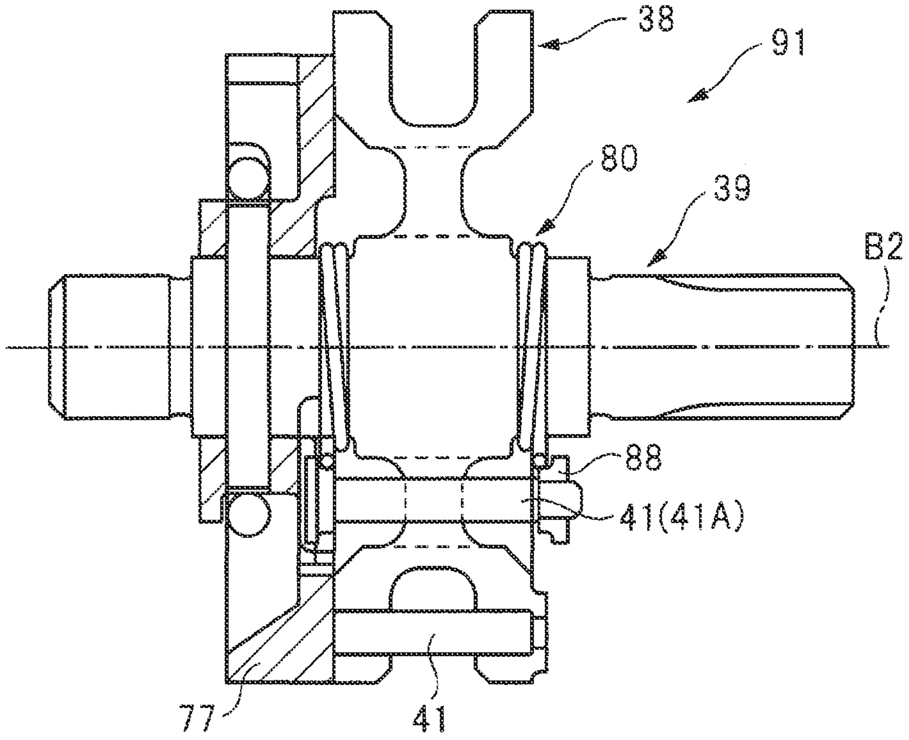
FIG. 13(A) is a side cross-sectional view showing a principal part of the driver shown in FIG. 12.
Figure 13B:
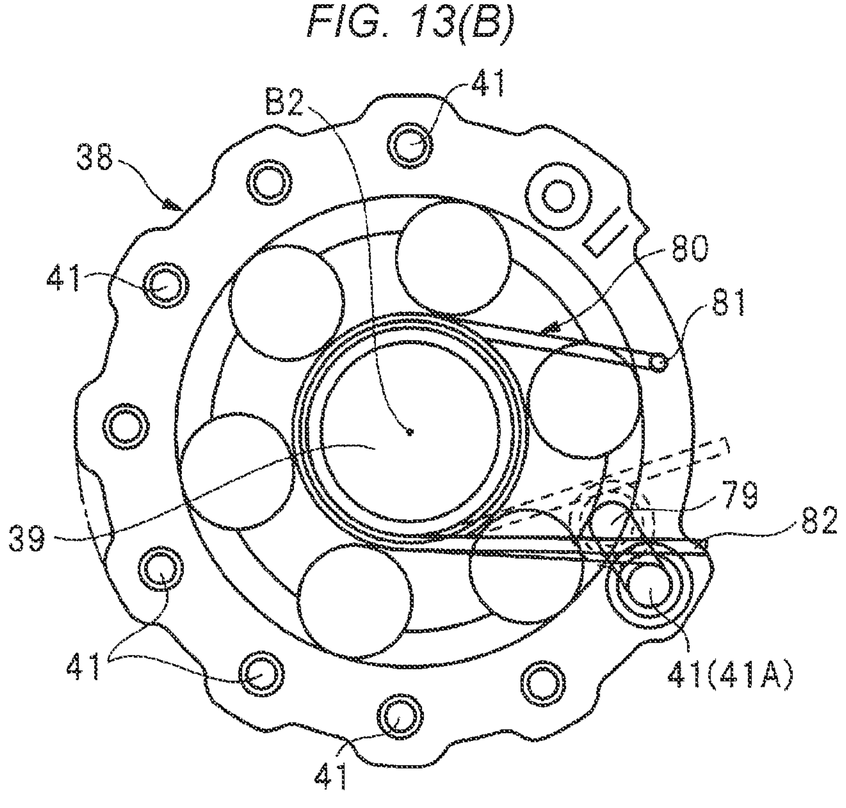
FIG. 13(B) is a front view showing a principal part of the driver of FIG. 12.

With reference to FIG. 13, FIG. 14, and FIG. 15, explanation will be made about a function in which the rotary component 38 is rotated by the torque of the electric motor 43 when the first holding control is performed to engage the pinions 41 with the rack 42 and ascend the driver blade 23. First, with reference to FIG. 15, a "first engaging function" which smoothly engages the pinions 41 with the rack 42 is described. The first engaging function means that the pinion 41A positioned at the head in the rotating direction of the rotary component 38 among the plurality of pinions 41 engages with the convex part 42*a* positioned at the upper location without being inhibited by the convex parts 42*a* positioned at the second and subsequent locations from the top. In the first engaging function, the pinion 41A is kept in a state in which it stops as being pushed by a bias force of the bias member 80 in the guide hole 78.

Next, with reference to FIG. 14 and FIG. 15, a "second engaging function" in which the pinions 41 do not smoothly engage with the rack 42 is described. The second engaging function means that the pinion 41A positioned at the head in the rotating direction of the rotary component 38 among the pinions 41 is inhibited by the convex parts 42*a* positioned at the second and subsequent locations from the top, and then, engages with the convex part 42*a* positioned at the upper location to ascend the driver blade 23. In the second engaging function, as shown in FIG. 14(A), the pinion 41A is pressed against the convex parts 42*a* positioned at the second and subsequent locations from the top.

In this manner, the pinion 41A cannot move on the same circumference, and thus, moves inward in the radial direction inside the guide hole 78 so as to be against the bias force of the bias member 80 as shown in FIG. 14(B). Then, when the rotation of the rotary component 38 is continued so that the pinion 41A gets over the convex parts 42*a* positioned at the second and subsequent locations from the top, the pinion 41A moves outward in the radial direction of the rotary component 38 inside the guide hole 78 by the bias force of the bias member 80 as shown in FIG. 15(A). In this manner, the pinion 41A engages with the convex part 42*a* positioned at the upper location, the rotation of the rotary component 38 is continued, so that the driver blade 23 ascends as shown in FIG. 15(B), the electric motor 43 stops, and the driver blade 23 is held.

After the second control is performed to ascend and stop the driver blade 23, the operator removes the clogged fastener 48 from the ejection path 31. After removing the fastener 48 from the ejection path 31, the operator operates the reset switch 89. When the reset switch 89 is operated, the controller 83 performs a first release control or a second release control.

The first release control is control of rotating the electric motor 43 in a second direction and rotating the rotary component 38 clockwise in FIG. 14 and FIG. 15 to descend the driver blade 23, and stopping the electric motor 43 when the driver blade 23 reaches the bottom dead point. The controller 83 controls a rotation speed per unit time of the electric motor 43 so that a descending speed of the driver blade 23 during the first release control is smaller than a descending speed of the driver blade 23 by the pressure of the pneumatic chamber 21.

By the second release control, the electric motor 43 is rotated in the first direction, and the rotary component 38 is rotated counterclockwise in FIG. 14 and FIG. 15, so that the driver blade 23 ascends. And, the pinions 41 are released from the rack 42 so that the driver blade 23 descends by the pressure of the pneumatic chamber 21 and reaches the bottom dead point, and then, the controller 83 ascends the driver blade 23 again by using the torque of the electric motor 43, and the driver blade 23 is stopped at a position upper than the bottom dead point. When the second release control is performed to stop the driver blade 23, the lower end of the driver blade 23 is lower than the upper end of the fastener 48 positioned at the head in the magazine.

Note that the controller 83 operates the stopper 90 while performing the second control to descend the driver blade 23, and thus, the fastener 48 in the magazine 49 is not supplied to the ejection path 31. And, the controller 83 releases the stopper 90 after the driver blade 23 stops. In this manner, when the fastener 48 clogs in the ejection path 31, the controller 83 performs the first holding control example to ascend the driver blade 23 by a predetermined amount and stop it. Therefore, the operator can smoothly perform the work of removing the fastener 48 from the ejection path 31. In the second embodiment of the driver 10, the pneumatic chamber 21 corresponds to an impact component, the electric motor 43 corresponds to a motor, and the pinions 41, particularly the pinion 41A, corresponds to an engagement member.

Third Embodiment

A third embodiment of the driver is described with reference to FIG. 17 to FIG. 19. In the driver 10 of the third embodiment, a pinion 41B positioned at the tail in a counterclockwise-rotation direction of the rotary component 38 among the pinions 41 is movable in a radial direction of the rotary component 38. The driver 10 has the holding mechanism 91, and the holding mechanism 91 includes the controller 83, the rotary component 38, the pinion 41, and the electric motor 43.

The controller 83 performs the normal control when the fastener 48 does not clog. When the controller determines that the fastener 48 clogs in the ejection path 31, it allows the second holding control to be operated without performing the normal control.

The second holding control is control of rotating the electric motor 43 in the second direction to rotate the rotary component 38 clockwise in FIG. 19 so that the pinions 41 engage with the rack 42 to hold the driver blade 23.

First, with reference with FIG. 17, a “first entering function” in which a pinion 41B smoothly enters the concave part 42*b* is described. The first entering function means that the pinion 41B enters the concave part 42*b* without being inhibited by the convex part 42*a*.

When the rotary component 38 rotates clockwise as shown in FIG. 17(A), the pinion 41B enters the concave part 42*b*. The controller 83 stops the electric motor 43 when the pinion 41B makes contact with the convex part 42*a* positioned below the concave part 42*b*. The controller 83 processes a signal from the current value detection sensor 86, and determines that the pinion 41B makes contact with the convex part 42*a*. When the pinion 41B enters the concave part 42*b*, the descent of the driver blade 23 is prevented. Therefore, the operator can smoothly perform the work of removing the fastener 48.

Next, a function performed when the pinion 41B does not smoothly enter the concave part 42*b* is described with reference to FIG. 18 and FIG. 19. When the rotary component 38 rotates clockwise, the pinion 41B is pressed against the convex part 42*a* as shown in FIG. 18(A). In this manner, the pinion 41B moves inward in the radial direction in the guide hole 78 so as to be against the bias force of the bias member 80. And, when the pinion 41B gets over the convex part 42*a* as shown in FIG. 18(B), the pinion 41B moves outward in the radial direction of the rotary component 38 in the guide hole 78 as shown in FIG. 19(A).

When detecting that the pinion 41B enters the concave part 42*b* and makes contact with the lower convex part 42*a*, the controller 83 stops the electric motor 43, and then, rotates the electric motor 43 in the first direction. In this manner, the rotary component 38 rotates counterclockwise in FIG. 19. As shown in FIG. 19(B), when the pinion 41B is pressed against the convex part 42*a* positioned at the upper location and engages with the rack 42, the controller 83 stops the electric motor 43. The controller 83 processes a signal from the current value detection sensor 86, and detects that the pinion 41B is pressed against the convex part 42*a*. When the pinion 41B and the rack 42 engage with each other, the descending of the driver blade 23 is prevented. Therefore, the operator can smoothly perform the work of removing the fastener 48 from the ejection path 31.

Note that the controller 83 performs a first release control or a second release control when the operator operates the reset switch 89 after removing the fastener 48 from the ejection path 31. In the third embodiment of the driver 10, the electric motor 43 corresponds to a motor, the controller 83 corresponds to a controller, the pneumatic chamber 21 corresponds to an impact component, and the pinions 41, particularly the pinion 41B, corresponds to an engagement member.

Fourth Embodiment

A fourth embodiment of the driver is described with reference to FIG. 20 to FIG. 25. As shown in FIG. 20 to FIG. 22, a support mechanism 131 is provided to the ejection part 27. The support mechanism 131 has an arm 133 provided to the cover 30 so as to be rotatable about a support shaft 132 and a latch 135 provided to the cover 30 so as to be rotatable about a support shaft 134. The latch 135 is biased clockwise about the support shaft 134 by a force of an elastic member 136 in FIGS. 22 to 24. The elastic member 136 is a metallic spiral coil spring.

A knock pin 137 is provided to a free end of the latch 135. The knock pin 137 may be rotatable with respect to the latch 135. The knock pin 137 is disposed between the support shaft 134 and the drive shaft 39 in the center line B1 direction. The knock pin 137 is disposed between the driver blade 23 and the support shaft 134 in a direction at the right angle with respect to the center line B1. The knock pin 137 is engageable with and releasable from the rack 42. Also, the knock pin 137 is movable in the center line B1 direction in a state of being in contact with the convex part 42*a* of the rack 42.

The arm 133 is bent in the middle of a longitudinal direction, and the support shaft 132 is disposed in the middle in the longitudinal direction of the arm 133. The arm 133 has a first contact part 138 and a second contact part 139 on both sides of the support shaft 132. The first contact part 138 is disposed between the support shaft 132 and the support shaft 134 in the center line B1 direction. The first contact part 138 is capable of making contact with and departing from the free end of the latch 135. The second contact part 139 is disposed between the cam part 77 and the support shaft 132. The second contact part 139 makes contact with the cam part 77.

Furthermore, the outer peripheral surface 77A is formed in an arc shape around the center line B2. From the outer peripheral surface 77A, a swelling part 77B protruding outward in a radial direction of the cam part 77 is provided. The swelling part 77B is displaced with respect to the outer peripheral surface 77A of the cam part 77 in the radial direction of the cam part 77.

(Case without Clogging of Fastener)

An example of use in a case without the clogging of the fastener 48 in the driver 10 of the fourth embodiment is described with reference to FIG. 22 and FIG. 23. When the driver blade 23 stops at the standby position, the swelling part 77B of the cam part 77 is at a position corresponding to "two o'clock" on a clock face. Furthermore, the second contact part 139 is at a position corresponding to a location other than the swelling part 77B, that is, the outer peripheral surface 77A. The force of the elastic member 136 is transmitted to the first contact part 138 through the latch 135. Thus, the arm 133 stops at a position at which the arm rotates about the support shaft 132 in a counterclockwise direction as far as possible, and the knock pin 137 engages with the rack 42. That is, the knock pin 137 is positioned at the concave part 42*b*.

When the trigger switch 53 is turned ON and the push sensor 50 is turned ON, the controller 83 rotates the electric motor 43 in the first direction. In this manner, the rotary component 38 rotates in a counterclockwise direction in FIG. 22(A), the pinions 41 and the rack 42 engage with each other, and the driver blade 23 moves in a direction of approaching the top dead point. When the driver blade 23 moves, the knock pin 137 gets on the convex part 42*a* as shown in FIG. 22(B) in a state of being in contact with the convex part 42*a*, and gets over the convex part 42*a* and enters the concave part 42*b*. Thus, the latch 135 moves within predetermined angles in a counterclockwise direction and clockwise direction around the support shaft 134. Then, while the driver blade 23 moves in the direction of approaching the top dead point, the knock pin 137 repeatedly gets on the convex part 42*a* and gets over the convex part 42*a*. In this manner, the movement of the driver blade 23 is allowed.

Then, before the driver blade 23 reaches the top dead point, for example, before the pinion 41 positioned at a rear end in the rotating direction of the rotary component 38 is released from the convex part 42*a* that is the nearest to the distal end 23*a* of the driver blade 23 as shown in FIG. 23(A), the second contact part 139 makes contact with the outer surface of the swelling part 77B. By the rotation of the cam part 77, the arm 133 is rotated clockwise about the support shaft 132 within a predetermined angle as shown in FIG. 23(B). Thus, the first contact part 138 pushes the latch 135, and the latch 135 rotates counterclockwise about the support shaft 134 by a predetermined angle. As a result, the knock pin 137 is released from the rack 42.

Then, when the second contact part 139 is in contact with the outer surface of the swelling part 77B, the driver blade 23 reaches the top dead point, all pinions 41 are released from the rack 42, and the driver blade 23 is moved toward the bottom dead point by the air pressure of the pneumatic chamber 21, so that the driver blade 23 impacts the fastener 48. After the driver blade 23 impacts the fastener 48, the controller 83 moves the driver blade 23 to the standby position so as to stop the electric motor 43 as similar to the first embodiment.

(Case with Clogging of Fastener)

An example of use in a case with the clogging of the fastener 48 in the driver 10 of the fourth embodiment is described with reference to FIG. 23(B) and FIG. 24. While the driver blade 23 is descending from the top dead point, the second contact part 139 of the arm 133 is in contact with the outer surface of the swelling part 77B as shown in FIG. 23(B). Also, all pinions 41 are released from the rack 42. When detecting that the fastener 48 clogs in the emission path 31, the controller 83 rotates the electric motor 43 in the first direction, and rotates the rotary component 38 counterclockwise in FIG. 23(B).

In this manner, the second contact part 139 is away from the swelling part 77B, the arm 133 is rotated clockwise by the force of the elastic member 136, and the controller 83 stops the electric motor 43 at a moment at which the arm makes contact with the outer peripheral surface 77A as shown in FIG. 24. Thus, the latch 135 rotates clockwise about the support shaft 134, and the knock pin 137 engages with the rack 42. The knock pin 137 is disposed between the support shaft 134 and the support shaft 132 in the center line B1 direction.

Thus, even an air pressure is applied to the driver blade 23, the knock pin 137 does not get over the convex part 42*a*, and the engagement between the knock pin 137 and the rack 42 is kept. That is, the latch 135 does not rotate about the support shaft 134. The force by which the driver blade 23 is biased toward the bottom dead point is received by the ejection part 27 through the latch 135. Therefore, when the operator removes the fastener 48 from the ejection path 31, the movement of the driver blade 23 toward the bottom dead point can be prevented, so that the operability can be improved.

After the operator removes the fastener 48, when detecting that the trigger switch 53 is turned ON and the push sensor 50 is turned ON, the controller 83 rotates the electric motor 43 in the second direction, and stops the electric motor 43 at a moment at which the second contact part 139 of the arm 133 makes contact with the outer surface of the swelling part 77B as shown in FIG. 23B. In this manner, the driver blade 23 is moved toward the bottom dead point by the air pressure, and an air shot is performed in a state without the fastener 48 in the ejection path 31. Thereafter, the controller 83 rotates the electric motor 43 in the first direction, moves the driver blade 23 toward the top dead point by the engagement force between the pinions 41 and the rack 42, and stops the electric motor 43 at a moment at which the driver blade 23 reaches the standby position.

FIG. 25 shows an example in which an auxiliary rack 42*c* is provided at the distal end 23*a* of the driver blade 23. The auxiliary rack 42*c* is disposed between the convex part 42*a* disposed at a location that is the farthest from the piston 18 and the distal end 23*a* of the driver blade 23 in the center line B1 direction. After the fastener 48 clogging the ejection path 31 is removed, when the rotary component 38 is rotated counterclockwise in FIG. 24, the pinion 41 positioned downstream in the rotating direction of the rotary component 38 engages with the rack 42. Thus, even after the driver blade 23 reaches the top dead point, the pinions 41 repeats the operation of sequentially engaging with and being released from the convex parts 42*a* of the rack 42.

Before the driver blade 23 reaches the top dead point, the knock pin 137 gets over an auxiliary rack 24*c*, and engages with the auxiliary rack 24*c* when the driver blade 23 reaches the top dead point. Thus, when the rotary component 38 rotates counterclockwise in FIG. 25, the pinion 41 that has previously engaged is away from the convex part 42*a*, and the knock pin 137 engages with the auxiliary rack 24*c* before a next pinion 41 engages with a next convex part 42*a*. That is, the load of the driver blade 23 is received by the latch 135. Thus, after the driver blade 23 reaches the top dead point, the amount of the movement of the driver blade 23 in the center line B1 direction can be as small as possible. Therefore, the load of collision between the pinions 41 and the convex parts 42*a* can be reduced, and a reduction in durability of the driver blade 23 and the rotary component 38 can be suppressed.

Even when the positions of the pinion 41 and the convex part 42*a* are difficult to engage with each other after removal of the fastener 48, note that the knock pin 137 engages with the auxiliary rack 24*c*, so that the movement of the driver blade 23 toward the bottom dead point can be avoided.

Fifth Embodiment

A fifth embodiment of the driver is described with reference to FIG. 26 to FIG. 34. As shown in FIG. 26 and FIG. 27(A), a support mechanism 122 is provided to the ejection part 27. The support mechanism 122 has a mount 123 provided to the cover 30, a shaft member 124 supported by the mount 123 so as to be rotatable, a first latch 125 and a second latch 126 provided to the shaft member 124, and an elastic member 127 which applies a bias force to the shaft member 124 in the rotating direction. The elastic member 127 is a metallic torsion coil spring. The first latch 125 and the second latch 126 are disposed at the same position as each other in the rotating direction of the shaft member 124, and at different positions from each other in the center line direction of the shaft member 124. An opening 128 is formed in the cover 30. A guide plate 129 is provided between the cover 30 and the blade guide 28, and the ejection path 31 is formed between the guide plate 129 and the blade guide 28.

The guide plate 129 has an opening 130, and the opening 128 and the opening 130 are disposed so as to overlap each other in a front view of the driver 10. When the shaft member 124 rotates, the second latch 126 enters and exits from the ejection path 31 through the inside of the opening 128.

The controller 83 detects at least either that the push rod 32 is away from the driven member W1 or that the trigger switch 53 is OFF, and stops the electric motor 43. Also, as shown in FIG. 27(B), the pinions 41 of the rotary component 38 engage with the rack 42. The lower end of the driver blade 23 is positioned lower than the upper end of the fastener 48 positioned at the head in the magazine 49. That is, the driver blade 23 stops at the standby position.

Furthermore, the shaft member 124 is biased and rotated clockwise in FIG. 26 by the bias force of the elastic member 127, and the second latch 126 is positioned from the openings 128, 130 toward the inside of the ejection path 31. That is, the second latch 126 is positioned at the concave part 42*b* of the rack 42. Furthermore, the second latch 126 is in contact with the cover 30 or the guide plate 129 so that the shaft member 124 stops.

When the push rod 32 is pressed against the driven member W1, the push rod 32 moves in a direction of approaching the bumper 25 so as to be against the bias force of the compression coil spring 120. In this manner, the push rod 32 makes contact with the first latch 125 to rotate the shaft member 124 counterclockwise in FIG. 28. In this manner, the second latch 126 exits from the concave part 42*b*, so that the second latch 126 and the rack 42 are released. Also, the first latch 125 is pressed against the push sensor 50, and the controller 83 detects that the push rod 32 is pressed against the driven member W1.

When detecting that the push rod 32 is pressed against the driven member W1 and the trigger switch 53 is turned ON, the controller 83 drives the electric motor 43 to rotate the rotary component 38 counterclockwise in FIG. 27(B). Thus, the driver blade 23 moves in a direction of approaching the top dead point, and the pressure of the pneumatic chamber 21 increases.

Then, as shown in FIG. 28 and FIG. 29, when the piston 18 reaches the top dead point, the pinions 41 are released from the rack 42. In this manner, the driver blade 23 is moved toward the bottom dead point by the pressure of the pneumatic chamber 21, and impacts the fastener 48 in the ejection path 31, so that the fastener 48 is driven into the driven member W1.

The controller 83 continues driving of the electric motor 43 even after the fastener 48 is driven into the driven member W1, engages the pinions 41 and the rack 42, and moves the driver blade 23 from the bottom dead point to the top dead point. As shown in FIG. 26, when the driver blade 23 ascends to the standby position, the controller 83 stops the electric motor 43.

When the push rod 32 is away from the driven member W1 after the impacting work is performed without the clogging of the fastener 48 in the ejection path 31, the shaft member 124 is rotated clockwise in FIG. 30 by the bias force of the elastic member 127, the first latch 125 is away from the push sensor 50, and the push sensor is turned OFF. Also, as shown in FIG. 26, the second latch 126 enters the ejection path 31 through the openings 128, 130. Then, the second latch 126 engages with the rack 42, and the second latch 126 makes contact with the cover 30 or the guide plate 129, so that the shaft member 124 stops.

FIG. 31 and FIG. 32 show an example in a case in which the fastener 48 is buckled and deformed to clog in the ejection path 31 by pressing the push rod 32 against the driven member W1 and impacting the fastener 48 by the driver blade 23. When the operator puts the push rod 32 away from the driven member W1, the push rod 32 is away from the first latch 125. In this manner, the shaft member 124 is rotated clockwise in FIG. 31 by the force of the elastic member 120, so that the push sensor 50 is turned OFF, and the second latch 126 enters between the pinion 41 and the pinion 41. That is, the second latch 126 engages with the rack 42. Therefore, when the operator removes the fastener 48 from the ejection path 31, the movement of the driver blade 23 toward the bottom dead point can be prevented.

FIG. 34 shows an example in a case in which the fastener 48 cannot be removed from the ejection path 31 while the push rod 32 is away from the driven member W1. In this case, the operator presses the push rod 32 against the driven member W1 again to rotate the shaft member 124 counterclockwise in FIG. 34. In this manner, the second latch 126 is released from the rack 42, and the push sensor 50 is turned ON. Also, the operator applies an operation force to the trigger 52.

In this manner, the electric motor 43 is driven, the rotary component 38 rotates counterclockwise in FIG. 34, the pinions 41 and the rack 42 engage with each other, and the driver blade 23 moves toward the top dead point. Then, when the driver blade 23 reaches the standby position, the controller 83 stops the electric motor 43. While the electric motor 43 stops, the driver blade 23 stops while being supported by a rotation regulating mechanism so as not to be moved by the force of the pneumatic chamber 21. The rotation regulating mechanism allows the rotary component 38 to rotate counterclockwise in FIG. 34 and prevents it from rotating clockwise.

Furthermore, the operator puts the push rod 32 away from the driven member W1 and releases the operation force from the trigger 52 to remove the fastener 48 from the ejection path 31. The second latch 126 described in the fifth embodiment corresponds to an engagement member.

Sixth Embodiment

A first specific example of a sixth embodiment of the driver is described with reference to FIG. 35 and FIG. 36. In the driver 10, a support mechanism 92 is provided to the blade guide 28. The support mechanism 92 has a screw member 93 and a guide member 94 which supports the screw member 93. The screw member 93 has a male screw shaft 95, a head part continuing to the male screw shaft 95, and a boss part 97 of the male screw shaft 95, the boss part continuing to a location opposite to a head part 96.

A longitudinal direction of the screw member 93 is the same as the center line B1 direction. The screw member 93 is supported so as to be rotatable but not movable in the longitudinal direction by the guide member 94. Also, an engagement member 98 is attached to the male screw shaft 95. The engagement member 98 has a female screw part, is rotatable with respect to the male screw shaft 95, and is movable in the longitudinal direction of the screw member 93. The engagement member 98 is not rotatable with respect to the blade guide 28. A thrust bearing 101 is interposed between the head part 96 and the guide member 94. The boss part 97 has a groove.

Furthermore, the driver blade 23 has a convex part 99 as a rack different from the rack 42. The convex part 99 protrudes from an edge of the driver blade 23, the edge being opposite to the edge where the rack 42 is provided. The convex part 99 is disposed to be upper than the engagement member 98 in the center line B1 direction. Other configurations shown in FIG. 35 and FIG. 36 are the same as the configurations shown in FIG. 4.

When the fastener 48 does not clog in the ejection path 31 and the driver blade 23 is posited at the bottom dead point, there is a gap between the engagement member 98 and the convex part 99 as shown in FIG. 35. Thus, even if the driver blade 23 moves in the center line B1 direction, the convex part 99 does not make contact with the engagement member 98.

On the other hand, when the fastener 48 clogs in the ejection path 31 and the driver blade 23 stops before reaching the bottom dead point, the operator inserts a distal end of a tool 100 into the groove of the boss part 97, and rotates the tool 100 about the center axis of the screw member 93 in the first direction. In this manner, the engagement member 98 moves in a direction of approaching the head part 96 along the male screw shaft 95 of the screw member 93. Then, the operator stops the tool 100 at a moment at which the engagement member 98 makes contact with the convex part 99 as shown in FIG. 36 or at a position where the driver blade 23 is further slightly pushed up. Furthermore, the operator removes the clogged fastener 48 from the ejection path 31.

When the fastener 48 is removed from the ejection path 31, the load is transmitted to the screw member 93 through the convex part 99 and the engagement member 98 so as to attempt the movement of the driver blade 23 toward the bottom dead point. Since the screw member 93 is immovable in the center line B1 direction, the load attempting the movement of the driver blade 23 toward the bottom dead point is received by the blade guide 28 through the thrust bearing 101. That is, when the fastener 48 clogs in the ejection path 31, the driver blade 23 can be prevented from moving in a direction of approaching the bottom dead point in the center line B1 direction with respect to the ejection part 27.

When the operator manually rotates the tool 100 in the second direction after removing the fastener 48, the screw member 93 rotates, and the engagement member 98 moves in the center line B1 direction with respect to the screw member 93. The engagement member 98 moves in a direction of approaching the boss part 97. In this manner, the driver blade 23 moves toward the bottom dead point while the convex part 99 and the engagement member 98 are in contact with each other. That is, the engagement member 98 approaches the boss part 97 as receiving the load of the driver blade 23. Then, after the driver blade 23 reaches the bottom dead point as shown in FIG. 35, the operator stops the tool 100 and pulls out the distal end of the tool 100 from the groove of the boss part 97.

A second specific example of the sixth embodiment is described with reference to FIG. 37 and FIG. 16. An electric motor 102 is provided to the blade guide 28. The electric motor 102 is connected to the battery 47 via an electric circuit. The electric motor 102 can switch a rotating direction of a rotation shaft 103. The controller 83 controls rotation, stop, and a rotating direction of the rotation shaft 103 of the electric motor 102. A release switch 104 to be operated by the operator is provided, and a signal from the release switch 104 is input to the controller 83.

A first bevel gear 105 is provided to the rotation shaft 103, and a second bevel gear 106 is provided to the head part 96. The first bevel gear 105 meshes with the second bevel gear 106. Other configurations of the driver 10 shown in FIG. 37 are the same as the configurations of the driver 10 shown in FIG. 35 and FIG. 36.

In the driver 10 shown in FIG. 37, when the fastener 48 does not clog in the ejection path 31 and the driver blade 23 is positioned at the bottom deadpoint, there is a gap between the engagement member 98 and the convex part 99 as similar to FIG. 35. Also, the electric motor 102 stops.

On the other hand, when determining that the fastener 48 clogs in the ejection path 31, the controller 83 drives the electric motor 102 to rotate the rotation shaft 103, for example, clockwise in FIG. 37. In this manner, the screw member 93 rotates, and the engagement member 98 moves in a direction of approaching the head part 96 along the male screw shaft 95 of the screw member 93. Then, the controller 83 stops the electric motor 102 at a moment at which the engagement member 98 makes contact with the convex part 99 as shown in FIG. 37 or at a position at which the driver blade 23 is further slightly pushed up. Furthermore, the operator removes the clogged fastener 48 from the ejection path 31.

When the fastener 48 is removed from the ejection path 31, the load is received by the blade guide 28 through the screw member 93 and the thrust bearing 101 so as to attempt the movement of the driver blade 23 toward the bottom dead point. That is, in the case with the clogging of the fastener 48 in the ejection path 31, the driver blade 23 can be prevented from moving in a direction of approaching the bottom dead point in the center line B1 direction with respect to the ejection part 27.

After the operator removes the fastener 48 and the operator operates the release switch 104, the controller 83 drives the electric motor 102 to rotate the rotation shaft 103 counterclockwise in FIG. 37. In this manner, the screw member 93 rotates, and the engagement member 98 moves in the center line B1 direction with respect to the screw member 93. In this manner, the driver blade 23 moves toward the bottom dead point while the convex part 99 and the engagement member 98 make contact with each other. That is, the engagement member 98 approaches the boss part 97 while receiving the load of the driver blade 23. Then, after the driver blade 23 reaches the bottom dead point, the controller 83 stops the electric motor 102.

Note that the second specific example may be configured so that a manual switch 107 shown in FIG. 16 is provided to the driver 10 and a signal from the manual switch 107 is input to the controller 83. And, when the fastener 48 clogs, the operator can operate the manual switch 107 to drive the electric motor 102 and rotate the rotation shaft 103 clockwise in FIG. 37.

A third specific example of the sixth embodiment of the driver is described with reference to FIG. 38 and FIG. 39. In the driver 10 shown in FIG. 38 and FIG. 39, the guide member 94 is provided at a location where the push rod 32 is disposed in the blade guide 28. The guide member 94 has a female screw hole 108. The center line of the female screw hole 108 is parallel to the center line B1. The convex part 99 is provided to the same side edge as the side edge provided with the rack 42 in the driver blade 23. The convex part 99 is disposed between the rack 42 and the distal end of the driver blade 23.

A tool 109 that is detachable to the guide member 94 is provided. The tool 109 has a male screw part 110, and the male screw part 110 is inserted into the female screw hole 108 and is rotatable with respect to the female screw hole 108. Other configurations shown in FIG. 38 and FIG. 39 are the same as the configurations shown in FIG. 35.

When the driver blade 23 is positioned at the bottom dead point in the case without the clogging of the fastener 48 in the ejection path 31, there is a gap between the guide member 94 and the convex part 99 as shown in FIG. 38.

And, when the driver blade 23 stops before reaching the bottom dead point as shown in FIG. 39 after the clogging of the fastener 48 in the ejection path 31, the operator inserts a distal end of the tool 109 into the female screw hole 108 of the guide member 94, and rotates the tool 109 in the first direction by manual operation or using an electric power tool. In this manner, the tool 109 rotates, and the tool 109 moves in a direction of approaching the rotary component 38 in the center line B1 direction. Then, the operator stops the tool 109 at a moment at which the distal end of the tool 109 makes contact with the convex part 99 as shown in FIG. 39 or at a position at which the driver blade 23 is further pushed up. Furthermore, the operator removes the clogged fastener 48 from the ejection path 31.

When the fastener 48 is removed from the ejection path 31, the load is transmitted to the blade guide 28 through the tool 109 and the guide member 94 so as to attempt the movement of the driver blade 23 toward the bottom dead point. Since the tool 109 is immovable in the center line B1 direction, such a load as attempting the movement of the driver blade 23 toward the bottom dead point is received by the blade guide 28. That is, in the case with the clogging of the fastener 48 in the ejection path 31, the driver blade 23 can be prevented from moving in a direction of approaching the bottom dead point in the center line B1 direction with respect to the ejection part 27.

After the operator removes the fastener 48 and rotates the tool 109 in the second direction, the tool 109 moves in the center line B1 direction so as to be away from the rotary component 38. In this manner, the driver blade 23 moves toward the bottom dead point while the convex part 99 and the distal end of the tool 109 make contact with each other. Then, after the driver blade 23 reaches the bottom dead point as shown in FIG. 39, the operator pulls out the tool 109 from the female screw hole 108 of the guide member 94.

A fourth specific example of the sixth embodiment of the driver is described with reference to FIG. 40. The blade guide 28 has two attachment grooves 111. Also, a support mechanism 112 that is detachable to the blade guide 28 is provided. The support mechanism 112 has a support frame 113 and a screw member 114 to be attached to the support frame 113. The screw member 114 has a male screw shaft 115.

The support frame 113 has a base part 116, two arm parts 117 extending from the base part 116 in parallel to each other, and engagement parts 118 respectively provided to the two arm parts 117. The base part 116 has a female screw hole 119. Other configurations shown in FIG. 40 are the same as the configurations shown in FIG. 38.

In the case without the clogging of the fastener 48 in the ejection path 31, the support mechanism 112 is not attached to the blade guide 28. On the other hand, when the driver blade 23 stops before reaching the bottom dead point as shown in FIG. 40 after the clogging of the fastener 48 in the ejection path 31, the operator inserts the two engagement parts 118 into the attachment grooves 111, respectively, so that the two engagement parts 118 are engaged with the blade guide 28, and the support frame 113 is attached to the blade guide 28.

And, when the male screw shaft 115 is inserted into the female screw hole 119 to rotate the screw member 114 in the first direction, the screw member 114 moves with respect to the support frame 113, and moves in a direction of approaching the rotary component 38 in the center line B1 direction. The operator stops the screw member 114 at a moment at which the distal end of the male screw shaft 115 makes contact with the convex part 99 as shown in FIG. 40 or at a position at which the driver blade 23 is further pushed up. Furthermore, the operator removes the clogged fastener 48 from the ejection path 31.

When the fastener 48 is removed from the ejection path 31, the load is transmitted to the blade guide 28 through the screw member 114 and the support frame 113 so as to attempt the movement of the driver blade 23 toward the bottom dead point. Since the support frame 113 does not move in the center line B1 direction with respect to the blade guide 28, such a load as attempting the movement of the driver blade 23 toward the bottom dead point is received by the blade guide 28. That is, in the case with the clogging of the fastener 48 in the ejection path 31, the driver blade 23 can be prevented from moving in a direction of approaching the bottom dead point in the center line B1 direction with respect to the ejection part 27.

After the operator removes the fastener 48, the operator pulls out the two engagement parts 118 from the attachment grooves 111, and removes the support mechanism 112 from the blade guide 28.

In the sixth embodiment of the driver 10, in the case with the clogging of the fastener 48 in the ejection path 31, the driver blade 23 can be supported without using the torque of the electric motor 43. Also, since the driver blade 23 is supported by using the screw member, the driver blade 23 can be supported by the support mechanism even if the driver blade stops at any position in the center line B1 direction. Also, after the fastener 48 is removed, stepless movement of the screw member is achieved by rotating the screw member. Therefore, the driver blade 23 can be prevented from moving toward the bottom dead point at a high speed.

The driver is not limited to the above-described embodiments, and various alterations can be made within the scope of the present invention. For example, the driver may be a driver having a pneumatic chamber formed in a bellows, a piston fixed to an end part of the bellows, and a guide member which movably supports the piston. Furthermore, the driver may have a structure in which the piston is moved by an elastic force of a spring. The spring includes a metallic compression spring. The spring corresponds to an impact component. Note that the guide member may be not only a cylinder but also a linear rail. An operation mechanism which moves the piston in a direction of being away from a bumper is not only a rack-and-pinion mechanism but also includes a pulley and a wire. That is, the operation mechanism includes a structure in which the piston is moved by a tractive force of the wire. Furthermore, the driver includes a driver which supplies compressed air generated by a compressor to the pneumatic chamber through an air hose.

Furthermore, the electric motor described in the embodiments includes a direct-current motor with a battery as a direct-current power supply as a motive power source and an alternating-current motor using an alternating-current power supply. Furthermore, as the motor, in place of the electric motor, any of an oil hydraulic motor, a pneumatic motor, and an internal combustion may be used. Also, an outer peripheral shape of the impactor in a plan view perpendicular to a first center line may be any of a quadrangle, a rectangle, a square, a circle, and so forth. A form of the impactor may be any of a shaft form, a blade form, and so forth. The fastener includes not only a shaft-form nail but also a U-form fastener. The driven member to which the fastener is to be driven may be made of any of wood, plasterboard, or others.

Still further, the first component member and the second component member are not limited to be disposed so as to overlap each other in a plan view perpendicular to the first center line, but also the plan view may be not the plan view perpendicular to the first center line as long as it is any crossing plan view. The impactor includes not only a configuration in which the first center line as a center axis of the cylinder is positioned at the center of the impactor but also a configuration in which the first center line shifts from the center position of the impactor. That is, the impactor is only required to be movable in parallel to the first center line, and the center of the impactor and the first center line may be at separated positions from each other in a plan view crossing the first center line.

Note that the present specification has described the driver in which the cam plate 59 is moved by manually moving the lock lever, and the driver includes a first modification example. In the first modification example of the driver, the controller of the driver determines clogging of a nail when the driver blade 23 as an impactor does not move to the bottom dead point. Furthermore, in the first modification example of the driver, the cam plate 59 can be automatically moved by an actuator. The actuator includes a motor, and the controller controls the motor. And, in the first modification example of the driver, when the controller determines the clogging of the nail, the cam plate 59 is moved by using the motor, and the movement of the driver blade 23 is automatically regulated.

Furthermore, the driver includes a second modification example. The second modification example of the driver has a configuration in which the movement of the driver blade 23 as the impactor is regulated by moving the cam plate 59 by using a movement mechanism such as a solenoid or a spring. The driver includes a third modification example. The third modification example of the driver has a structure in which the movement of the driver blade 23 is regulated by using a solenoid, a spring, or a fixing screw as an engagement member and directly engaging the engagement member with the driver blade 23 as the impactor.

The driver may be configured so that the engagement member cannot be detached unless the impactor is detached by disposing at least a part of the engagement member between the first component member and the driver blade 23 as the impactor.

The motor for use in the driver includes an electric motor, an oil hydraulic motor, a pneumatic motor, and an engine. The control of switching the rotating direction of the engine between the first direction and the second direction is handled by providing a switching mechanism between the engine and the rotary component, the switching mechanism switching the direction of the rotary component between a forward direction and a reverse direction, while the rotating direction of the engine itself can be the same therebetween. The electric motor may be either a brush-equipped motor or a brushless motor.

EXPLANATION OF REFERENCE CHARACTERS

10 . . . driver, 19 . . . pressure accumulation container, 21 . . . pneumatic chamber, 23 . . . driver blade, 25 . . . bumper, 27 . . . ejection part, 28 . . . blade guide, 30 . . . cover, 31 . . . ejection path, 32 . . . push rod, 32*a* . . . distal end, 38 . . . rotary component, 41, 41A, 41B . . . pinion, 42 . . . rack, 43 . . . electric motor, 48 . . . fastener, 55 . . . fixing mechanism, 56 . . . lock plate, 57, 73 . . . lock lever, 62, 63 . . . guide rail, 58, 74 . . . support shaft, 76 . . . motive power mechanism, 83 . . . controller, B1, B3, B4 . . . center line, W1 . . . driven member.

What is claimed is:

1. A driver comprising:

an ejection part to which a fastener is supplied;

an impactor movable in a first direction to drive the fastener;

a motor;

a drive shaft coupled with the motor; and a rotary component coupled with the drive shaft, the rotary component, when driven by the motor, rotating to move the impactor in a second direction opposite the first direction, wherein the impactor includes an impactor body part extending in the first direction, and a first engaging member provided on a first side of the impactor body part, wherein the rotary component is arranged on the first side of the impactor, and includes a second engaging member configured to engage with the first engaging member, wherein the impactor further includes:

a third engaging member provided on a second side of the impactor body part, the second side being opposite to the first side, and configured to engage with a fourth engaging member provided on the ejection part; and wherein the first engaging member and the third engaging member protrude from the impactor body part in opposite directions to each other, and the impactor body part is located between the second engaging member and the fourth engaging member, wherein the second engaging member, the first engaging member, the impactor body, the third engaging member, and the fourth engaging member are linearly arranged in that order along a direction intersecting the first and second directions, wherein the rotary component further includes a body part supporting the second engaging member, wherein the body part includes first and second supporting parts spaced apart in an axial direction of the drive shaft, wherein the second engaging member includes pins supported by the first supporting part and the second supporting part, and the pins being configured to engage with the first engaging member, and wherein the first engaging member are positioned between the first and second supporting parts in the axial direction.

2. The driver according to claim 1, further comprising:

a controller configured to control the motor to drive the rotary component; and an actuator configured to operate the fourth engaging member in response to a signal from the controller, the actuator being arranged on the second side of the impactor body part.

3. A driver comprising:

an ejection part to which a fastener is supplied;

an impactor movable in a first direction to drive the fastener;

a motor;

a drive shaft coupled with the motor; and a rotary component coupled with the drive shaft, the rotary component, when driven by the motor, rotating to move the impactor in a second direction opposite the first direction, wherein the impactor includes an impactor body part extending in the first direction, and a first engaging member provided on a first side of the impactor body part, wherein the rotary component is arranged on the first side of the impactor, and includes a second engaging member configured to engage with the first engaging member, wherein the impactor further includes a third engaging member provided on the impactor body part to engage with a fourth engaging member provided on the ejection part, wherein the fourth engaging member includes:

an engagement position, in which the fourth engaging member engages with the third engaging member to prevent the impactor from moving in the first direction; and a disengagement position, in which the fourth engaging member does not engage with the third engaging member, and wherein the motor maintains the fourth engaging member in the disengagement position when the impactor is disengaged from the rotary component, allowing movement of the impactor in the first direction.

4. The driver according to claim 3, wherein the motor maintains the fourth engaging member in the disengagement position through the rotary component, with the position of the fourth engaging member determined by a rotational position of the rotary component.

5. The driver according to claim 4, wherein the rotary component further includes a projection part on its outer periphery, a radial dimension of which varies to interact with the fourth engaging member.

6. The driver according to claim 5, wherein the second engaging member includes a plurality of engagement portions arranged circumferentially around the rotary component, wherein a distance between one pair of the engagement portions is greater than a distance between other adjacent engagement portions, and wherein a region of the projection part, corresponding to the rotational position of the rotary component located between the one pair of engagement portions having the greater distance, maintains the fourth engaging member in the disengagement position.

7. The driver according to claim 4, further comprising an elastic member configured to apply a biasing force to the fourth engaging member for interaction with the rotary component.

8. The driver according to claim 3, further comprising a transmission member configured to operate independently of the fourth engaging member and transmit motion from the rotary component to the fourth engaging member.

9. The driver according to claim 8, wherein the transmission member is positioned to overlap with the impactor along the direction of a rotation axis of the rotary component and is located on a third side of the impactor opposite to a fourth side of the impactor, where the fastener is supplied.

10. The driver according to claim 9, wherein the fourth engaging member is positioned to overlap with the impactor in a direction crossing the rotation axis.

11. The driver according to claim 3, wherein the motor moves the fourth engaging member to the disengagement position before the impactor reaches a top dead center and maintains the fourth engaging member in the disengagement position until the impactor disengages from the rotary component and starts moving toward a bottom dead center.

12. The driver according to claim 3, wherein the first engaging member engages the second engaging member but does not engage the fourth engaging member, and the third engaging member engages the fourth engaging member but does not engage the second engaging member.

13. The driver according to claim 3, wherein the rotary component includes a first support and a second support spaced apart from each other in a rotation axis of the rotary component, and wherein the second engaging member includes a plurality of engagement portions supported by the first support and the second support.

14. The driver according to claim 3, further comprising a bias mechanism configured to apply a biasing force in the first direction to the impactor, wherein the bias mechanism includes a compression chamber configured to be filled with a gas for moving the impactor in the first direction.

15. A driver comprising:

an ejection part to which a fastener is supplied;

an impactor movable in a first direction to drive the fastener;

a motor;

a drive shaft coupled with the motor; and a rotary component coupled with the drive shaft, the rotary component, when driven by the motor, rotating to move the impactor in a second direction opposite the first direction, wherein the impactor includes an impactor body part extending in the first direction, and a first engaging member which is provided on a first side of the impactor body part, wherein the rotary component is arranged on the first side of the impactor, and includes a second engaging member configured to engage with the first engaging member, wherein the impactor further includes a third engaging member provided on the impactor body part to engage a fourth engaging member which is provided on the ejection part, wherein the fourth engaging member includes:

an engagement position, in which the fourth engaging member engages with the third engaging member to prevent the impactor from moving in the first direction; and a disengagement position, in which the fourth engaging member does not engage with the third engaging member, and wherein the driver further comprises a transmission member configured to operate independently of the fourth engaging member, transmit motion from the rotary component to the fourth engaging member, and maintain the fourth engaging member in the disengagement position determined by a rotational position of the rotary component.

16. The driver according to claim 15, wherein the rotary component includes a projection part that protrudes radially from an outer periphery.

17. The driver according to claim 15, further comprising an elastic member for applying a biasing force to the transmission member to maintain contact between the transmission member and the rotary component.

* * * * *